US012705745B2

(12) United States Patent
Radhakrishnan et al.

(10) Patent No.: US 12,705,745 B2
(45) Date of Patent: Aug. 11, 2026

(54) SYSTEMS AND METHODS FOR DETECTION OF CELLULAR ENTITIES

(71) Applicant: ADIUVO DIAGNOSTICS PRIVATE LIMITED, Chennai (IN)

(72) Inventors: Geethanjali Radhakrishnan, Chennai (IN); Bala Subrahmanyam Pesala, Chennai (IN)

(73) Assignee: ADIUVO DIAGNOSTICS PRIVATE LIMITED, Chennai (IN)

( * ) Notice: Subject to any disclaimer, the term of this patent is extended or adjusted under 35 U.S.C. 154(b) by 0 days.

(21) Appl. No.: 19/194,998

(22) Filed: Apr. 30, 2025

(65) Prior Publication Data

US 2025/0322524 A1 Oct. 16, 2025

Related U.S. Application Data

(63) Continuation of application No. PCT/IN2023/051001, filed on Nov. 1, 2023.

(30) Foreign Application Priority Data

Nov. 1, 2022 (IN) ............................ 202241062349

(51) Int. Cl.
*G06T 7/00* (2017.01)
*G06T 7/62* (2017.01)
(Continued)

(52) U.S. Cl.
CPC .............. *G06T 7/0014* (2013.01); *G06T 7/62* (2017.01); *G06V 10/82* (2022.01); *G06V 20/693* (2022.01);
(Continued)

(58) Field of Classification Search
CPC . G06T 2207/10012; G06T 2207/10048; G06T 2207/10064; G06T 2207/20081;
(Continued)

(56) References Cited

U.S. PATENT DOCUMENTS 6,765,668 B2 7/2004 Gardner et al.
8,417,324 B2 4/2013 Mycek et al.
(Continued)

FOREIGN PATENT DOCUMENTS

JP 2019-188162 A 10/2019
JP 7249881 B2 3/2023
(Continued)

OTHER PUBLICATIONS

Awad et al., "Steady-state and fluorescence 1lifetime spectroscopy for identification and classification of bacterial pathogens". Biomedical Spectroscopy and Imaging 3 (2014) 381-391.
(Continued)

*Primary Examiner* — Peet Dhillon
(74) *Attorney, Agent, or Firm* — Cozen O'Connor

(57) ABSTRACT

A device for examining a target includes an imaging module and an interfacing module. The interfacing module includes a processor to analyze, using an analysis model, a first image of the first plurality of images, which is a fluorescence-based image comprising fluorescence from the target. The processor analyzes, using the analysis model, a three-dimensional image of the target to determine variation in intensity of the light emitted across a spatial region of the target by compensating for variation in distance across the spatial region of the target from the three-dimensional image capturing sensor and for variation in curvature across the spatial region of the target. The processor detects, using the analysis model, presence of a problematic cellular entity in the target based on the analysis. The analysis model is trained for detecting presence of problematic cellular entities in targets.

24 Claims, 41 Drawing Sheets

(51) Int. Cl.
*G06V 10/82* (2022.01)
*G06V 20/69* (2022.01)
*H04N 13/254* (2018.01)

(52) U.S. Cl.
CPC ......... *G06V 20/698* (2022.01); *H04N 13/254* (2018.05); *G06T 2207/10012* (2013.01); *G06T 2207/10048* (2013.01); *G06T 2207/10064* (2013.01); *G06T 2207/20081* (2013.01); *G06T 2207/20084* (2013.01); *G06T 2207/20221* (2013.01); *G06T 2207/30024* (2013.01); *G06V 2201/03* (2022.01)

(58) Field of Classification Search
CPC . G06T 2207/20084; G06T 2207/20221; G06T 2207/30024; G06T 7/0014; G06T 7/62; G06V 10/82; G06V 20/693; G06V 20/698; G06V 2201/03; H04N 13/254
See application file for complete search history.

(56) References Cited

U.S. PATENT DOCUMENTS

| | | | | |
|---|---|---|---|---|
| 9,365,883 | B2 | 6/2016 | Gannot et al. | |
| 10,253,346 | B2 | 4/2019 | Auner et al. | |
| 10,288,567 | B2 | 5/2019 | Butte et al. | |
| 10,669,566 | B2 | 6/2020 | Richards et al. | |
| 11,471,696 | B1 | 10/2022 | Godavarty et al. | |
| 2009/0066934 | A1 | 3/2009 | Gao et al. | |
| 2010/0056928 | A1 | 3/2010 | Zuzak et al. | |
| 2011/0117025 | A1 | 5/2011 | Dacosta et al. | |
| 2014/0377795 | A1 | 12/2014 | Gannot et al. | |
| 2015/0044098 | A1 | 2/2015 | Smart et al. | |
| 2015/0216398 | A1* | 8/2015 | Yang | G01J 3/0208 600/109 |
| 2015/0284763 | A1 | 10/2015 | Rehse | |
| 2015/0371374 | A1* | 12/2015 | Zeng | G01M 3/38 382/274 |
| 2016/0377547 | A1 | 12/2016 | Butte et al. | |
| 2018/0053298 | A1* | 2/2018 | Mahadevan-Jansen | G06T 7/0012 |
| 2018/0292324 | A1 | 10/2018 | Verma et al. | |
| 2020/0309702 | A1* | 10/2020 | Barron | G01N 21/6486 |
| 2020/0364862 | A1 | 11/2020 | Dacosta et al. | |
| 2021/0082094 | A1* | 3/2021 | McCall | H04N 23/56 |
| 2021/0373336 | A1* | 12/2021 | Price | G02B 27/0172 |
| 2022/0061671 | A1 | 3/2022 | Dacosta et al. | |
| 2022/0092770 | A1* | 3/2022 | DaCosta | A61B 5/0091 |
| 2022/0292677 | A1 | 9/2022 | Pesala et al. | |

FOREIGN PATENT DOCUMENTS

| | | | |
|---|---|---|---|
| WO | 03046798 | A1 | 6/2003 |
| WO | 2007009119 | A2 | 1/2007 |
| WO | 2009140757 | A1 | 11/2009 |
| WO | 2016011534 | A1 | 1/2016 |
| WO | 2016069788 | A1 | 5/2016 |
| WO | 2018/175377 | A1 | 9/2018 |
| WO | 2020/210746 | A1 | 10/2020 |
| WO | 2022/162702 | A1 | 8/2022 |

OTHER PUBLICATIONS

Dalterio R. A et al., "Steady-State and Decay Characteristics of Protein Tryptophan Fluorescence from Bacteria", Appl. Spectrosc. Dec. 31, 1986, pp. 86-90.

Graus et al., "Hyperspectral fluorescence microscopy detects autofluorescent factors that can be exploited as a diagnostic method for Candida species differentiation". Method for Candida species differentiation, J. Biomed. Opt. 22(1), 016002 (2017).

Ju Li, et al., "Deep learning-assisted three-dimensional fluorescence difference spectroscopy for identification and semiquantification of illicit drugs in biofluids". https://pubs.acs.org/doi/10.1021/acs.analchem.9b01315.

Marcu Laura. "Fluorescence Lifetime Techniques in Medical Applications". Annals Biomedical Engineering. Feb. 2012; 40(2): 304-331.

Rehse et al., "Towards the clinical application of laser-induced breakdown spectroscopy for rapid pathogen diagnosis: the effect of mixed cultures and sample dilution on bacterial". Applied Optics, May 1, 2010, vol. 49, No. 13.

Yankelevich et al., "Design and evaluation of a device for fast multispectral time-resolved fluorescence spectroscopy and imaging". Review of Scientific Instruments 85, 034303 (2014).

International Search Report and Written Opinion for PCT/IN2023/05101, mailed Feb. 22, 2024, 9 pages.

Examination Report for IN Application No. 202241062349, mailed Jun. 20, 2024, 7 pages.

Hearing Notice for IN Application No. 202241062349, mailed Jan. 15, 2025, 4 pages.

Hearing Notice for IN Application No. 202241062349, mailed Feb. 5, 2025, 4 pages.

Hearing Notice for IN Application No. 202241062349, mailed Mar. 4, 2025, 2 pages.

Angulo-Rodriguez Leticia et al., "Development and Validation of Phase-Shifting Profilometry Using a Hyperspectral Spatial Frequency Domain Imaging System Integrated with a Neurosurgical Microscope", Journal of Bioengineering & Biomedicalscience, vol. 9, No. 257, Feb. 7, 2019.

European Search Report and Written Opinion for EP App. No. 23885266.9, mailed Nov. 20, 2025. 13 pages.

Rogelj et al., 'Curvature and height corrections of hyperspectral images using built-in 3D Laser profilometry, Applied Optics, vol. 58, No. 32/ Nov. 10, 2019, 11 pages.

Saiko et al. "Hyperspectral imaging in wound care: A systematic review". Wileyonlinelibarary.com/Journal/iwj- Int. Wound J. 2020; 17, pp. 1840-1856.

Saiko, Gennadi et al., "Hyperspectral 5,6 imaging in wound care: A systematic review", International Wound Journal, vol. 17, No. 6, Aug. 23, 2020, pp. 1840-1856.

Urban, Ben E. et al., "Multimodal 1-15 hyperspectral fluorescence and spatial frequency domain imaging for tissue health diagnostics of the oral cavity", Biomedical Optics Express, vol. 12, No. 11, Oct. 18, 2021.

* cited by examiner

Figure 16A:
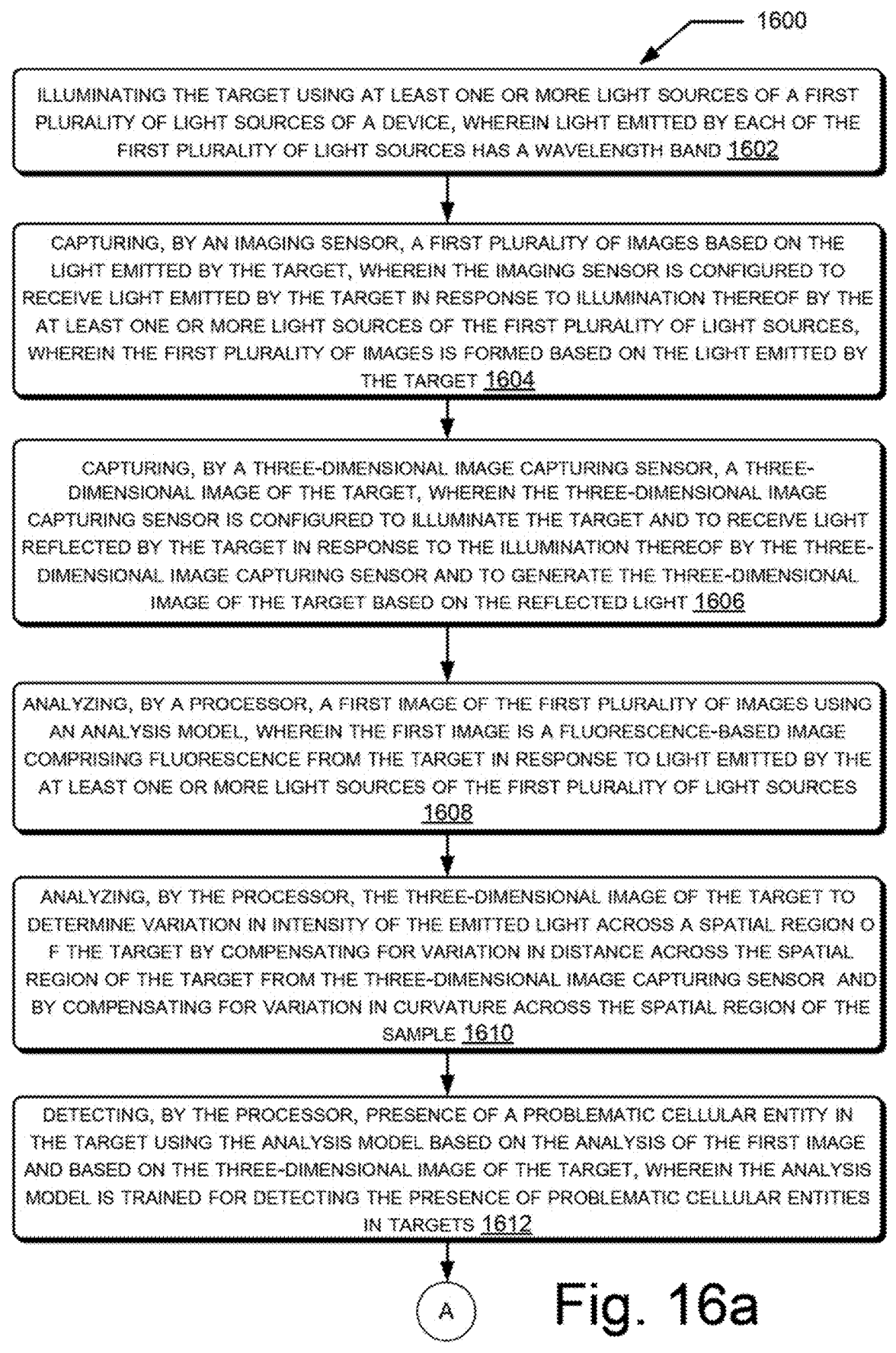

1600

ILLUMINATING THE TARGET USING AT LEAST ONE OR MORE LIGHT SOURCES OF A FIRST PLURALITY OF LIGHT SOURCES OF A DEVICE, WHEREIN LIGHT EMITTED BY EACH OF THE FIRST PLURALITY OF LIGHT SOURCES HAS A WAVELENGTH BAND 1602

CAPTURING, BY AN IMAGING SENSOR, A FIRST PLURALITY OF IMAGES BASED ON THE LIGHT EMITTED BY THE TARGET, WHEREIN THE IMAGING SENSOR IS CONFIGURED TO RECEIVE LIGHT EMITTED BY THE TARGET IN RESPONSE TO ILLUMINATION THEREOF BY THE AT LEAST ONE OR MORE LIGHT SOURCES OF THE FIRST PLURALITY OF LIGHT SOURCES, WHEREIN THE FIRST PLURALITY OF IMAGES IS FORMED BASED ON THE LIGHT EMITTED BY THE TARGET 1604

CAPTURING, BY A THREE-DIMENSIONAL IMAGE CAPTURING SENSOR, A THREE-DIMENSIONAL IMAGE OF THE TARGET, WHEREIN THE THREE-DIMENSIONAL IMAGE CAPTURING SENSOR IS CONFIGURED TO ILLUMINATE THE TARGET AND TO RECEIVE LIGHT REFLECTED BY THE TARGET IN RESPONSE TO THE ILLUMINATION THEREOF BY THE THREE-DIMENSIONAL IMAGE CAPTURING SENSOR AND TO GENERATE THE THREE-DIMENSIONAL IMAGE OF THE TARGET BASED ON THE REFLECTED LIGHT 1606

ANALYZING, BY A PROCESSOR, A FIRST IMAGE OF THE FIRST PLURALITY OF IMAGES USING AN ANALYSIS MODEL, WHEREIN THE FIRST IMAGE IS A FLUORESCENCE-BASED IMAGE COMPRISING FLUORESCENCE FROM THE TARGET IN RESPONSE TO LIGHT EMITTED BY THE AT LEAST ONE OR MORE LIGHT SOURCES OF THE FIRST PLURALITY OF LIGHT SOURCES 1608

ANALYZING, BY THE PROCESSOR, THE THREE-DIMENSIONAL IMAGE OF THE TARGET TO DETERMINE VARIATION IN INTENSITY OF THE EMITTED LIGHT ACROSS A SPATIAL REGION O F THE TARGET BY COMPENSATING FOR VARIATION IN DISTANCE ACROSS THE SPATIAL REGION OF THE TARGET FROM THE THREE-DIMENSIONAL IMAGE CAPTURING SENSOR AND BY COMPENSATING FOR VARIATION IN CURVATURE ACROSS THE SPATIAL REGION OF THE SAMPLE 1610

DETECTING, BY THE PROCESSOR, PRESENCE OF A PROBLEMATIC CELLULAR ENTITY IN THE TARGET USING THE ANALYSIS MODEL BASED ON THE ANALYSIS OF THE FIRST IMAGE AND BASED ON THE THREE-DIMENSIONAL IMAGE OF THE TARGET, WHEREIN THE ANALYSIS MODEL IS TRAINED FOR DETECTING THE PRESENCE OF PROBLEMATIC CELLULAR ENTITIES IN TARGETS 1612

A

Fig. 16a 2300
2312
2320
2322
2318
2324
High
Medium
Low
0
50
100
150
200
250
300
400

SYSTEMS AND METHODS FOR DETECTION OF CELLULAR ENTITIES

TECHNICAL FIELD

The present subject matter relates, in general, to detection of problematic cellular entities, such as pathogens, in targets, and, in particular, systems and methods for detection of problematic cellular entities.

BACKGROUND

A cellular entity may be an entity made of one or more biological cells, such as unicellular organisms, multicellular organisms, tissues, or the like. A problematic cellular entity may be one that may cause harm to plant, animal, or human health. A problematic cellular entity, for example, is a pathogen that causes a disease in human beings and a pathogen that delays healing of a wound. A problematic cellular entity may be one that is indicative of an ailment in a plant, animal, or human being. For example, a cancerous tissue may be a problematic cellular entity, which indicates the presence of tumor. The presence of a problematic cellular entity on a target, such as a human body, animals, or plants, is to be detected, for example, to prevent the occurrence of a disease, to provide timely treatment to avert fatalities, and the like. Similarly, the presence of a problematic cellular entity on a target, such as an edible product, sanitary equipment, or laboratory equipment, is to be detected to determine contamination in the edible products, contamination in surfaces of the sanitary equipment, or laboratory equipment, to study effectiveness of disinfectants on laboratory equipment, and the like.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

FIGS. 16*a*-16*b* illustrates a method for examining a target, in accordance with an implementation of the present subject matter;

DETAILED DESCRIPTION

Figure 1:
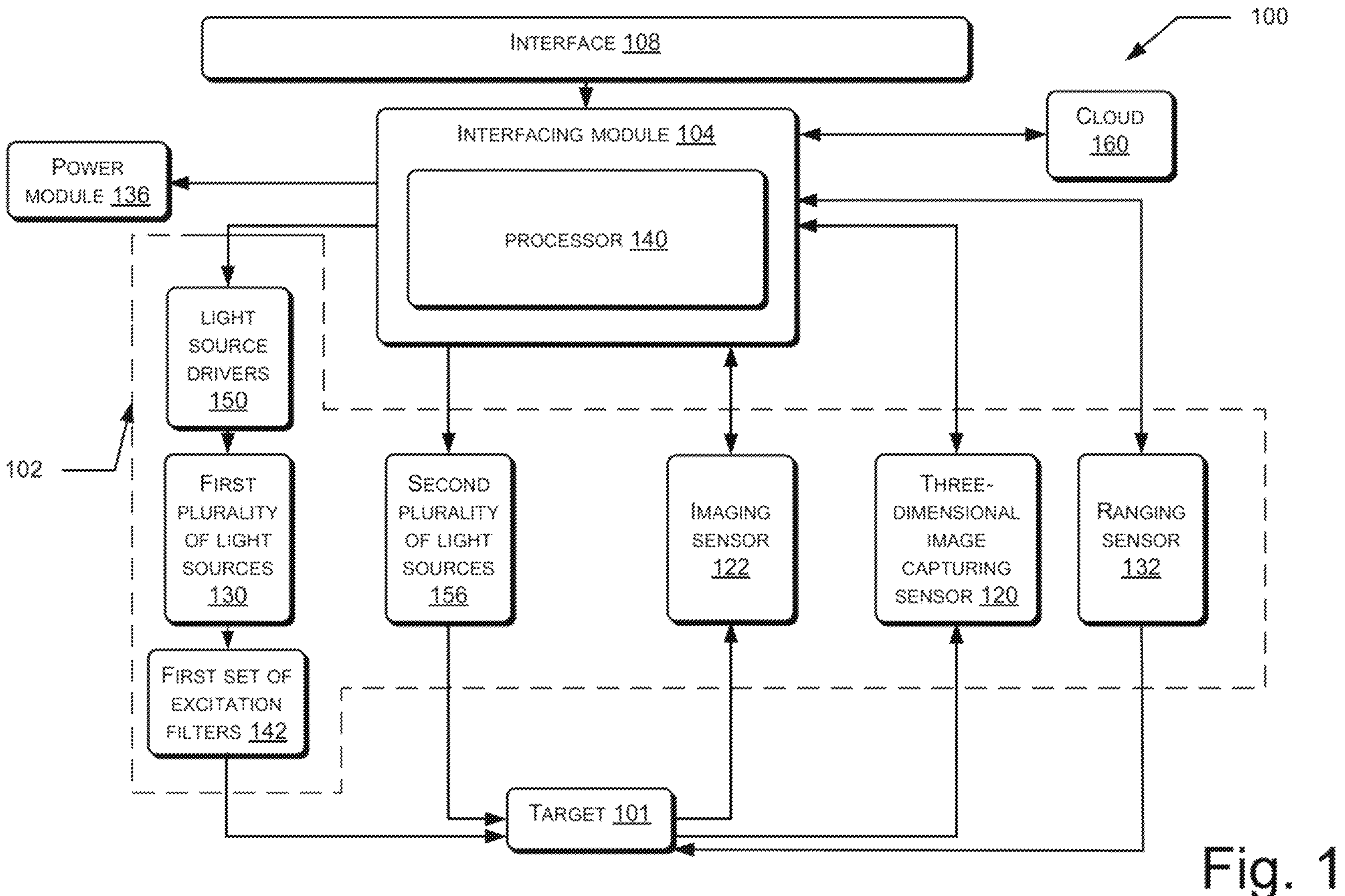
FIG. 1 illustrates a block diagram of a device for examining a target, in accordance with an implementation of the present subject matter.

Presence of problematic cellular entities on a target is to be accurately detected. The target may be, for example, a wound region in a human body, an edible product, a tissue sample extracted from a human body, or a surface that is to be sterile, such as a laboratory equipment surface, a medical equipment surface, a sanitary equipment surface, and the like. Conventionally, a culture method is used for detection of problematic cellular entities, such as a pathogen. In other words, to detect the problematic cellular entities, a sample is obtained from a region that is expected to have a pathogen infection using a swab or deep tissue biopsy. Subsequently, the obtained sample is stored in an appropriate culture medium, in which the pathogen expected to be in the site grows with time. If the pathogen is present in the sample, the pathogen is isolated and identified using biochemical methods.

Similarly, for problematic cellular entities, such as cancerous tissue, a tissue biopsy is taken. The tissue biopsy is examined under microscopy with staining methods, such as hematoxylin and Eosin staining, Mucicarmine staining, Papanicolaou stain, and the like, to identify if the tissue is a cancerous tissue. In some examples, the examination may be performed without staining methods. As will be appreciated, the aforementioned methods are cumbersome, require specialized microbiology facilities, and may take 1-2 days to accurately identify the infection and classify the pathogen or the cancerous tissue.

In some cases, detection and classification of problematic cellular entities is performed based on autofluorescence arising from native biomarkers in the problematic cellular entities. The native biomarkers may be, for example, Nicotinamide Adenine Dinucleotide phosphate Hydrogen (NAD(P)H), flavins, porphyrins, pyoverdine, tyrosine, and tryptophan. The autofluorescence arising from the biomarkers may be unique to each of the biomarkers, and may be useful for detection and classification of the problematic cellular entities.

Although autofluorescence can be used for the detection and classification, the autofluorescence arising normally from the native biomarkers is weak, and may not be easily detected. Further, in addition to the autofluorescence, the light emerging from a target may include background light and excitation light, which may interfere with the emitted autofluorescence. Therefore, the detection and classification of the problematic cellular entities using autofluorescence may be time-consuming, complex, and relatively less accurate.

In addition, in some scenarios, intensity of autofluorescence, or reflectance, and/or scattering being emitted or reflected at different regions in the target may be same. For instance, assume that a target, such as a wound having pathogens spread across a spatial region of the wound. Further, assume that a first spatial region of the wound and a second spatial region of the wound are at different depth in the wound. In this regard, the intensity of autofluorescence emitted by the first spatial region and the second spatial region may be the same. Therefore, when the autofluorescence is captured using a camera, such as a CMOS camera, CCD camera, or the like, the spatial region of the wound farther from the camera will appear weaker than the spatial region of the wound closer to the camera. For instance, assume that the first spatial region of the wound is closer to the camera and the second spatial region of the wound is farther to the camera. In this regard, when the autofluorescence emitted by the second spatial region will appear weaker than the autofluorescence emitted by the first spatial region irrespective of pathogens present or population thereof.

In addition, variation in the intensity from the spatial regions of the target at a same distance from the camera may also arise due to curvature of the target resulting in different reflection or scattering or autofluorescence. For instance, assume that a target, such as a wound, having pathogens spread across a spatial region of the wound. Further, assume that a first spatial region of the wound and a second spatial region of the wound have same pathogens and same concentration of the pathogens. Yet further, assume that the first spatial region is planar while the second spatial region is a curvature. Since the pathogens and the concentration of the pathogens are same, the camera should capture same intensity of fluorescence, reflectance, and/or scattering. However, due to curvature, the intensity of fluorescence, reflectance, and/or scattering corresponding to second spatial region may be different from that of the first spatial region.

Accordingly, the detection of the problematic cellular entities may be inaccurate and/or incorrect. The inaccuracy in detection of the problematic cellular entities will hamper accurate diagnosis of disease, prevention of occurrence of a disease, provision of timely treatment to avert fatalities, and the like. Similarly, the inaccurate and/or incorrect detection of problematic cellular entities on a target, such as an edible product, sanitary equipment, or laboratory equipment, body fluids, such as blood, medical devices, such as catheters, affects determination of contamination in the edible products, contamination in surfaces of the sanitary equipment, or laboratory equipment, and the like.

The present subject matter relates to systems and methods for detection of problematic cellular entities. With the implementation of the present subject matter, the detection of problematic cellular entities, such as pathogens, cancerous tissue, necrotic tissue, and the like, can be quick, accurate, simple, and cost-effective.

In accordance with an implementation, a device for examining a target may include an imaging module, an interfacing module, and a display. The target may be suspected of having a problematic cellular entity, such as a pathogen or a cancerous tissue. In an example, the target may be made of one or more cells, and may be, for example, a wound in a body part or a tissue sample. In other examples, the target may be an article that is to be free of pathogens, such as an edible product, a laboratory equipment, or a sanitary equipment. In some other examples, the target may be bodily fluids, such as, pus, blood, urine, saliva, sweat, semen, mucus, plasma, etc., water, injectable fluid, and the like, that may be suspected of having a pathogen.

The imaging module may include a first plurality of light sources, an imaging sensor, and a three-dimensional image capturing sensor. Each of the first plurality of light sources is to emit excitation radiation at a predetermined range of wavelengths. In particular, the emitted excitation radiation may be of a single wavelength or a wavelength band that causes one or more markers in the target to fluoresce when illuminated. The first plurality of light sources may be, for example, homogenous light sources or non-homogenous light sources. In an example, the use of non-homogenous light sources may enable reducing or eliminating background light in light emitted by the target.

The one or more markers may be part of the problematic cellular entity. The fluorescence emitted by the marker that is part of the problematic cellular entity may be referred to as autofluorescence. In an example, an exogenous marker, such as a synthetic marker like Indocyanine Green (ICG) or methylene blue may be sprayed on the target to cause detection of the problematic cellular entity in the target. The exogenous marker may bind to cellular entities, such as deoxyribonucleic acid (DNA), Ribonucleic acid (RNA), proteins, blood, biochemical markers, and the like, which may cause the target to fluoresce. The fluorescence emitted by the added synthetic marker may also be referred to as exogenous fluorescence.

In an example, the imaging sensor may be configured to directly receive the light emitted by the target in response to illumination thereof by at least one or more light sources of the first plurality of light sources without an optical bandpass filter being disposed between the imaging sensor and the target and to capture a first plurality of images formed based on the emitted light. If the target includes a marker that fluoresces, the captured image includes fluorescence, and may be referred to as a fluorescence-based image. Therefore, the fluorescence-based image may include fluorescence emerging from the target. Here, the light is said to be directly received by the imaging sensor because the light emitted is not filtered by an optical bandpass filter before capturing of the image.

The imaging sensor may be a multispectral camera configured to capture the light emitted by the target at a plurality of wavelengths. In particular, the multispectral camera may capture the light emitted at wavelengths in visible region, Ultraviolet (UV) region, Near-Infra Red (NIR) region, or a combination thereof. In another example, the imaging sensor may be a charge coupled device (CCD) sensor, a CCD digital camera, a complementary metal-oxide semiconductor (CMOS) sensor, a CMOS digital camera, a single-photon avalanche diode (SPAD), a single-photon avalanche diode (SPAD) array, an Avalanche Photodetector (APD) array, a photomultiplier tube (PMT) array, a Near-infrared (NIR) sensor, a Red Green Blue (RGB) sensor, or a combination thereof. In an example, the device may include one or more lens may be integrated with the imaging sensor to focus the light onto the imaging sensor and to capture the image.

The three-dimensional image capturing sensor may illuminate the target and may receive light reflected by the target in response to the illumination thereof by the three-dimensional image capturing sensor to generate a three-dimensional image of the target based on the reflected light. In addition, the use of the three-dimensional image capturing sensor may enable determination of variation in the intensity of the reflected light by the target across a spatial region of the target. The variation in the intensity may have to be factored in for due to difference in distance of a plurality of regions across a spatial region of the target from the three-dimensional image capturing sensor and due to difference in curvature across the spatial region of the target. For instance, a first spatial region of the target may be at a distance that is different from a second spatial region of the target relative to the three-dimensional image capturing sensor. Accordingly, the first spatial region and the second spatial region may emit fluorescence at the same intensity. Since the fluorescence of the first spatial region and the second spatial region are of same intensity, spatial region that is farther from the device may appear to be weaker relative to spatial region that is closer to the device. For instance, assume that the second spatial region is farther from the device than the first spatial region. Accordingly, the fluorescence emitted by the second spatial region may appear to be weak.

In addition, variation in the intensity from the spatial regions of the target at a same distance from the camera may also arise due to curvature of the target resulting in different reflection or scattering or autofluorescence. For instance, assume that a target, such as a wound, having pathogens spread across a spatial region of the wound. Further, assume that a first spatial region of the wound and a second spatial region of the wound have same pathogens and same concentration of the pathogens. Yet further, assume that the first spatial region is planar while the second spatial region is a curvature. Since the pathogens and the concentration of the pathogens are same, the camera should capture same intensity of fluorescence, reflectance, and/or scattering. However, due to curvature, the intensity of fluorescence, reflectance, and/or scattering corresponding to second spatial region may be different from that of the first spatial region.

Therefore, variation in distance and curvature across the spatial region of the target relative to the device may have to be compensated in the light reflected by the target. In an example, the three-dimensional image capturing sensor may be a structured-light based sensor, a time-of-flight sensor, a stereo sensor, or a combination thereof.

The interfacing module may be coupled to the imaging module. The interfacing module may include a processor configured to analyze images corresponding to the target. In particular, the processor may analyze a first image of the first plurality of images using an analysis model. The first plurality of images may be fluorescence-based images comprising fluorescence emerging from the target. Further, the processor may analyze the three-dimensional image of the target by compensating for variation in distance across the spatial region of the target relative to the three-dimensional image capturing sensor in the reflected light and compensating for variation in curvature across the spatial region of the target. In this regard, the processor may determine variation in intensity of the light emitted across the spatial region of the target by compensating for the variation in distance across the spatial region of the target relative to the three-dimensional image capturing sensor and by compensating for variation in curvature across the spatial region of the target. The analysis model may be, for example, an Artificial Neural Network model (ANN), a Machine Learning (ML) model, or a combination thereof. In an example, the ANN model may include a deep learning model, such as a transformer model, a convolutional neural network (CNN), a generative adversarial network (GAN), an auto-encoder decoder network, a transformer model, or a combination thereof. The ML model may be, for example, a support vector machine (SVM) model or a random forest model or a combination thereof.

The processor may detect presence of a problematic cellular entity in the target based on the analysis of the first image and the three-dimensional image using the analysis model. The analysis model is trained for detecting the presence of problematic cellular entities in targets. In particular, the analysis model may be trained using a plurality of reference fluorescence-based images for detecting the presence of problematic cellular entities in targets. The analysis model may be trained to differentiate between fluorescence in the fluorescence-based image emerging from the problematic cellular entity and fluorescence in the fluorescence-based image emerging from regions other than the problematic cellular entity.

In an example, in addition to being trained by the plurality of reference fluorescence-based images, the analysis model may be trained using a plurality of reference three-dimensional images of the targets for detecting the presence of problematic cellular entities in targets. In this regard, the analysis model may be trained to differentiate between fluorescence in the fluorescence-based image emerging from the problematic cellular entity and fluorescence in fluorescence-based image emerging from regions of other than the problematic cellular entity. In addition, the analysis model may be trained by compensating for differences in distance across the spatial region of the target relative to the three-dimensional image capturing sensor and by compensating for variation in curvature across the spatial region of the target by determining variation in intensity of the light emitted across the spatial region of the target. The variation in the intensity of the light emitted across the spatial region of the target may be determined based on variation in distances across the spatial region of the target relative to the three-dimensional image capturing sensor, on a variation in curvatures across the spatial region of the target, and on an intensity measured across the spatial region of the target.

Further, the processor may create a composite image of the first image and the three-dimensional image of the target using the analysis model. The interface may display a result corresponding to the detection of the problematic cellular entity and the composite image of the first image and the three-dimensional image of the target.

In an example, the device may include a System-on-Module (SOM). The SOM may include the imaging module, the interfacing module, and a plurality of light source drivers. The plurality of light source drivers which could include Metal-Oxide-Semiconductor Field-Effect Transistors (MOSFETS), Bipolar Junction Transistors (BJTs), Phase-locked loops (PLLs) or a combination thereof or any combination thereof may be configured to regulate a respective light source of the first plurality of light sources.

In an example, one or more light sources of the first plurality of light sources is a Pulsed Light Emitting Diode (LED). The processor may be configured to actuate one or more of the light source drivers of the plurality of light source drivers to regulate the pulsed LEDs to emit pulses of excitation radiation. The one or more light source drivers may be actuated by the processor to regulate the pulsed LEDs at pulse widths, frequency that is to enable faster imaging and to reduce ambient light interference in the light emitted by the target. In an example, the pulse widths may range from 100 s of ns to 0.005 ms, frequency of the pulsed LEDs may be from 100 Hz to tens of MHz. Therefore, the present subject matter enables faster capturing of the first plurality of images and the three-dimensional images and reduces ambient light interference (background interference).

In an example, the processor may be configured to operate the imaging sensor and the three-dimensional image capturing sensor to capture and to process the first plurality of images and the three-dimensional image at more than 30 frames per second. In this regard, the processor may include a Central Processing Unit (CPU) and a Graphics Processing Unit (GPU). In particular, the CPU and the GPU may be part of SOM. In other words, the CPU and the GPU may be provided on-board. The CPU may operate the imaging sensor and the three-dimensional image capturing sensor to capture the first plurality of images and the three-dimensional images. Further, the GPU may process the images captured by the first plurality of images and the three-dimensional images. The provision of the GPU and the CPU, in particular, provision of the GPU and the CPU on-board may enable faster processing and capturing of the first plurality of images and the three-dimensional image at more than 30 frames per second.

In some examples, in addition to using fluorescence-based images and three-dimensional images for detecting the presence of problematic cellular entity, the device may detect the presence of the problematic cellular entity based on oxygenation. In this regard, the device may include a second plurality of light sources for illuminating the target without causing the marker in the target to fluoresce. Each of the second plurality of light sources may be configured to emit the light with a wavelength in a Near-Infra Red (NIR) region or a visible region.

The imaging sensor may be configured to capture a second plurality of images formed based on light reflected by the target in response to illumination thereof by at least one or more light sources of the second plurality of light sources. The processor may analyze a second image obtained from the second plurality of images to identify oxygenation at a plurality of regions in the target, using the analysis model. The processor may analyze, using the analysis model, the three-dimensional image of the target to determine variation in intensity of the light reflected across a spatial region of the target by compensating for variation in distance across the spatial region of the target from the three-dimensional image capturing sensor and for variation in curvature across the spatial region of the target. The processor may detect the presence of the problematic cellular entity in the target based on the analysis of the first image of the first plurality of images, the second image obtained from second plurality of images, and the three-dimensional image using the analysis model. In such a case, the processor may create a composite image of the first image, the second image, and the three-dimensional image of the target. The interface may display a result corresponding to the detection of the problematic cellular entity and the composite image of the first image, the second image, and the three-dimensional image of the target.

In an example, the analysis model may utilize white light images in addition to the first image and the three-dimensional image of the target to detect the problematic cellular entity. In this regard, in an example, at least one or more of the second plurality of light sources may be configured to emit light with a wavelength in the visible region. The imaging sensor may be configured to capture a third plurality of images formed based on light reflected by the target in response to illumination thereof by the at least one or more light sources of the second plurality of light sources. The third plurality of images are white light images. The processor may be configured to analyze, using the analysis model, a third image obtained from the third plurality of images. The processor may analyze, using the analysis model, the three-dimensional image of the target to determine variation in intensity of the light reflected across a spatial region of the target by compensating for variation in distance across the spatial region of the target from the three-dimensional image capturing sensor and for variation in curvature across the spatial region of the target. The processor may be configured to detect, using the analysis model, a presence of a problematic cellular entity in the target based on the analysis of the first image, the third image, and the three-dimensional image. The processor may be configured to create a composite image of the target using the first image, the third image, and the three-dimensional image. The interface may be configured to display a result corresponding to the detection of the problematic cellular entity and the composite image of the first image, the third image, and the three-dimensional image of the target. As will be understood, in such a case, the analysis model may be trained using a plurality of reference fluorescence-based images, a plurality of reference white light images, and a plurality of reference three-dimensional images to detect the presence of problematic cellular entity in the target.

The processor may be configured to activate the first plurality of light sources for emitting light onto the target and activate the second plurality of light sources for emitting light onto the target. In addition, the processor may be configured to activate the imaging sensor to capture light emitted by the target in response to illumination of the target by the at least one or more light sources of the first plurality of light sources and to capture light emitted by the target in response to illumination of the target by the at least one or more light sources of the second plurality of light sources.

In an example, to reduce and/or eliminate the effect of background light in the captured images, the processor may be configured to control the first plurality of light sources, the second plurality of light sources to illuminate at a frequency other than a frequency of an ambient light source.

In an example, in addition to detection of the problematic cellular entity, the device may classify the detected problematic cellular entity. Accordingly, in an example, when the target is a wound region, the processor may be configured to extract spatial and spectral features of the wound region from the first image and the three-dimensional image using the analysis model. Further, the processor may identify location of the wound region based on the extraction of the spatial and the spectral features by using the analysis model. The processor may determine contour of the wound region based on the extraction of the spatial and the spectral features by using the analysis model. In an example, based on the determination of the contour of the wound region, the processor may be configured to determine a length of the wound region, a width of the wound, a perimeter of the wound, an area of the wound, a depth of the wound, or a combination thereof, based on the determination of the contour of the wound region. Further, the processor may detect pathogen in the wound region based on the extraction of the spatial and the spectral features by using the analysis model. The processor may classify pathogen by at least one of: family, genus, species, or strain of the pathogen by using the analysis model.

In an example, in addition to the detection of the problematic cellular entities, the device may determine other parameters corresponding to the detected problematic cellular entities. For instance, when the target is a wound region, the processor may be configured to determine degree of infection of the wound region, slough region, spatial distribution of pathogens in the wound region, a healing rate of the wound region, or a combination thereof, in response to detecting the presence of the problematic cellular entity. When the target is a tissue, the processor is configured to detect the presence of the problematic cellular entity as a cancerous tissue, a necrotic tissue, or a combination thereof in the tissue sample. When the target is a sanitary device, a medical equipment, a sanitary equipment, a laboratory equipment, a biochemical assay chip, a microfluidic chip, and/or a body fluid, the processor may be configured to determine the presence of the problematic cellular entity as pathogen, and classify the pathogens in the target.

Further, in addition to the detection of the problematic cellular entities, the processor may be configured to detect time-dependent changes in fluorescence emerging from the target. In other words, the processor may be configured to detect changes from fluorescence between a first imaging of the target relative to a subsequent imaging of the target. For instance, the processor may be configured to detect changes in fluorescence between pre-debridement of a wound and post-debridement of the wound. The detection may enable accurate removal of the dead/unhealthy tissue from the wound. In another example, the processor may be configured to detect changes in fluorescence between an image of the wound taken on a first day and an image of the wound taken on a subsequent day. The detection may help in ascertaining healing of the wound and allow a medical practitioner to administer medications according to the detection.

In an example, the device may be portable and may comprise a smart phone. The smart phone may include the processor and the imaging sensor. In an example, the device may include other components. In an example, the device may include a first set of excitation filters. Each of the first set of excitation filters may be configured to filter the excitation radiation emitted by a light source of the first plurality of light sources of a predetermined range of wavelengths to pass through thereof to illuminate the target. In addition, one or more excitation filters may also be configured to filter the excitation radiation emitted by a light source of the second plurality of light sources of a predetermined range of wavelengths to pass through thereof.

The device may include a thermal sensor for thermal imaging of the target. In this regard, the processor may be configured to detect the problematic cellular entity based on the first image of the first plurality of images, the second image obtained from the second plurality of images, the three-dimensional image, and a thermal image of the target using the analysis model. In such a scenario, the processor may create a composite image of the first image, the second image, the three-dimensional image, and the thermal image using the analysis model. Furthermore, the interface may display a result corresponding to the detection of the problematic cellular entity and the composite image of the first image, the second image, the three-dimensional of the target, and the thermal image of the target.

The device may include a ranging sensor operable to determine a distance of the target from the device for positioning the device at a predetermined distance from the target. In an example, the three-dimensional image capturing sensor may be used as a ranging sensor. For instance, the three-dimensional image capturing sensor may be operable to determine the distance of the target from the device for positioning the device at a predetermined distance from the target.

The device may include a plurality of polarizers. For instance, the device may include a first polarizer positioned between the first plurality of light sources and the target to let the excitation radiation of the first plurality of light sources of a first polarization to pass through. The device may include a second polarizer positioned between the target and the imaging sensor to let the light emitted by the target of a second polarization to pass through. In an example, the first polarization and the second polarization may be same. In another example, the first polarization and the second polarization may be different. In an example, the first polarization and the second polarization may be same. For instance, in an example, the first polarization and the second polarization may be a Left-Handed Circular polarization (LHCP). In another example, the first polarization and the second polarization may be a Right-Handed Circular Polarization (RHCP). In another example, the first polarization and the second polarization may be different. For instance, the first polarization may be one of: LHCP or RHCP and the second polarization may be other of: LHCP or RHCP. The plurality of polarizers can be combined with the first set of excitation filters.

The device may include an enclosure to house the components. In particular, the device may include a first housing, a second housing, a bridge. The first housing may house the imaging module and the second housing may house the interfacing module. The bridge may connect the imaging module and the interfacing module. The bridge may include an electronic interface to enable electronic communication between the processor of the interfacing module and the imaging module. The electronic interface may include a Camera Serial Interface (CSI), a serial management bus such as an I2C interface, System Packet Interface (SPI), a universal asynchronous receiver-transmitter (UART), a general-purpose input/output (GPIO) interface, a Universal Serial Bus (USB) interface, a pulse width modulation (PWM) interface, Display-Serial Interface (DSI), a High-Definition Multimedia Interface (HDMI), or a combination thereof.

The device may include a portable power module operable to power components of the device, such as the imaging module and the interfacing module. A third housing may house the portable power module.

In an example, the device may transmit the result to a remote system, such as a cloud server. For instance, the processor may be configured to transmit the result and the composite image of the first image, the three-dimensional image to a remote system, such as a cloud server, and the like. The remote system may be in electronic communication with the device. Since the device enables transmission of the result, the composite image, to a cloud server, a non-medical professional or medical professional may transmit the image or series of images to a remotely located medical professional for additional consultation prior to treatment using the device(s) of the present disclosure.

The interface may be configured to receive an input, by using an Application Programming Interface (API), from a user corresponding to an operation of the device. For example, using the API, the user may be able to select one or more of the first plurality of light sources, one or more of the second plurality of light sources for illuminating the target. In addition, the user may be able to select frequency of light emission of the first plurality of light sources and the second plurality of light sources.

The interface may be configured to, in response to the input, transmit the result corresponding to the detection and classification of pathogens in the target upon the detection and the classification of the pathogen using the API. In this regard, the interface may allow a user to store and analyze the result corresponding to the detection and classification of the pathogens in the target. In addition, the interface may allow user to select the composite images to be obtained and may enable transmission of the result to the remote system or to a remote server, and may also allow user to select various views of the composite images.

In an example, the processor may be configured to detect time-dependent changes in fluorescence emerging from the target. In other words, the processor may be configured to detect changes from fluorescence between a first imaging of the target relative to a subsequent imaging of the target. For instance, the processor may be configured to detect changes in fluorescence between pre-debridement of a wound and post-debridement of the wound. The detection may enable to accurately remove the dead/unhealthy tissue from the wound. In another example, the processor may be configured to detect changes in fluorescence between an image of the wound taken on a first day and an image of the wound taken on a subsequent day. The detection may help in ascertaining healing of the wound and allow a medical practitioner to administer medications according to the detection.

In the aforementioned examples, the device was explained with without an optical bandpass filter provided to filter the light emitted by the target. However, in some example, one or more optical bandpass filters, such as emission filters, may be used.

Accordingly, in an example, a device for examining a target may include an imaging module, an interfacing module, and an interface. The imaging module may include a first plurality of light sources, a first plurality of optical bandpass filters, an imaging sensor, and a three-dimensional image capturing sensor. Each of the first plurality of light sources may be configured to emit excitation radiation at a predetermined range of wavelengths that cause one or more markers in the target to fluoresce. In an example, each of the first plurality of light sources may be LED. In another example, one or more light sources of the first plurality of light sources may be a Pulsed Light Emitting Diode (LED) to emit pulses of excitation radiation to enable faster imaging and to reduce ambient light interference in the light emitted by the target. The first plurality of light sources may be, for example, homogenous light sources or non-homogenous light sources.

Each of the first plurality of optical bandpass filters may be configured to filter light emitted by the target in response to illumination thereof by at least one or more light sources of the first plurality of light sources of a predetermined wavelength to pass through thereof. The imaging sensor may capture the filtered light filtered by an optical bandpass filter of the first plurality of optical bandpass filters and to capture a first plurality of images formed based on the filtered light. In an example, the device may include one or more lens integrated with the imaging sensor to focus light onto the imaging sensor and to capture the image.

The three-dimensional image capturing sensor may illuminate the target and may receive light reflected by the target in response to the illumination thereof by the three-dimensional image capturing sensor and may generate a three-dimensional image of the target based on the reflected light. In an example, the three-dimensional image capturing sensor may be a structured-light sensor, a time-of-flight sensor, a stereo sensor, or a combination thereof.

The interfacing module may be coupled to the imaging module. The interfacing module may include a processor. The processor may be configured to analyze a first image of the first plurality of images using an analysis model. The first image may be a fluorescence-based image comprising fluorescence emerging from the target. The processor may analyze the three-dimensional image of the target to determine variation in intensity of the light emitted across a spatial region of the target by compensating for variation in distance across the spatial region of the target from the three-dimensional image capturing sensor and by compensating for variation in curvature across the spatial region of the target using the analysis model. The processor may detect presence of a problematic cellular entity in the target based on the analysis of the first image and the three-dimensional image using the analysis model. The analysis model may be trained for detecting the presence of problematic cellular entities in targets.

The analysis model is trained for detecting the presence of problematic cellular entities in targets. In particular, the analysis model may be trained using a plurality of reference fluorescence-based images for detecting the presence of problematic cellular entities in targets. The analysis model may be trained to differentiate between fluorescence in the fluorescence-based image emerging from the problematic cellular entity and fluorescence in the fluorescence-based image emerging from regions other than the problematic cellular entity.

In an example, in addition to being trained by the plurality of reference fluorescence-based images, the analysis model may be trained using a plurality of reference three-dimensional images of the targets for detecting the presence of problematic cellular entities in targets. In this regard, the analysis model may be trained to differentiate between fluorescence in the fluorescence-based image emerging from the problematic cellular entity and fluorescence in fluorescence-based image emerging from regions of other than the problematic cellular entity. In addition, the analysis model may be trained by compensating for differences in distance across the spatial region of the target relative to the three-dimensional image capturing sensor and by compensating for differences in curvature across the spatial region of the target by determining variation in intensity of the light emitted across the spatial region of the target. The variation in the intensity of the light emitted across the spatial region of the target may be determined based on variation in distances across the spatial region of the target relative to the three-dimensional image capturing sensor, variation in curvature across the spatial region of the target, and on an intensity measured across the spatial region of the target.

The processor may create a composite image of the first image and the three-dimensional image of the target. The interface may display a result corresponding to the detection of the problematic cellular entity and the composite image of the first image and the three-dimensional image of the target.

In an example, the device may include a first set of excitation filters. Each of the first set of excitation filters may be configured to filter the excitation radiation emitted by a light source of the first plurality of light sources of a predetermined range of wavelengths to pass through thereof to illuminate the target. In addition, one or more excitation filters may also be configured to filter the excitation radiation emitted by a light source of the second plurality of light sources of a predetermined range of wavelengths to pass through thereof.

In an example, the device may include a System-on-Module (SOM). The SOM may include the imaging module, the interfacing module, and a plurality of light source drivers. The plurality of light source drivers may be configured to regulate a respective light source of the first plurality of light sources.

The processor may also be configured to activate the first plurality of light sources for emitting light onto the target and activate the imaging sensor to capture light emitted by the target in response to illumination of the target by the at least one or more light sources of the first plurality of light sources.

In an example, the device may include an emission filter wheel rotatably disposed within the imaging module. The emission filter wheel operably coupled to a servo motor. The emission filter wheel may include the first plurality of optical bandpass filters. As will be understood, based on required optical bandpass filter from out of the first plurality of optical bandpass filters, the servo motor may be actuated to position the required optical bandpass filter between the target and the imaging sensor. In this regard, the processor may be configured to activate the servo motor to rotate the emission filter wheel to position an optical bandpass filter of the first plurality of optical bandpass filters positioned between the target and the imaging sensor.

In the above examples, the capturing of images and the processing of the device were explained to be with reference to a single device. In some examples, the capturing of images and the processing may be performed by different components. Accordingly, in an example, a system for examining a target may include a processor. The processor may analyze, using an analysis model, a first image of a first plurality of images. The first plurality of images may be a fluorescence-based image comprising fluorescence emerging from the target. The processor may be configured to analyze a three-dimensional image of the target to determine variation in intensity of light emitted across a spatial region of the target by compensating for variation in distance across the spatial region of the target from the three-dimensional image capturing sensor and by compensating for variation in curvature across the spatial region of the target using the analysis model.

The processor may detect presence of a problematic cellular entity in the target based on the analysis of the first image and the three-dimensional image using the analysis model. The analysis model may be trained for detecting the presence of problematic cellular entities in targets. The processor may create a composite image of the first image and the three-dimensional image of the target. The processor may transmit, to a device, a result corresponding to the detection of the problematic cellular entity and the composite image of the first image and the three-dimensional image of the target.

The system may include the device. The device may include an imaging module including a first plurality of light sources, an imaging sensor, and a three-dimensional image capturing sensor. Each of the first plurality of light sources may emit excitation radiation at a predetermined range of wavelengths that cause one or more markers in the target to fluoresce. The imaging sensor may be configured to directly receive light emitted by the target in response to illumination thereof by one or more light sources of the first plurality of light sources without an optical bandpass filter being disposed between the imaging sensor and the target and to capture a first plurality of images formed based on the emitted light. Here, the light is said to be directly received by the imaging sensor because the light emitted is not filtered by an optical bandpass filter before capturing of the image.

The three-dimensional image capturing sensor may illuminate the target to receive light reflected by the target in response to the illumination thereof by the three-dimensional image capturing sensor may generate the three-dimensional image of the target based on the reflected light. In an example, the three-dimensional image capturing sensor may be a structured-light sensor, a time-of-flight sensor, a stereo sensor, or a combination thereof. The target may be a wound region, an edible product, a laboratory equipment, a medical equipment, a body fluid, a sanitary device, a sanitary equipment, a biochemical assay chip, a microfluidic chip, or a combination thereof. The analysis model may be trained using a plurality of reference fluorescence-based images and a plurality of reference three-dimensional images for detecting the presence of problematic cellular entities in targets. The analysis model may be trained to differentiate between fluorescence in the fluorescence-based image emerging from the problematic cellular entity and fluorescence in fluorescence-based image emerging from regions of other than the problematic cellular entity.

In some examples, when the target is a wound, the present subject matter enables detection of biofilms in the wound. In this regard, a device for examining a wound may include an imaging module, an interfacing module, and an interface. The imaging module may include a first plurality of light sources, a second plurality of light sources, an imaging sensor, and a three-dimensional image capturing sensor. Each of the first plurality of light sources may emit excitation radiation at a predetermined range of wavelengths that cause one or more markers in the wound to fluoresce. The first plurality of light sources may be, for example, homogenous light sources or non-homogenous light sources.

Each of the second plurality of light sources may emit excitation radiation at a predetermined range of wavelengths without causing the marker in the wound to fluoresce. The imaging sensor may directly receive light emitted by the wound in response to illumination thereof by at least one or more light sources of the first plurality of light sources and to directly receive light reflected by at least one or more light sources of the second plurality of light sources without an optical bandpass filter being disposed between the imaging sensor and the wound. The imaging sensor may capture a first plurality of images formed based on the light emitted by the wound and may capture a second plurality of images formed based on the light reflected by the wound. Here, the light is said to be directly received by the imaging sensor because the light emitted and the light reflected is not filtered by an optical bandpass filter before capturing of images.

The three-dimensional image capturing sensor may illuminate the wound and may receive light reflected by the wound in response to the illumination thereof by the three-dimensional image capturing sensor and may generate a three-dimensional image of the wound based on the reflected light. In an example, the three-dimensional image capturing sensor may be a structured-light sensor, a time-of-flight sensor, a stereo sensor, or a combination thereof.

The interfacing module may be coupled to the imaging module. The interfacing module may include a processor. The processor may be configured to analyze, using an analysis model, a first image of the first plurality of images, wherein the first image is a fluorescence-based image comprising fluorescence emerging from the wound. The processor may analyze, using the analysis model, a second Image obtained from the second plurality of images. Further, the processor may analyze, using the analysis model, the three-dimensional image of the wound to determine variation in intensity of the light emitted and of the reflected light across a spatial region of the wound by compensating for variation in distance across the spatial region of the wound from the three-dimensional image capturing sensor and by compensating for variation in curvature across the spatial region of the wound.

In this regard, the processor may detect, using the analysis model, presence of a biofilm in the wound based on the analysis of the first image, the second image, and the three-dimensional image. The analysis model may be trained for detecting the presence of biofilms in wounds. The analysis model may create a composite image of the first image, the second image, and the three-dimensional image of the wound. The interface may display a result corresponding to the detection of the biofilm in the wound and the composite image of the first image, the second image, and the three-dimensional image of the wound.

In an example, the device may include a first set of excitation filters. Each of the first set of excitation filters may be configured to filter the excitation radiation emitted by a light source of the first plurality of light sources of a predetermined range of wavelengths to pass through thereof to illuminate the target.

The present subject matter enables providing faster image capturing and processing to detect the problematic cellular entities. Since in the present subject matter, the processor and the imaging module are provided on-board, the present subject matter enables faster capturing and processing of images. In particular, by using the combination of the CPU and the GPU, the present subject matter enables capturing and processing of images at a frequency of more than 30 images per second. The analysis model is trained over several reference fluorescence-based images and several reference three-dimensional images for detecting the presence of the problematic cellular entity in the target, thereby increasing the accuracy of the detection. The present subject matter ensures that the emission of light by the light sources are at a different frequency than ambient light source. Therefore, the present subject matter enables elimination of the ambient light interference with the light emitted by the target. Further, in the present subject matter, the pulsed LEDs may be actuated at shorter pulse widths such as from 100 s of ns to 0.005 ms, faster frequency, such as from 100 Hz to tens of MHz. Therefore, the present subject matter enables faster capturing of the first plurality of images and the three-dimensional images and reduces ambient light interference (background interference). Therefore, the present subject matter eliminates the background information and enhances the accuracy of the detection.

Further, in an example, the analysis model may ignore the background light and excitation light in the fluorescence-based image, and may pick up even the weak fluorescence information in the fluorescence-based image. Thus, in an example, the present subject matter also eliminates the use of an emission filter for filtering the background light and excitation light and use of a filter wheel. Thus, the device of the present subject matter is simple and cost-effective.

In the present subject matter, the variation in distance between the imaging sensor and a plurality of regions across the spatial region of the target and the variation in curvature of a plurality of regions across the spatial region of the target is determined by the three-dimensional image capturing sensor. Accordingly, the present subject matter will enhance accuracy in detection of the problematic cellular entities, particularly, for targets, such as wounds. Since the device enables transmission of the result the composite image to a cloud server, a non-medical professional or medical professional may transmit the image or series of images to a remotely located medical professional for additional consultation prior to treatment using the device(s) of the present disclosure.

Thus, the present subject matter provides a rapid, optionally filter-less, non-invasive, automatic, and in-situ detection and classification of pathogens using an "opto-computational biopsy" technique. The opto-computational biopsy technique is a technique in which multispectral imaging is used along with the computational models, such as machine learning models, Artificial Neural Network (ANN) models, deep learning models, and the like, for non-invasive biopsy to detect and classify the problematic cellular entities.

The present subject matter can be used for detecting the presence of problematic cellular entities in diabetic foot ulcers, surgical site infections, burns, skin, and interior of the body, such as esophagus, stomach, and colon. The device of the present subject matter can be used in the fields of dermatology, cosmetology, plastic surgery, infection management, photodynamic therapy monitoring, and anti-microbial susceptibility testing.

Further, the device may be used to detect the time-dependent changes in the fluorescence to understand colonization of pathogens and necrotic tissue. In other words, the processor may be configured to detect changes from fluorescence between a first imaging of the target relative to a subsequent imaging of the target. For instance, the processor may be configured to detect changes in fluorescence between pre-debridement of a wound and post-debridement of the wound. The detection may enable to accurately remove the dead/unhealthy tissue from the wound. In another example, the processor may be configured to detect changes in fluorescence between an image of the wound taken on a first day and an image of the wound taken on a subsequent day. The detection may help in ascertaining healing of the wound and allow a medical practitioner to administer medications according to the detection.

The device can be integrated into normal clinical procedures and can be used in telemedicine and tele healthcare. Further, most of the clinically relevant pathogens may be detected and classified in a few minutes. Further, data acquisition and analysis may happen automatically. Therefore, the device can be operated easily without requiring skillful technicians. This feature helps in quickly deciding the treatment protocol. The device may also be used for detection and classification of pathogens in resource scarce settings. The device of the present subject matter can also be used in endoscopy. For instance, the imaging module of the present subject matter may be incorporated in an imaging unit of an endoscopy device.

The device of the present subject matter may be used for quantification of various pathogens present in the sample. The device may also be used for monitoring wound healing and wound closure. The device may also be used to study anti-microbial susceptibility by observing and analyzing the target by exposing the target to various antibiotics. For example, the device may be used to study bacterial grown with nutrients and antibiotics, and corresponding biomarker signatures may be recorded. This information may be used to obtain information on the antibiotics to be prescribed based on the antimicrobial susceptibility of the particular bacteria. It is to be understood that antimicrobial susceptibility of other pathogens, such as fungi, may also be studied. Further, dose and concentration of antibiotics can also be decided based on dilution factors, to determine the dosage of the antibiotics or antifungals to be given.

The device may be configured to study biomolecular composition of various pathogens and their kinetic behavior based on their fluorescence signatures. The device may also be used to in cosmetology. For example, the device may be used to detect the presence of *Propionibacterium* which causes acnes. The device may also be used during tissue grafting to ensure that the tissue is free of pathogens. The device may be used for forensic detection, for example, to detect the pathogens in body fluids such as saliva, blood, mucus, and the like. The device may be configured to study effectiveness of disinfectants on various hospital surfaces such as beds, walls, hands, gloves, bandages, dressings, catheters, endoscopes, hospital equipment, sanitary devices, and the like.

The device may also be used to detect pathogen presence in hands and on surfaces, for example, in hospitals and other places that are to be free of pathogens. The device may be used to detect pathogen contamination in edible products, such as food, fruits, and vegetables.

FIG. 1 illustrates a block diagram of a device 100 for examining a target 101, in accordance with an implementation of the present subject matter. The device 100 for examining a target may include the imaging module 102, the interfacing module 104, and the interface 108. The target 101 may be suspected of having a problematic cellular entity, such as a pathogen or a cancerous tissue. In an example, the target 101 may be made of one or more cells, and may be, for example, a wound in a body part or a tissue sample. In other examples, the target 101 may be an article that is to be free of pathogens, such as an edible product, a laboratory equipment, or a sanitary equipment. In some other examples, the target 101 may be pus, blood, urine, saliva, sweat, semen, mucus, plasma, water, and the like, that may be suspected of having a pathogen.

The imaging module 102 may include the first plurality of light sources 130, the imaging sensor 122, and the three-dimensional image capturing sensor 120. Each of the first plurality of light sources 130 is to emit excitation radiation at a predetermined range of wavelengths. In particular, the emitted excitation radiation may be of a single wavelength or a wavelength band that causes one or more markers in the target to fluoresce when illuminated. In an example, wavelength bands of the light that are used to elicit fluorescence from the target 101 may include 200 nm-300 nm, 300 nm-400 nm, 400 nm-500 nm, or 500 nm-600 nm. In a particular example, the wavelengths of the light that are used to elicit fluorescence from the target 101 may include 280 nm, 310 nm, 330 nm, 365 nm, 395 nm, 405 nm, 415 nm, 430 nm, 480 nm, and 520 nm. In an example, the wavelength bands of the light may include 600 nm-700 nm, 700 nm-800 nm, or 800 nm-1000 nm. In a particular example, the wavelength of the light that are used to elicit fluorescence from the target 101 may also include 430 nm, 630 nm, 660 nm, 680 nm, 735 nm, 830 nm, 880 nm, 940 nm, and 970 nm.

The first plurality of light sources 130 may be, for example, homogenous light sources or non-homogenous light sources. In an example, the use of non-homogenous light sources may enable reducing or eliminating background light in light emitted by the target.

The one or more markers may be part of the problematic cellular entity. The fluorescence emitted by the marker that is part of the problematic cellular entity may be referred to as autofluorescence. In an example, an exogenous marker, such as a synthetic marker, may be sprayed on the target 101 to cause detection of the problematic cellular entity in the target 101. The exogenous marker may bind to cellular entities, such as deoxyribonucleic acid (DNA), Ribonucleic acid (RNA), proteins, biochemical markers, and the like, which may cause the target 101 to fluoresce. The fluorescence emitted by the added synthetic marker may also be referred to as exogenous fluorescence.

In an example, the imaging sensor 122 may be configured to directly receive the light emitted by the target 101 in response to illumination thereof by at least one or more light sources of the first plurality of light sources 130 without an optical bandpass filter being disposed between the imaging sensor 122 and the target 101 and to capture a first plurality of images formed based on the light emitted. If the target 101 includes a marker that fluoresces, the captured image includes fluorescence, and may be referred to as a fluorescence-based image. Therefore, the fluorescence-based image may include fluorescence emerging from the target 101. Here, the light is said to be directly received by the imaging sensor 122 because the light emitted is not filtered by an optical bandpass filter before capturing of the image.

The imaging sensor 122 may be a multispectral camera configured to capture the light emitted by the target 101 at a plurality of wavelengths. In particular, the multispectral camera may capture the light emitted at wavelengths in visible region, Ultraviolet (UV) region, Near-Infra Red (NIR) region, or a combination thereof. In another example, the imaging sensor 122 may be a charge coupled device (CCD) sensor, a CCD digital camera, a complementary metal-oxide semiconductor (CMOS) sensor, a CMOS digital camera, a single-photon avalanche diode (SPAD), a single-photon avalanche diode (SPAD) array, an Avalanche Photodetector (APD) array, a photomultiplier tube (PMT) array, a Near-infrared (NIR) sensor, a Red Green Blue (RGB) sensor, a thermal camera, or a combination thereof. In an example, one or more lens (not shown in FIG. 1) may be integrated with the imaging sensor 122 to focus the light onto the imaging sensor 122 and to capture the images.

The three-dimensional image capturing sensor 120 may illuminate the target 101 and may receive light reflected by the target 101 in response to the illumination thereof by the three-dimensional image capturing sensor 120 and may generate a three-dimensional image of the target 101 based on the reflected light. To illuminate the target 101, the three-dimensional image capturing sensor 120 may include one or more light sources (not shown in FIG. 1) integrated with the three-dimensional image capturing sensor 120. However, in some examples, separate light sources may also be coupled with the three-dimensional image capturing sensor 120 to illuminate the target 101 and to enable capturing of the light reflected by the target 101 due to the illumination.

In addition, the use of the three-dimensional image capturing sensor 120 may enable determination of variation in the intensity of the light emitted by the target 101 across a spatial region of the target 101. The variation in the intensity may have to be factored in for due to difference in distance of a plurality of regions across a spatial region of the target 101 from the three-dimensional image capturing sensor 120. For instance, a first spatial region of the target 101 may be at a distance that is different from a second spatial region of the target 101 relative to the three-dimensional image capturing sensor 120. Accordingly, the first spatial region and the second spatial region may emit fluorescence at same intensity. Since the fluorescence of the first spatial region and the second spatial region are of same intensity, spatial region that is farther from the device 100 may appear to be weaker relative to spatial region that is closer to the device 100. For instance, assume that the second spatial region is farther from the device 100 than the first spatial region. Accordingly, the fluorescence emitted by the second spatial region may appear to be weak. Therefore, variation in distance across the spatial region of the target 101 relative to the device 100 may have to be compensated in the light emitted by the target 101. In an example, different spatial regions across the target 101 have different curvatures. Hence, the fluorescence light emitting from different spatial regions of the targets even at same distance from the imaging sensor 122 may be different. Therefore, variation in curvature across the spatial region of the target 101 relative to the device 100 may have to be compensated in the light emitted by the target 101. In an example, the three-dimensional image capturing sensor may be a structured-light sensor, a time-of-flight sensor, a stereo sensor, or a combination thereof.

The interfacing module 104 may be coupled to the imaging module. The interfacing module 104 may include a processor 140. The processor 140 may be implemented as a microprocessor, a microcomputer, a microcontroller, a digital signal processor, a central processing unit, a combination of Central Processing Unit and a Graphics Processing Unit, a state machine, a logic circuitry, and/or any device that can manipulate signals based on operational instructions. Among other capabilities, the processor 140 may fetch and execute computer-readable instructions included in a memory (not shown in FIG. 1) of the device 100.

The processor 140 may be configured to analyze images corresponding to the target 101. In particular, the processor 140 may analyze a first image of the first plurality of images using an analysis model. The first plurality of images may be fluorescence-based images comprising fluorescence emerging from the target 101. Further, the processor 140 may analyze the three-dimensional image of the target 101 by compensating for variation in distance across the spatial region of the target 101 relative to the three-dimensional image capturing sensor 120 in the light emitted by the target 101. In this regard, the processor 140 may determine variation in intensity of the light emitted across the spatial region of the target 101 by compensating for the variation in distance across the spatial region of the target 101 relative to the three-dimensional image capturing sensor 120 and by compensating for variation in distance across the spatial region of the target 101 relative to the three-dimensional image capturing sensor 120. The analysis model may be, for example, an Artificial Neural Network model (ANN) a Machine Learning (ML) model or a combination thereof. In an example, the ANN model may include a deep learning model, such as a transformer model, a convolutional neural network (CNN), a generative adversarial network (GAN), an auto-encoder decoder network, or a combination thereof. The ML model may be, for example, a support vector machine (SVM) model or a random forest model or a combination thereof.

The processor 140 may detect presence of a problematic cellular entity in the target 101 based on the analysis of the first image and the three-dimensional image using the analysis model. The analysis model is trained for detecting the presence of problematic cellular entities in targets. In particular, the analysis model may be trained using a plurality of reference fluorescence-based images for detecting the presence of problematic cellular entities in target. The analysis model may be trained to differentiate between fluorescence in the fluorescence-based image emerging from the problematic cellular entity and fluorescence in the fluorescence-based image emerging from regions other than the problematic cellular entity.

In an example, in addition to being trained by the plurality of reference fluorescence-based images, the analysis model may be trained using a plurality of reference three-dimensional images of the targets for detecting the presence of problematic cellular entities in targets. In this regard, the analysis model may be trained to differentiate between fluorescence in the fluorescence-based image emerging from the problematic cellular entity and fluorescence in fluorescence-based image emerging from regions of other than the problematic cellular entity. In addition, the analysis model may be trained to compensate for differences in distance across the spatial region of the target 101 relative to the three-dimensional image capturing sensor 120 by determining variation in intensity of the light emitted across the spatial region of the target 101. The variation in the intensity of the light emitted across the spatial region of the target 101 may be determined based on variation in distances and curvatures across the spatial region of the target relative to the three-dimensional image capturing sensor 120 and on an intensity measured across the spatial region of the target 101. The training of the analysis model is explained with reference to FIGS. 5 and 6.

Further, the processor 140 may create a composite image of the first image and the three-dimensional image of the target 101 using the analysis model. The interface 108 may display a result corresponding to the detection of the problematic cellular entity and the composite image of the first image and the three-dimensional image of the target 101. The detection of the presence of the problematic cellular entity will be explained below with reference to FIGS. 7-11.

In an example, the device 100 may include a System-on-Module (SOM). The SOM may include the imaging module 102, the interfacing module 104, and a plurality of light source drivers 150. The plurality of light source drivers 150 may be configured to regulate a respective light source of the first plurality of light sources 130. In other words, the device 100 also employs an integrated circuit board that typically contains a SOM. The SOM includes the imaging module 102, the interfacing module 104, and the plurality of light source drivers 150. The plurality of light source drivers 150 may include Metal-Oxide-Semiconductor Field-Effect Transistors (MOSFETS), Bipolar Junction Transistors (BJTs), Phase-locked loops (PLLs) or a combination thereof. In an example, the processor 140 may include a Central Processing unit (CPU) and a Graphics Processing Unit (GPU). The SOM may also include a Field Programmable Gate Array (FPGA) module. In addition, the SOM may include a battery charging module. The SOM may include an integrated circuit (also known as a "chip") that integrates all or most components of a computer or other electronic system. These components almost always include the processor 140, memory interfaces, on-chip input/output device, input/output interfaces, and secondary storage interfaces, often alongside other components such as modems, including radio modems—all on a single substrate or microchip. The SOM 106 may contain digital, analog, mixed-signal and often radio frequency signal processing functions (otherwise it is considered only an application processor). Alternatively, the device 100 may include System-on-a-chip (SOC) instead of an SOM. The SOC may be similar to the SOM.

The SOM 106 may also include the GPU or FPGA or a combination thereof which allows for faster capture, processing and thereby, capturing the images by the imaging sensor 122. Having an on-board FPGA or GPU uniquely allows the imaging sensor 122 to take images at up to 100 frames per second and more typically images greater than 30 frames per second, most typically also greater than 40 frames per second and up to 100 frames per second. The ability to pulse and capture and process images at this faster rate reduces the background noise and allows the ability to extract the fluorescence/oxygenation information accurately. The device 100 employing this faster pulsing eliminates any need for a hood or shield to eliminate or reduce ambient light. The device 100 may even be employed outdoors as well as indoors while still obtaining accurate scans of wounds or other target image surfaces. Thus, the device 100 is unshielded from ambient light.

In an example, one or more light sources of the first plurality of light sources 130 is a Pulsed Light Emitting Diode (LED). The processor 140 may be configured to actuate one or more of the light source drivers of the plurality of light source drivers to regulate the pulsed LEDs to emit pulses of excitation radiation. The one or more light source drivers may be actuated by the processor 140 to regulate the pulsed LEDs at shorter pulse widths, faster frequencies that is to enable faster imaging and to reduce ambient light interference in the light emitted by the target 101. In an example, the pulse width may range from 0.005 ms to 100 s of ns. In an example, the frequency of the pulsed LEDs may be from 100 Hz to tens of MHz. Therefore, the present subject matter enables faster capturing of the first plurality of images and the three-dimensional images and reduces ambient light interference (background interference).

In an example, the processor 140 may be configured to operate the imaging sensor 122 and the three-dimensional image capturing sensor 120 to capture and to process the first plurality of images and the three-dimensional image at more than 30 frames per second. In this regard, the processor 140 may include a Central Processing Unit (CPU) and a Graphics Processing Unit (GPU). In particular, the CPU and the GPU may be part of SOM. In other words, the CPU and the GPU may be provided on-board. The CPU may operate the imaging sensor 122 and the three-dimensional image capturing sensor 120 to capture the first plurality of images and the three-dimensional images. Further, the GPU may process the images captured by the first plurality of images and the three-dimensional images. The provision of the GPU and the CPU, in particular, provision of the GPU and the CPU on-board may enable faster processing and capturing of the first plurality of images and the three-dimensional image at more than 30 frames per second.

In some examples, in addition to using fluorescence-based images and three-dimensional images for detecting the presence of problematic cellular entity, the device 100 may detect the presence of the problematic cellular entity based on oxygenation. In this regard, the device 100 may include a second plurality of light sources 156 for illuminating the target 101 without causing the marker in the target 101 to fluoresce. Each of the second plurality of light sources 156 may be configured to emit the light with a wavelength in a Near-Infra Red (NIR) region or a visible region.

The imaging sensor 122 may be configured to capture a second plurality of images formed based on light reflected by the target 101 in response to illumination thereof by at least one or more light sources of the second plurality of light sources 156. The processor 140 may analyze a second image obtained from the second plurality of images to identify oxygenation at a plurality of regions in the target 101 using the analysis model. The processor 140 may analyze, using the analysis model, the three-dimensional image of the target 101 to determine variation in intensity of the light reflected across a spatial region of the target 101 by compensating for variation in distance across the spatial region of the target 101 from the three-dimensional image capturing sensor 120 and for variation in curvature across the spatial region of the target 101.

The processor 140 may detect the presence of the problematic cellular entity in the target 101 based on the analysis of the first image of the first plurality of images, the second image obtained from the second plurality of images, and the three-dimensional image using the analysis model. In such a case, the processor 140 may create a composite image of the first image, the second image, and the three-dimensional image of the target 101. The interface 108 may display a result corresponding to the detection of the problematic cellular entity and the composite image of the first image, the second image, and the three-dimensional image of the target 101.

In an example, the analysis model may utilize white light images in addition to the first image and the three-dimensional image of the target 101 to detect the problematic cellular entity. In this regard, in an example, at least one or more of the second plurality of light sources 156 may be configured to emit light with a wavelength in the visible region. The imaging sensor 122 may be configured to capture a third plurality of images formed based on light reflected by the target 101 in response to illumination thereof by the at least one or more light sources of the second plurality of light sources 156. The third plurality of images are white light images. The processor 140 may be configured to analyze, using the analysis model, a third image obtained from the third plurality of images.

The processor 140 may analyze, using the analysis model, the three-dimensional image of the target 101 to determine variation in intensity of the light reflected across a spatial region of the target by compensating for variation in distance across the spatial region of the target from the three-dimensional image capturing sensor and for variation in curvature across the spatial region of the target 101. The processor 140 may be configured to detect, using the analysis model, a presence of a problematic cellular entity in the target based on the analysis of the first image, the third image, and the three-dimensional image of the target 101. The processor 140 may be configured to create a composite image of the target 101 using the first image, the third image, and the three-dimensional image. The interface 108 may be configured to display a result corresponding to the detection of the problematic cellular entity and the composite image of the first image, the third image, and the three-dimensional image of the target 101. As will be understood, in such a case, the analysis model may be trained using a plurality of reference fluorescence-based images, a plurality of reference white light images, and a plurality of reference three-dimensional images to detect the presence of problematic cellular entity in the target 101.

The processor 140 may be configured to activate the first plurality of light sources 130 for emitting light onto the target 101 and activate the second plurality of light sources 156 for emitting light onto the target 101. In addition, the processor 140 may be configured to activate the imaging sensor 122 to capture light emitted by the target 101 in response to illumination of the target 101 by the at least one or more light sources of the first plurality of light sources 130 and to capture light emitted by the target 101 in response to illumination of the target 101 by the at least one or more light sources of the second plurality of light sources 156.

In an example, to reduce and/or eliminate the effect of background light in the captured images, the processor 140 may be configured to control the first plurality of light sources 130, the second plurality of light sources 156 to illuminate at a frequency other than a frequency of an ambient light source. Typically, the ambient lighting in the room will pulse at a frequency, for example, about 50 Hz. The analysis model can compare different images captured by the imaging sensor 122 and remove the background noise since the frequency of the ambient light source and the frequency of the first plurality of light sources 130 are different. Minimizing the background lighting improves the image quality, which allows for more accurate fluorescence and oxygenation sensing by the imaging sensor 122, which leads to better analysis by the analysis model.

The processor 140 may activate the first plurality of light sources 130 when it is to capture the light emitted by the target 101. To this end, the processor 140 may activate the imaging sensor 122 when it activates the first plurality of light sources 130 for emitting light. Typically, when the first plurality of light sources 130 are pulsed LEDs, the first plurality of light sources 130 pulse at a rate that is known, and the imaging sensor 122 captures the first plurality of images at a rate that is a multiple of the first plurality of light sources 130 pulse rate, such that the first plurality of light sources 130 is always 'on' at a time when the visible light camera is taking an image. The capturing of the first plurality of images by the imaging sensor 122 and emitting of the light by the first plurality of light sources 130 at the same time is preferred. The frame rate is typically a multiple of the first plurality of light sources 130 pulsating light rate. The ability to pulsate the light at faster rate reduces the background noise and allows for the ability to do time dependency fluorescence. The faster pulse rate also reduces blurring and variation in the images taken. Also, because the frequency of the light being pulsed is known, the device 100 is able to examine only the fluctuation of the first plurality of light sources 130 because the frequency thereof is known. Background can be eliminated because the background is constant. The device 100 has a hardware fast switch which uses elements such as fast MOSFETS, fast BJTs, phased-lock loops (PLLs), or a combination thereof to turn the first plurality of light sources 130 on and off rapidly.

In an example, in addition to detection of the problematic cellular entity, the device 100 may classify the detected problematic cellular entity. Accordingly, in an example, when the target 101 is a wound region, the processor 140 may be configured to extract spatial and spectral features of the wound region from the first image and the three-dimensional image using the analysis model. Further, the processor 140 may identify location of the wound region based on the extraction of the spatial and the spectral features by using the analysis model. The processor 140 may determine contour of the wound region based on the extraction of the spatial and the spectral features by using the analysis model. In an example, based on the determination of the contour of the wound region, the processor 140 may be configured to determine a length of the wound region, a width of the wound, a perimeter of the wound, an area of the wound, a depth of the wound, or a combination thereof, based on the determination of the contour of the wound region. Further, the processor 140 may detect pathogen in the wound region based on the extraction of the spatial and the spectral features by using the analysis model. The processor 140 may classify pathogen by at least one of: family, genus, species, or strain of the pathogen by using the analysis model.

In an example, in addition to the detection of the problematic cellular entities, the device 100 may determine other parameters corresponding to the detected problematic cellular entities. For instance, when the target 101 is a wound region, the processor 140 may be configured to determine degree of infection of the wound region, spatial distribution of pathogens in the wound region, a healing rate of the wound region, or a combination thereof in response to detecting the presence of the problematic cellular entity. When the target 101 is a tissue, the processor 140 is configured to detect the presence of the problematic cellular entity as a cancerous tissue, a necrotic tissue, or a combination thereof, in the tissue sample. When the target 101 is a sanitary device, a sanitary equipment, a medical equipment, a biochemical assay chip, a microfluidic chip, or a body fluid, the processor 140 may be configured to determine the problematic cellular entity as a pathogen and classify the pathogens in the target 101.

Further, in addition to the detection of the problematic cellular entities, the processor 140 may be configured to detect time-dependent changes in fluorescence emerging from the target 101. In other words, the processor 140 may be configured to detect changes from fluorescence between a first imaging of the target 101 relative to a subsequent imaging of the target 101. For instance, the processor 140 may be configured to detect changes in fluorescence between pre-debridement of a wound and post-debridement of the wound. The detection may enable to accurately remove the dead/unhealthy tissue from the wound. In another example, the processor 140 may be configured to detect changes in fluorescence between an image of the wound taken on a first day and an image of the wound taken on a subsequent day. The detection may help in ascertaining healing of the wound and allow a medical practitioner to administer medications according to the detection.

In an example, the device 100 may be portable and may comprise a smart phone. The smart phone may include the processor 140 and the imaging sensor 122. In addition, the smart phone may include the three-dimensional image capturing sensor 120. In an example, the smartphone may be integrated with various light sources 130, 156, polarizers, filters 142, and the like.

In an example, the device 100 may include other components. The device 100 may include a first set of excitation filters 142. Each of the first set of excitation filters 142 may be configured to filter the excitation radiation emitted by a light source of the first plurality of light sources 130 of a predetermined range of wavelengths to pass through thereof to illuminate the target 101. In addition, one or more excitation filters may also be configured to filter the excitation radiation emitted by a light source of the second plurality of light sources 156 of a predetermined range of wavelengths to pass through thereof.

The device 100 may include a thermal sensor (not shown in FIG. 1) for thermal imaging of the target 101. The thermal sensor may be, for example, as part of the imaging module 102. In this regard, the processor 140 may be configured to detect the problematic cellular entity based on the first image of the first plurality of images, the second image obtained from the second plurality of images, the three-dimensional image, and a thermal image of the target 101 using the analysis model. In such a scenario, the processor 140 may create a composite image of the first image, the second image, the three-dimensional image, and the thermal image using the analysis model. Furthermore, the interface 108 may display a result corresponding to the detection of the problematic cellular entity and the composite image of the first image, the second image, the three-dimensional image of the target 101, and the thermal image of the target 101.

The device 100 may include a ranging sensor 132 operable to determine a distance of the target 101 from the device 100 for positioning the device 100 at a predetermined distance from the target 101. The ranging sensor 132 may be, for example, part of the imaging module 102. In an example, the three-dimensional image capturing sensor 120 may be used as the ranging sensor 132. In this regard, the three-dimensional image capturing sensor 132 may be operable to determine a distance of the target 101 from the device 100 for positioning the device 100 at a predetermined distance from the target 101.

In an example, the device 100 may be free of polarizers. In another example, the device 100 may include a plurality of polarizers (not shown in FIG. 1). For instance, the device 100 may include a first polarizer positioned between the first plurality of light sources 130 and the target 101 to let the excitation radiation of the first plurality of light sources 130 of a first polarization to pass through. The device 100 may include a second polarizer positioned between the target 101 and the imaging sensor to let the light emitted by the target 101 of a second polarization to pass through. In an example, the first polarizer may be aligned 90 degrees from the second polarizer. The provision of the polarizer in front of the imaging sensor 122 may prevent excitation light from entering the imaging sensor 122.

In an example, the first polarization and the second polarization may be same. For instance, in an example, the first polarization and the second polarization may be a Left-Handed Circular polarization (LHCP). In another example, the first polarization and the second polarization may be a Right-Handed Circular Polarization (RHCP). In another example, the first polarization and the second polarization may be different. For instance, the first polarization may be one of: LHCP or RHCP and the second polarization may be other of: LHCP or RHCP. The plurality of polarizers can be combined with the first set of excitation filters 142.

In addition, optionally light diffusers may also be placed in front of the first plurality of light sources 130, and/or the second plurality of light sources 156, and/or the excitation filters 142 to better spread the light onto the target 101.

The device 100 may include an enclosure to house the components, as will be explained with reference to FIGS. 2*a*-2*c*. In particular, the device 100 may include a first housing, a second housing, a bridge. The first housing may house the imaging module and the second housing may house the interfacing module 104. The bridge may connect the imaging module and the interfacing module 104. The bridge may include an electronic interface to enable electronic communication between the processor 140 of the interfacing module 104 and the imaging module. The electronic interface may include a Camera Serial Interface 108 (CSI), a serial management bus such as an I2C interface, System Packet Interface (SPI), a universal asynchronous receiver-transmitter (UART), a general-purpose input/output (GPIO) interface, a Universal Serial Bus (USB) interface, a pulse width modulation (PWM) interface, Display-Serial Interface (DSI), a High-Definition Multimedia Interface (HDMI), or a combination thereof.

To enable powering of the components of the device 100, such as the imaging module and the interfacing module 104, the device 100 may include the portable power module 136. The portable power module 136 may include the third housing 37 to house the portable power module 136.

In an example, the device 100 may transmit the result to a remote system, such as a cloud server 160. For instance, the processor 140 may be configured to transmit the result and the composite image of the first image, the three-dimensional image to a remote system, such as a cloud server, and the like. The remote system may be in electronic communication with the device 100. Since the device 100 enables transmission of the result the composite image to a cloud server, a non-medical professional or medical professional may transmit the image or series of images to a remotely located medical professional for additional consultation prior to treatment using the device 100(*s*) of the present disclosure.

In an example, the interface 108 may be an interactive display, such as LED display, Liquid Crystal Display, Thin Film Transistor Display, Organic Light Emitting Diode (OLED) Display, Capacitive Touch Screen, Resistive Touch Screen, Toggle Switches, Buttons. The digital displays and buttons enable the users to use and manipulate the device 100 easily. The interface 108 may also be a stand alone device 100, such as a laptop, a desktop, a tablet, a smart phone, a smart accessory, such as a smart watch, or a combination thereof.

The interface 108 may be configured to receive an input, by using an Application Programming Interface 108 (API), from a user corresponding to an operation of the device 100. For example, using the API, the user may be able to select one or more of the first plurality of light sources 130, one or more of the second plurality of light sources 156 for illuminating the target 101. In addition, the user may be able to select frequency of light emission of the first plurality of light sources 130 and the second plurality of light sources 156.

The interface 108 may be configured to, in response to the input, transmit the result corresponding to the detection and classification of pathogens in the target 101 upon the detection and the classification of the pathogen using the API. In this regard, the interface 108 may allow a user to store and analyze the result corresponding to the detection and classification of the pathogens in the target 101. In addition, the interface 108 may allow user to select the composite images to be obtained and may enable transmission of the result to the remote system or to a remote server, and may also allow user to select various views of the composite images.

Figures 2A, 2B:
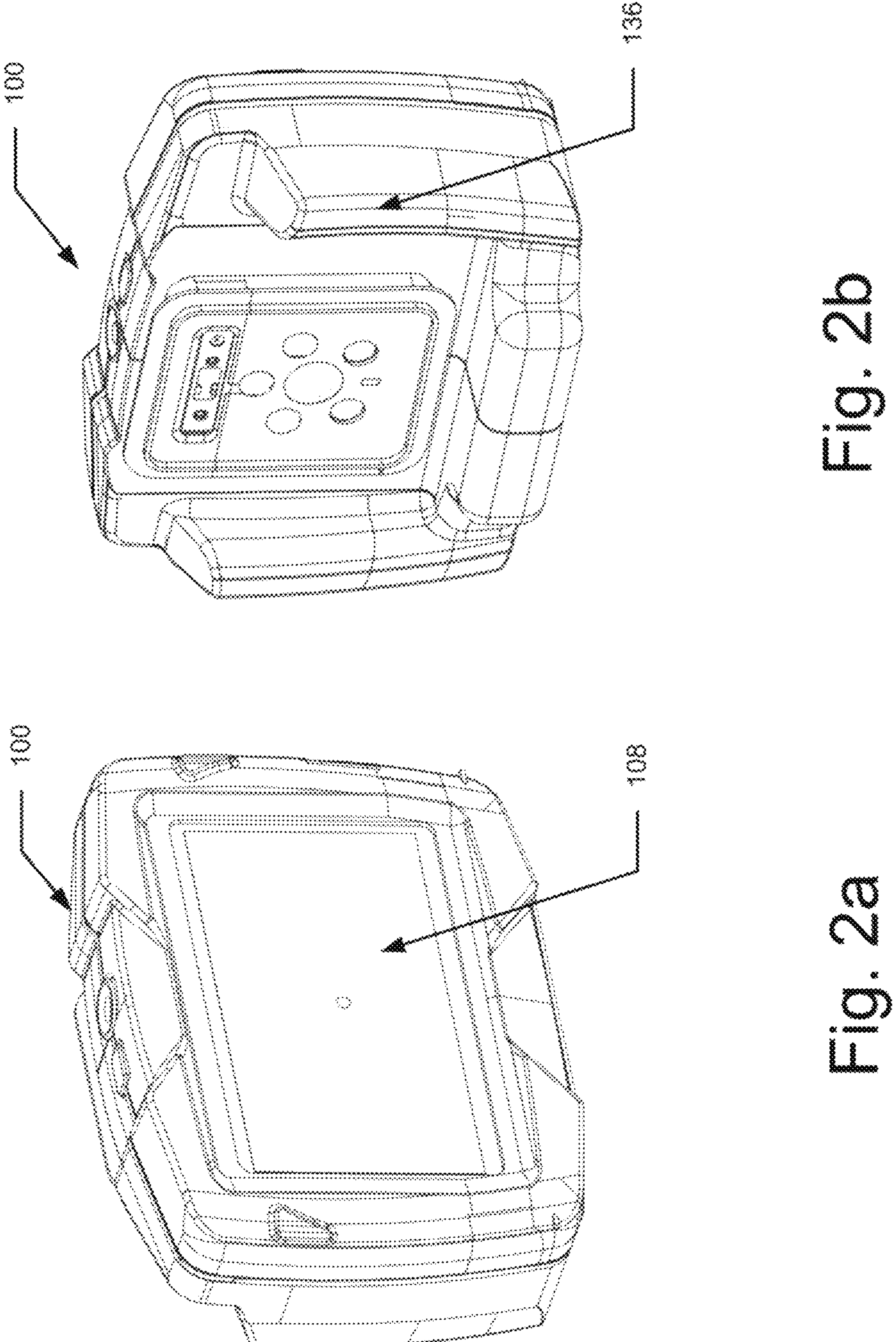
FIG. 2*a* illustrates a front perspective view of a device for examining a target, in accordance with an implementation of the present subject matter.
FIG. 2*b* illustrates a rear perspective view of a device for examining a target, in accordance with an implementation of the present subject matter.

FIG. 2*a* illustrates a front perspective view of the device 100 for examining the target 101, in accordance with an implementation of the present subject matter. FIG. 2*b* illustrates a rear perspective view of the device 100 for examining the target 101, in accordance with an implementation of the present subject matter. FIG. 2*c* illustrates an exploded view of the device 100 for examining the target 101, in accordance with an implementation of the present subject matter. For the sake of brevity, FIGS. 2*a*-2*c* are explained in conjunction with each other.

Herein the SOM 210 is depicted. In an example, assembly of the imaging module 102 may be held together by a rear frame 134 and a connection bracket 236. The rear frame 134 and the connection bracket 236 together form the first housing to enclose the imaging module 102.

Figure 2C:
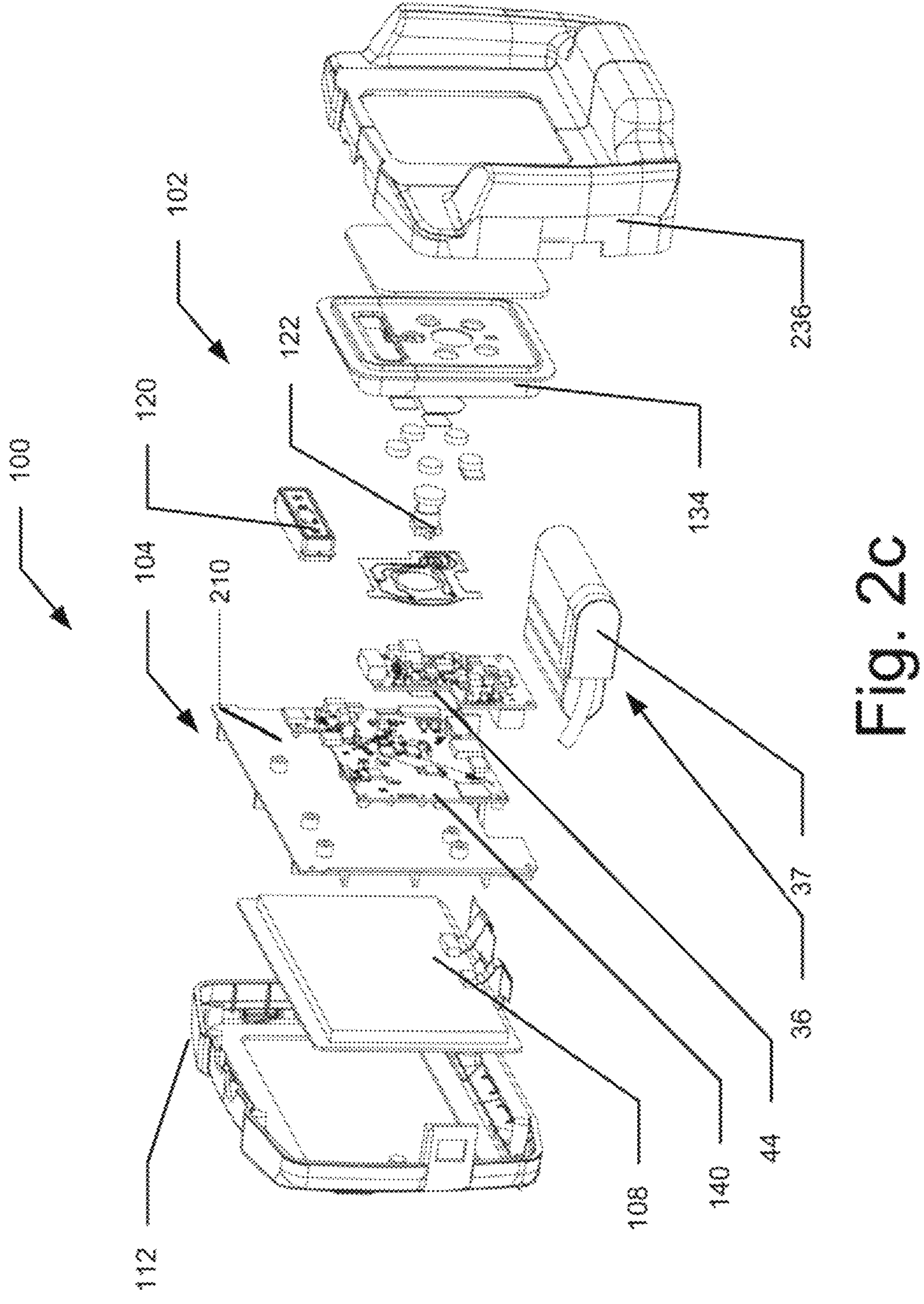
FIG. 2*c* illustrates an exploded view of a device for examining a target, in accordance with an implementation of the present subject matter.

In an example, the imaging module 102 and the interfacing module 104 may be joined by a bridge (not shown in FIGS. 2*a*-2*c*). The bridge may stably hold the imaging module 102 and the interfacing module 104 together and allows electronic communication between elements of the imaging module 102 and the interfacing module 104 through a Camera Serial Interface (CSI), a serial management bus such as an I2C interface, System Packet Interface (SPI), a universal asynchronous receiver-transmitter (UART), a general-purpose input/output (GPIO) interface, a Universal Serial Bus (USB) interface, a pulse width modulation (PWM) interface, Display-Serial Interface (DSI), High-Definition Multimedia Interface (HDMI), or any other electronic connection known in the art.

The processor 140 and the interface 108 each may fixedly, mechanically attached to a bracket (not shown in FIGS. 2*a*-2*c*), while directly electronically coupling to one another through a bus bar, a serial cord, or any other cord known in the art from the processor to the user interface 108. The bracket may then be sandwiched between a rear frame 112 and a front frame (not shown in FIGS. 2*a*-2*c*), holding the interfacing module 104 together. The rear frame 112 and the front frame may together from the second housing to house the interfacing module 104. The processor 140 may be, for example, include random access memory (RAM), flash memory, a WiFi and/or cellular data antenna, a BLUETOOTH® antenna, and other interfaces to allow various peripherals to be electronically attached. BLUETOOTH® is a short-range wireless technology standard that is used for exchanging data between fixed and mobile devices over short distances and building personal area networks (PANs). BLUETOOTH® employs UHF radio waves in the ISM bands, from 2.402 GHz to 2.48 GHz.

The processor 140 may connect to the cloud server 160 (shown in FIG. 1) through WiFi or cellular data antenna for uploading and downloading data for imaging sensor 122 directions and further analysis of captured images and three-dimensional point clouds. In an example, all hardware drivers for the device 100 may be on-board with one or more components of the imaging module 102, such as the first plurality of light sources 130, the first set of excitation filters 142, the light source drivers 150, the second plurality of light sources 156, and the like, separate. The processor 140 allows for extremely fast switching/instructions to activate the light sources 130, 156, which provides many advantages to the device 100.

The portable power module 136 may include a rechargeable battery 46 electronically coupled to a power printed circuit board (PCB) 44. The power PCB 44 and the rechargeable battery 46 may be sandwiched between front and rear covers (not shown in FIGS. 2*a*-2*c*). The front and the rear cover may form the third housing. The third housing, accordingly, enables housing the portable power module 136. A power cord (not shown in FIGS. 2*a*-2*c*) may be electrically attached to the power PCB 44 and exit through the covers. Further, in an example, the device 100 may operate with a drape (not shown in FIGS. 2*a*-2*c*) to reduce the ambient light.

Figure 4A:
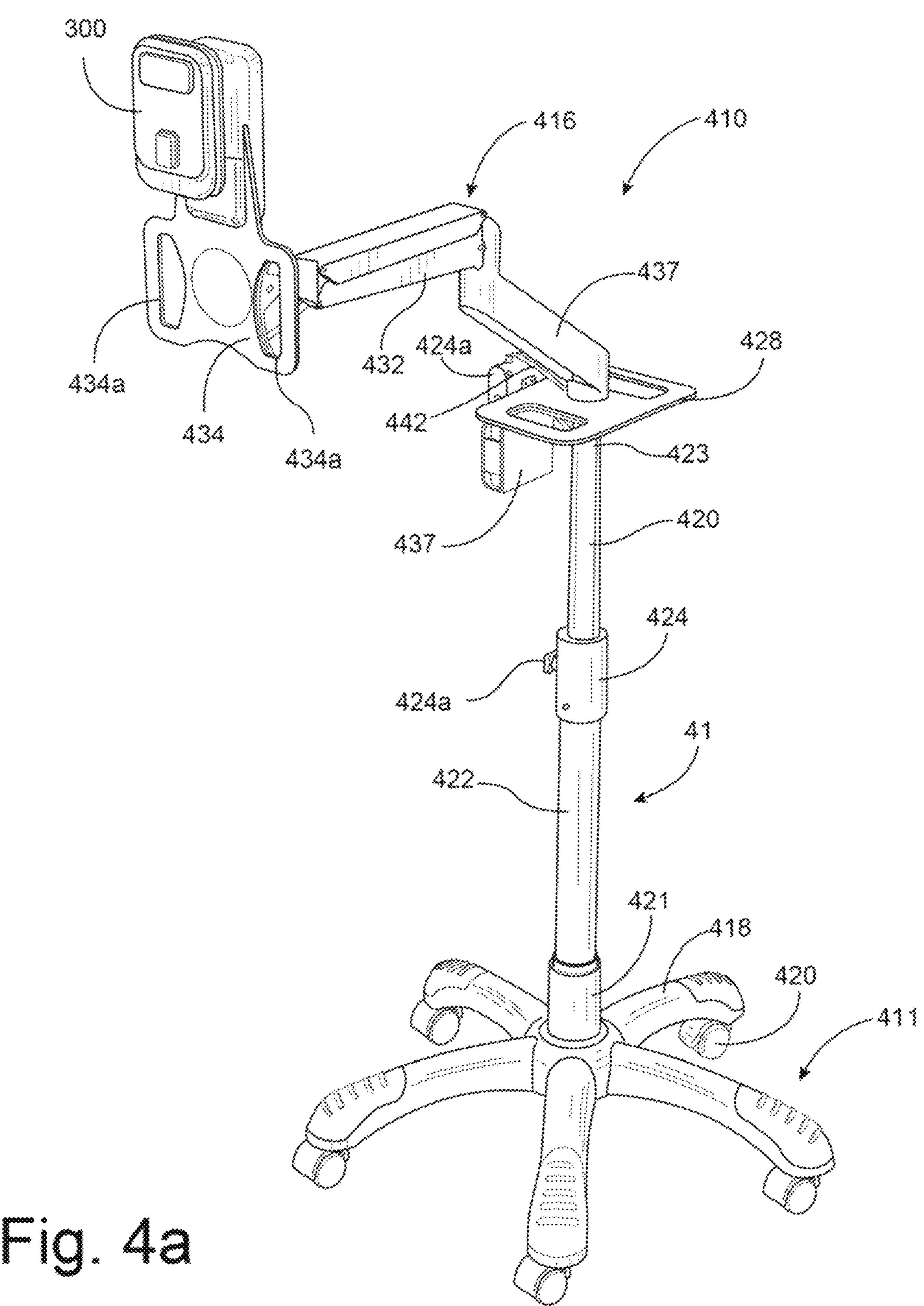
FIG. 4*a* illustrates a perspective view of a device for examining a target, in accordance with an implementation of the present subject matter.
Figure 4B:
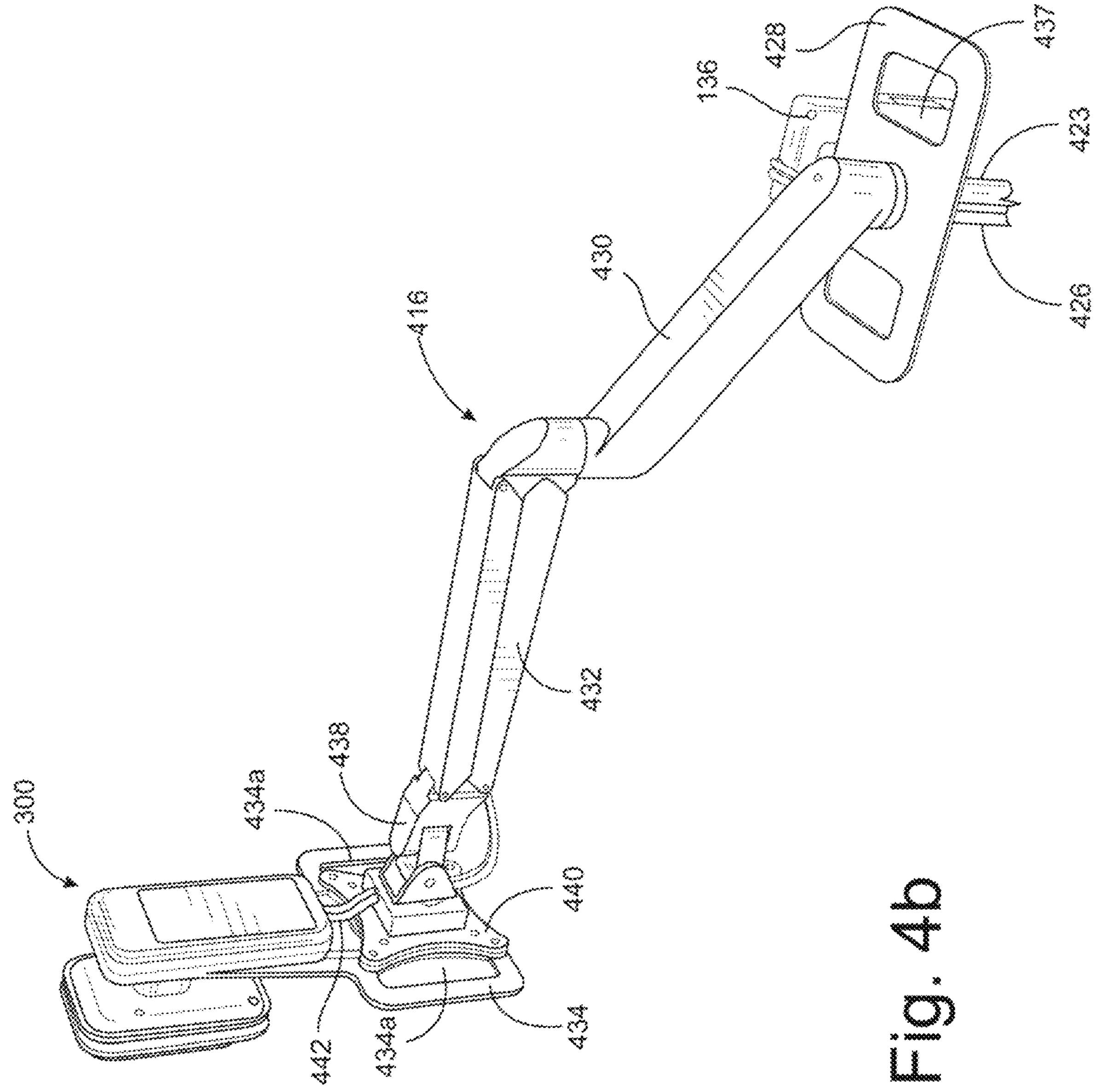
FIG. 4*b* illustrates a perspective view of a device for examining a target, in accordance with an implementation of the present subject matter.

Further, although not shown herein, the device 100 may be coupled to a portable stand, such as a stand 410, depicted in FIGS. 4*a*-4*b*.

In the aforementioned examples, the device was explained with without an optical bandpass filter provided to filter the light emitted by the target. However, in some example, one or more optical bandpass filters, such as emission filters, may be used.

Figure 3:
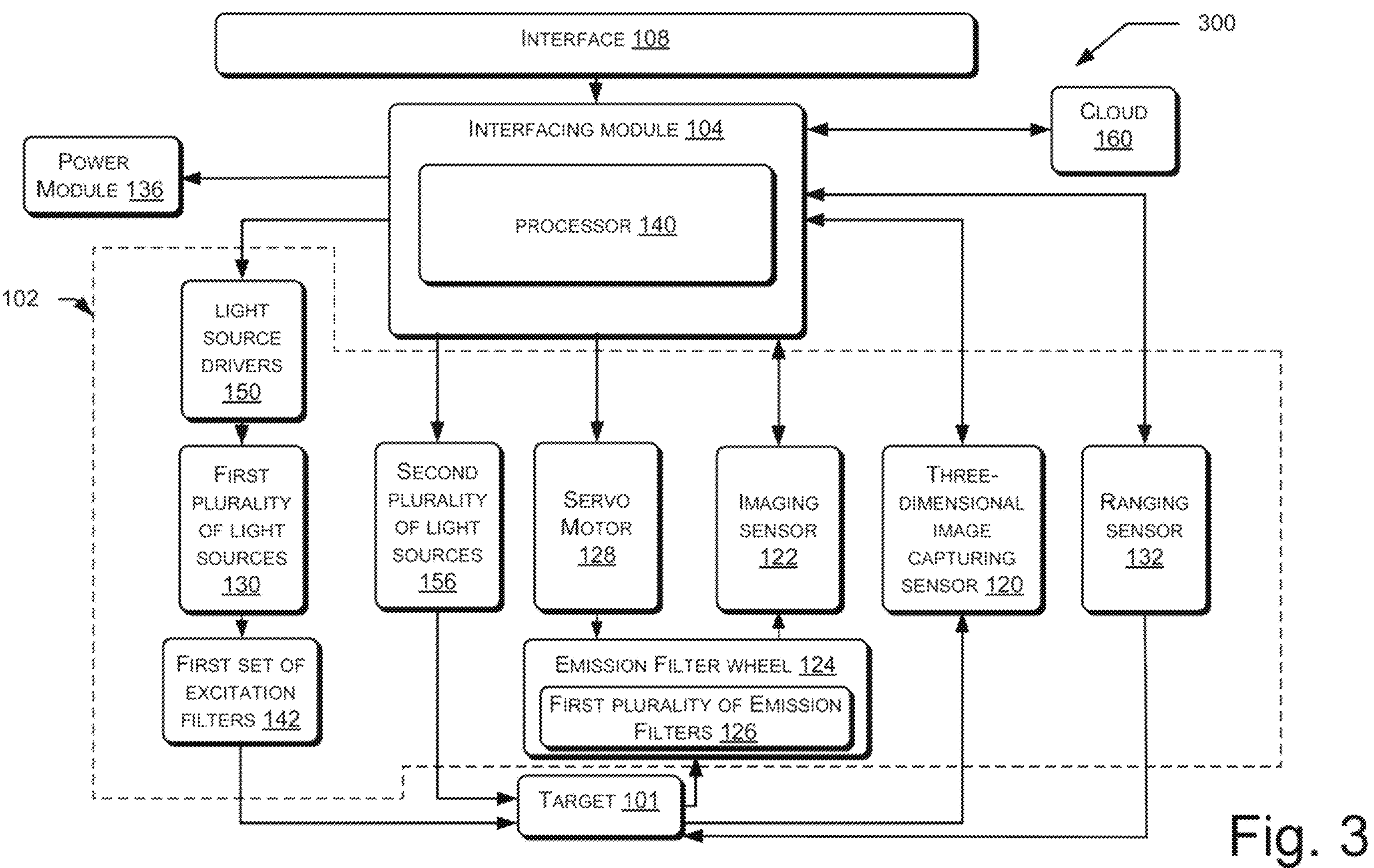
FIG. 3 illustrates a block diagram of a device for examining a target, in accordance with an implementation of the present subject matter.

FIG. 3 illustrates a block diagram of the device 300 for examining a target 101, in accordance with an implementation of the present subject matter. The device 300 may correspond to the device 100 and may include same components as the device 100. Therefore, the components of the device 100 included in the device 300 are explained with the same reference numerals. In addition, the device 300 may include emission filters, as will be explained below. As will be understood, in addition to the functions explained herein, the device 300 may perform some or all the functions performed by the device 100 using appropriate components mentioned with reference to the device 100.

The device 300 for examining the target 101 may include the imaging module 102, the interfacing module 104, and the interface 108. The imaging module 102 may include the first plurality of light sources 130, the first plurality of optical bandpass filters 126, the imaging sensor 122, and the three-dimensional image capturing sensor 120.

The first plurality of light sources 130 may emit light for illuminating the target 101. The target 101 may be suspected of having a problematic cellular entity, such as a pathogen or a cancerous tissue. In an example, the target 101 may be made of one or more cells, and may be, for example, a wound in a body part or a tissue sample. In other examples, the target 101 may be an article that is to be free of pathogens, such as an edible product, laboratory equipment, or sanitary equipment. The emitted light may be in a wavelength band that causes a marker in the target 101 to fluoresce when illuminated. In particular, the emitted light may be of a single wavelength that causes a marker in the target 101 to fluoresce when illuminated. The light from the first plurality of light sources 130 may be emitted at a specific frequency as well. The frequency may be tuned to an integer multiple of the frequency of an imaging sensor 122, such that the imaging sensor 122 is taking images when the first plurality of light sources 130 are illuminated. The frequency may also be tuned to be different from the frequency of the ambient light source within the room. This ensures that the first plurality of light sources 130 is illuminating the target at a time when the ambient light source is off, thus enabling the background images to more easily be filtered and removed from the analysis.

The marker is typically part of the problematic cellular entity. The fluorescence emitted by the marker that is part of the problematic cellular entity may be referred to as autofluorescence. In an example, an exogenous marker, such as a synthetic marker, may be sprayed on the target to cause detection of the problematic cellular entity in the target. The exogenous marker may bind to cellular entities, such as deoxyribonucleic acid (DNA), Ribonucleic acid (RNA), proteins, biochemical markers, and the like, which may cause the target to fluoresce. The fluorescence emitted by the added synthetic marker may also be referred to as exogenous fluorescence.

Each of the first plurality of light sources 130 may be configured to emit excitation radiation at a predetermined range of wavelengths that cause one or more markers in the target 101 to fluoresce. In an example, each of the first plurality of light sources 130 may be Light Emitting Diode (LED). In another example, one or more light sources of the first plurality of light sources 130 may be a Pulsed LED to emit pulses of excitation radiation to enable faster imaging and to reduce ambient light interference in the light emitted by the target 101. The first plurality of light sources 130 may be, for example, homogenous light sources or non-homogenous light sources.

In an example, wavelength bands of the light that are used to elicit fluorescence from the target 101 may include 300 nm-300 nm, 300 nm-400 nm, 400 nm-500 nm, or 500 nm-600 nm. In a particular example, the wavelengths of the light that are used to elicit fluorescence from the target 101 may include 280 nm, 310 nm, 330 nm, 365 nm, 395 nm, 405 nm, 415 nm, 430 nm, 480 nm, and 520 nm. In an example, the wavelength bands of the light may include 600 nm-700 nm, 700 nm-800 nm, or 800 nm-3000 nm. In a particular example, the wavelength of the light that are used may also include 430 nm, 630 nm, 660 nm, 680 nm, 735 nm, 830 nm, 880 nm, 940 nm, and 970 nm for capturing the reflectance and/or scattering.

Each of the first plurality of optical bandpass filters 126 may be configured to filter light emitted by the target 101 in response to illumination thereof by at least one or more light sources of the first plurality of light sources 130 of a predetermined wavelength to pass through thereof. In an example, the optical bandpass filters 126 may have center wavelengths corresponding to the peak emitted fluorescence from various autofluorescence biomarkers or exogenous fluorophores. The optical bandpass filters 126 can be low pass, high pass, single or multiple bandpass filter. The imaging sensor 122 may capture the filtered light filtered by an optical bandpass filter of the first plurality of optical bandpass filters 126 and to capture a first plurality of images formed based on the filtered light. The three-dimensional image capturing sensor 120 may illuminate the target 101 and may receive light reflected by the target 101 in response to the illumination thereof by the three-dimensional image capturing sensor 120 of the first plurality of light sources 130 and may generate a three-dimensional image of the target 101 based on the reflected light. To illuminate the target 101, the three-dimensional image capturing sensor 120 may include one or more light sources (not shown in FIG. 3) integrated with the three-dimensional image capturing sensor 120. However, in some examples, separate light sources may also be coupled with the three-dimensional image capturing sensor 120 to illuminate the target 101 and to enable capturing of the light reflected by the target 101 due to the illumination. In an example, the three-dimensional image capturing sensor 120 may be a structure lighting sensor, a time-of-flight sensor, a stereo sensor, or a combination thereof.

The interfacing module 104 may include a processor 140. The processor 140 may be implemented as a microprocessor, a microcomputer, a microcontroller, a digital signal processor, a central processing unit, a combination of Central Processing Unit and a Graphics Processing Unit, a state machine, a logic circuitry, and/or any device that can manipulate signals based on operational instructions. Among other capabilities, the processor 140 may fetch and execute computer-readable instructions included in a memory (not shown in FIG. 3) of the device 300.

The processor 140 may be configured to analyze a first image of the first plurality of images using an analysis model. The first image may be a fluorescence-based image comprising fluorescence emerging from the target 101. The processor 140 may analyze the three-dimensional image of the target 101 to determine variation in intensity of the light emitted across a spatial region of the target 101 by compensating for variation in distance across the spatial region of the target 101 from the three-dimensional image capturing sensor 120 and by compensating for variation in curvature across the spatial region of the target 101 relative to the three-dimensional image capturing sensor 120 using the analysis model. The processor 140 may detect presence of a problematic cellular entity in the target 101 based on the analysis of the first image and the three-dimensional image using the analysis model. The analysis model may be trained for detecting the presence of problematic cellular entities in targets.

The analysis model is trained for detecting the presence of problematic cellular entities in targets. In particular, the analysis model may be trained using a plurality of reference fluorescence-based images for detecting the presence of problematic cellular entities in targets. The analysis model may be trained to differentiate between fluorescence in the fluorescence-based image emerging from the problematic cellular entity and fluorescence in the fluorescence-based image emerging from regions other than the problematic cellular entity.

In an example, in addition to being trained by the plurality of reference fluorescence-based images, the analysis model may be trained using a plurality of reference three-dimensional images of the targets for detecting the presence of problematic cellular entities in targets. In this regard, the analysis model may be trained to differentiate between fluorescence in the fluorescence-based image emerging from the problematic cellular entity and fluorescence in fluorescence-based image emerging from regions of other than the problematic cellular entity. In addition, the analysis model may be trained to compensate for differences in distance and curvature across the spatial region of the target 101 relative to the Three-dimensional image capturing sensor 120 by determining variation in intensity of the light emitted across the spatial region of the target 101. The variation in the intensity of the light emitted across the spatial region of the target 101 may be determined based on variation in distances across the spatial region of the target relative to the three-dimensional image capturing sensor 120, variation in curvature across the spatial region of the target 101, and on an intensity measured across the spatial region of the target 101. The training of the analysis model is explained with reference to FIGS. 5-6.

The processor 140 may create a composite image of the first image and the three-dimensional image of the target 101. The interface may display a result corresponding to the detection of the problematic cellular entity and the composite image of the first image and the three-dimensional image of the target 101. The detection of the presence of the problematic cellular entity will be explained below with reference to FIGS. 7-11.

In an example, the device 300 may include a System-on-Module (SOM). The SOM may include the imaging module 102, the interfacing module 104, and a plurality of light source drivers 150. The SOM may also include a FPGA module. The plurality of light source drivers 150 may be configured to regulate a light source of the first plurality of light sources 130. In other words, the device 300 also employs an integrated circuit board that typically contains a SOM 106. The SOM 106 includes the imaging module 102, the interfacing module 104, and the plurality of light source drivers 150. In an example, the processor 140 may include a Central Processing unit (CPU) and a Graphics Processing Unit (GPU). In addition, the SOM 106 may include a battery charging module. The SOM 106 may include an integrated circuit (also known as a "chip") that integrates all or most components of a computer or other electronic system. These components almost always include the processor 140, memory interfaces, on-chip input/output device 300*s*, input/output interfaces, and secondary storage interfaces, often alongside other components such as modems, including radio modems—all on a single substrate or microchip. The SOM 106 may contain digital, analog, mixed-signal and often radio frequency signal processing functions (otherwise it is considered only an application processor). Alternatively, the device 300 may include System-on-a-chip (SOC) instead of an SOM. The SOC may be similar to the SOM.

The processor 140 may also be configured to activate the first plurality of light sources 130 for emitting light onto the target 101 and activate the imaging sensor 122 to capture light emitted by the target 101 in response to illumination of the target 101 by the at least one or more light sources of the first plurality of light sources 130.

In an example, the device 300 may include an emission filter wheel 124 rotatably disposed within the imaging module. The emission filter wheel 124 operably coupled to a servo motor 128. The emission filter wheel 124 may include the first plurality of optical bandpass filters 126. As will be understood, based on required optical bandpass filter from out of the first plurality of optical bandpass filters 126, the servo motor 128 may be actuated to position the required optical bandpass filter between the target 101 and the imaging sensor 122. In this regard, the processor 140 may be configured to activate the servo motor 128 to rotate the emission filter wheel to position an optical bandpass filter of the first plurality of optical bandpass filters 126 positioned between the target 101 and the imaging sensor 122. In an example, the device 300 may include a ranging sensor 132 operable to determine a distance of the target 101 from the device 300 for positioning the device 300 at a predetermined position from the target 101.

The device 300 may include a first set of excitation filters 142. Each of the first set of excitation filters 142 may be configured to filter the excitation radiation emitted by a light source of the first plurality of light sources 130 of a predetermined range of wavelengths to pass through thereof to illuminate the target 101. In addition, one or more excitation filters may also be configured to filter the excitation radiation emitted by a light source of the second plurality of light sources 156 of a predetermined range of wavelengths to pass through thereof.

In an example, the three-dimensional image capturing sensor 120 may be used as the ranging sensor 132. In this regard, the three-dimensional image capturing sensor 132 may be operable to determine a distance of the target 101 from the device 100 for positioning the device 100 at a predetermined distance from the target 101. Further, in an example, the device 300 may operate with a drape to reduce ambient light.

While only a few examples of the detection of the problematic cellular entity are explained with reference to the device 300, it will be understood that the device 300 may include further components, such as thermal sensor, and the like similar to the device 100. Further, the device 300 may also carry out analogous functions as the device 300 and may perform detection, classification, and the like of the problematic cellular entity, explained with reference to the device 100.

In an example, the analysis model may utilize white light images in addition to the first image and the three-dimensional image of the target 101 to detect the problematic cellular entity. In this regard, in an example, at least one or more of the second plurality of light sources 156 may be configured to emit light with a wavelength in the visible region. The imaging sensor 122 may be configured to capture a plurality of white light images formed based on light reflected by the target 101 in response to illumination thereof by the at least one or more light sources of the second plurality of light sources 156. The processor 140 may be configured to analyze, using the analysis model, a white light image obtained from the plurality of white light images. The processor 140 may analyze, using the analysis model, the three-dimensional image of the target 101 to determine variation in intensity of the light reflected across a spatial region of the target 101 by compensating for variation in distance across the spatial region of the target 101 from the three-dimensional image capturing sensor 120 and for variation in curvature across the spatial region of the target 101.

The processor may be configured to detect, using the analysis model, a presence of a problematic cellular entity in the target based on the analysis of the first image, the white light image, and the three-dimensional image of the target 101. The processor 140 may be configured to create a composite image of the target 101 using the first image, the white light image, and the three-dimensional image. The interface 108 may be configured to display a result corresponding to the detection of the problematic cellular entity and the composite image of the first image, the white light image, and the three-dimensional image of the target 101. As will be understood, in such a case, the analysis model may be trained using a plurality of reference fluorescence-based images, a plurality of reference white light images, and a plurality of reference three-dimensional images to detect the presence of problematic cellular entity in the target 101.

The device 300 may include the plurality of polarizers. For instance, the device 300 may include a first polarizer positioned between the first plurality of light sources 130 and the target 101 to let the excitation radiation of the first plurality of light sources 130 of a first polarization to pass through. The device 300 may include a second polarizer positioned between the target 101 and the imaging sensor 122 to let the light emitted by the target of a second polarization to pass through. In an example, the first polarization and the second polarization may be same. In another example, the first polarization and the second polarization may be different. In an example, the first polarization and the second polarization may be same. For instance, in an example, the first polarization and the second polarization may be a Left-Handed Circular polarization (LHCP). In another example, the first polarization and the second polarization may be a Right-Handed Circular Polarization (RHCP). In another example, the first polarization and the second polarization may be different. For instance, the first polarization may be one of: LHCP or RHCP and the second polarization may be other of: LHCP or RHCP. The plurality of polarizers can be combined with the first set of excitation filters 142 or the first plurality of emission filters 126, or both.

FIG. 4*a* illustrates a perspective view of the device 300 for examining the target 101, according to an example implementation of the present subject matter. Herein, the device 300 for examining a target (not shown in FIG. 4*a*) and a portable stand 410 are depicted. The portable stand 410 may easily locate and relocate the device 300 to desired locations, especially desired local locations within a given room or medical area, such as a hospital floor or triage space. The portable stand 410 may include a base 411, a telescoping arm 413 engaged with the base 411 at a first end portion 421, and an articulating arm 416 engaged with a second end portion 423. The base 411 may include one or more legs 418 having wheels 420, at least one of which may include a brake (not shown). The wheels 420 may be, for example, casters or other similar wheels having a mount, stem and at least one wheel. There may be additional parts depending on the type of caster and its intended use surface. The casters may be plate casters that mount using a mounting plate, and may have a single wheel or twin wheels. Instead of the wheels 420, the floor engaging end of the one or more legs 418 may have floor glides attached thereto instead of a wheel. The base 411 may allow a user to coarsely locate the device 300 to get near the area necessary for illumination and imaging or to be moved from room to room easily.

The telescoping arm 413 may include a lower arm 422 and an upper arm 426 coupled by a collar 424 that allows for one of the arms 422, 426 to slide within the other and be held in place by a set screw 424*a* having a handle such that the set screw 424*a* may be tightened and loosened easily by hand. The telescoping arm 413 may allow the device 300 to be located in a vertical direction (up/down direction) at the proper height for use. As will be understood, the collar 424 may also be integral with one of the arms 422, 426.

The articulating arm 416 may be configured to allow for the fine location of the device 300 necessary to illuminate and image the specific location on a target without the user taking any image or using the device 300 from holding the device 300 in the user's hands while taking an image using the device 300. Typically, the articulating arm 416 may be located/positioned after the base 411 and telescoping arm 413 are coarsely located near the target. The articulating arm 416 may then be used to precisely locate the device 300 in the position to target the location of an area of the patient or subject to be scanned or otherwise evaluated using the device 300. The articulating arm 416 may include a lower arm 430, an upper arm 432, and a connecting bracket 434, which engages and connects the device 300 to the portable stand 410. The connecting bracket 434 may include one or more generally D-shaped apertures form handles 434*a* that allow the user to move the device 300 into the proper location without stressing the device 300 itself or more typically without even touching the device 300 itself during the positioning process. While generally D-shaped apertures form the handles 434*a*, the handles 434*a* may be created by any form of aperture in the connecting bracket 434, such as a rectangular aperture or a circular aperture. Also, the handle 434*a* or handles could conceivably be created by a separate knob or knob(s) engaged to the connecting bracket 434 using one or more fasteners, such as a screw or bolt system. The lower arm 430 and the upper arm 432 may include hinges that allow for rotational and vertical movement with respect to one another such that the device 300 is precisely located where a practitioner using the device 300 desires.

A bracket 428 may be interposed between the telescoping arm 413 and the articulating arm 416. The bracket 428 may be used for placing thereon or hanging therefrom any medical and/or dental instruments necessary for the practitioner. Also attached to the bracket 428 may engage or include a portable power module 136 either fastened to the bracket 428 or placed within a housing 437 formed on a side or sides of the bracket sized to receive the portable power module 136. The housing 437 is typically an open topped portion of the bracket 428 or separate component that typically has a front, a back, two sides and a bottom with a top open to the air when in use and sized to receive the portable power module 136. The locations where the enclosures sides and other surfaces meet may be partially or fully sealed. The housing 437 conceivably could be made from any material such as cloth or leather, but is more typically a medical grade metal that can be sanitized. In fact, the portable stand 410 as a whole is typically made of materials that may be sanitized using UV or other means periodically as needed.

The portable power module 136 may include a rechargeable battery 46, as will be explained in FIG. 4*d*, that may be plugged into a typical power outlet between uses or conceivably during use if the portable power module 136 were to be already depleted before the next use or potentially depleted during the next use. Using a rechargeable battery system(s) allows the entire assembly to be moved easily from location to location without a constantly plugged in power cord that may be awkward for the practitioner to maneuver around. A plurality of portable power module 136 may be employed in the overall systems of the present disclosure that include the device 300. For example, a "kit" of one or a plurality of portable power module 136 or just rechargeable batteries may be provided in one travel case or enclosure prior to being deployed for use.

FIG. 4*b* illustrates a perspective view of the device 300 for examining the target, in accordance with an implementation of the present subject matter. The interface between the articulating arm 416 and the device 300 is shown in more detail. The distal end of upper arm 432 may include a 2-axis hinge 38 that allows the device 300 to be rotated both vertical direction and lateral direction (i.e., left/right direction and up/down direction). The bracket 434 may be attached through an x-bracket 440 that allows the device 300 to be stably coupled to the articulating arm 416 by removing as much "slop" between the bracket 434 and the articulating arm 416. As will be understood, coupling the bracket 434 with the articulating arm 416 could be accomplished by any coupling known in the art.

The portable power module 136 may have a power cord 442 that extends from the battery 446 (shown in FIG. 4*d*) on the arms 430, 432 and through the hinge 437 to the device 300. As will be understood, that the power cord 442 may be constrained within cord holders attached to any or all of the arms 430, 432 and the hinge 437, or may be freely hanging between the portable power module 136 up to the device 300, or any combination thereof. Typically, the power cord 442 is shielded within the lower arm 430 and the upper arm 432 so that it cannot be harmed or removed from engagement from the lower arm 430 and the upper arm 432.

Figure 4C:
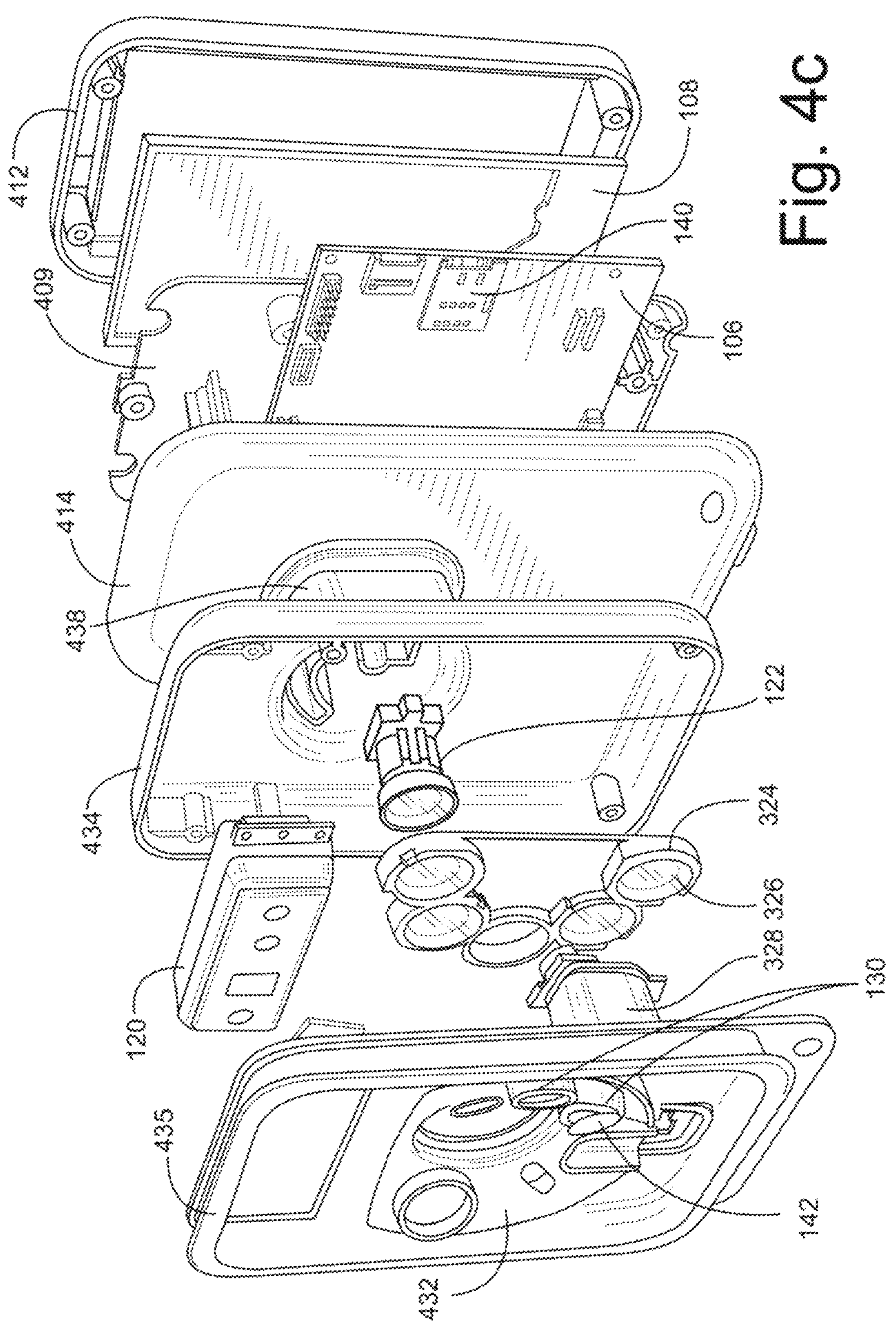
FIG. 4*c* illustrates an exploded view of a device for examining a target, in accordance with an implementation of the present subject matter.

FIG. 4*c* illustrates an exploded view of the device 300 for examining the target, in accordance with an implementation of the present subject matter. The device 300 may include the imaging module 102 and an interfacing module 104 joined by the bridge 438. The processor 140 and the interface 108 each may fixedly, mechanically attached to a bracket 409, while directly electronically coupling to one another through a bus bar, a serial cord, or any other cord known in the art from the processor to the interface 108. The bracket 409 may then be sandwiched between a rear frame 412 and a front frame 414, holding the interfacing module 104 together. The rear frame 412 and the front frame 414 may together from the second housing to house the interfacing module 104. The processor 140 may be, for example, include random access memory (RAM), flash memory, a WiFi and/or cellular data antenna, a BLUETOOTH® antenna, and other interfaces to allow various peripherals to be electronically attached. BLUETOOTH® is a short-range wireless technology standard that is used for exchanging data between fixed and mobile devices over short distances and building personal area networks (PANs). BLUETOOTH® employs UHF radio waves in the ISM bands, from 2.402 GHz to 2.48 GHz.

The processor 140 may connect to a cloud server through the WiFi or cellular data antenna for uploading and downloading data for imaging sensor 122 directions and further analysis of captured images and three-dimensional point clouds. Typically, all hardware drivers for the device 300 are on-board with one or more components of the imaging module 102, such as the light sources 130, 156, the imaging sensor 122, the filters 142, 126, the filter wheel 124, the servo motor 128, the light source drivers 150, the three-dimensional image capturing sensor 120, the imaging sensor 122, the ranging sensor 132, and the like. The processor 140 allows for extremely fast switching/instructions to activate the light sources 130, 156, which provides many advantages to the device 300.

The ability of device 300 to obtain oxygenation and fluorescence data at different distances is a significant advantage of the present systems, which better allow lesser trained or non-medical people to more easily use the devices while obtaining accurate data. The assembly of the imaging module 102 may be held together by a rear frame 435 and a connection bracket 436. The rear frame 435 and the connection bracket 436 together form the first housing to enclose the imaging module 102. The imaging module 102 and the interfacing module 104 may be constructed to be substantially or completely waterproof. While the device 300 shown employs a plurality of visible light and other light filters, the device 300 may be free of visible light filters or other light filters as well.

Figure 4D:
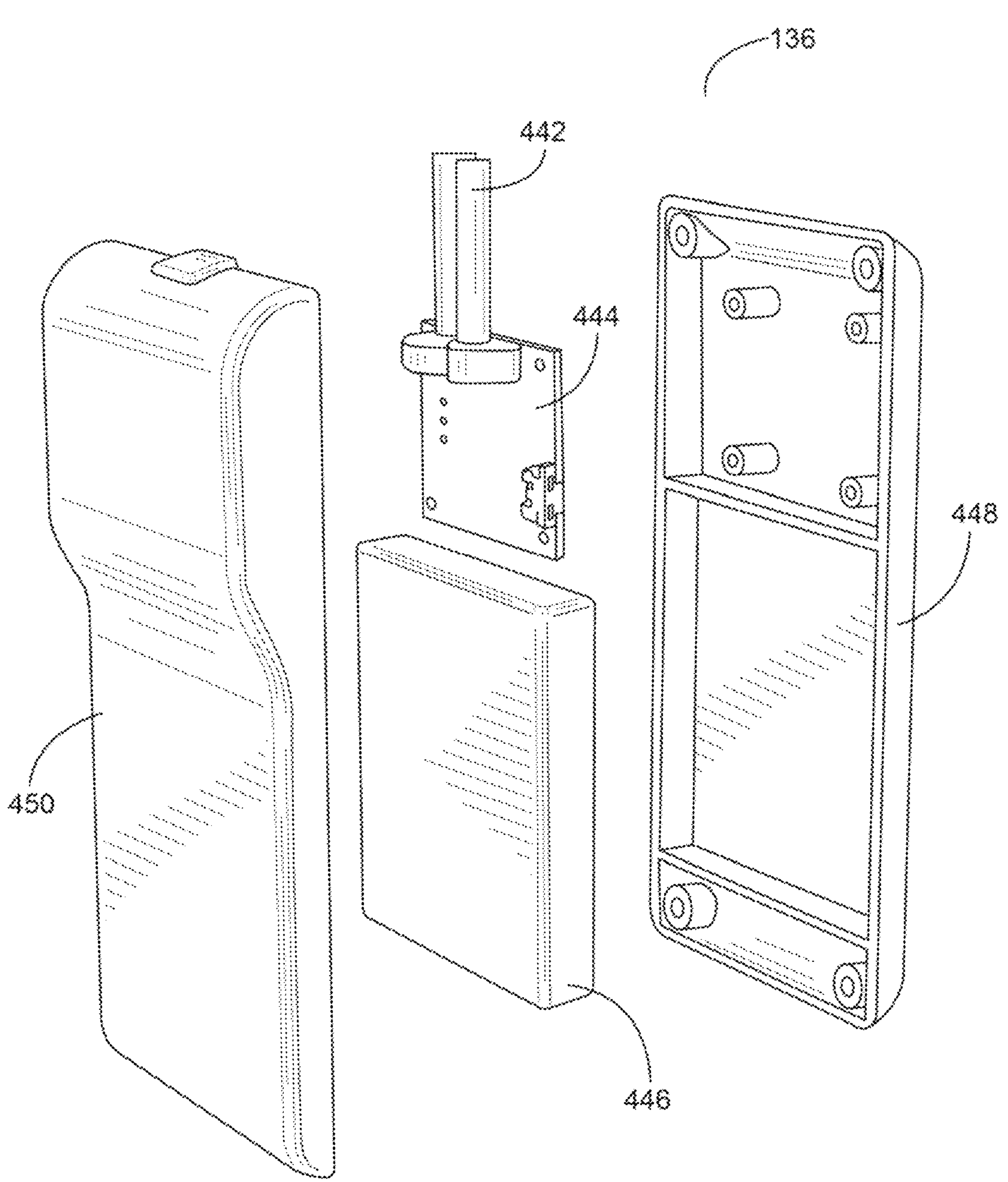
FIG. 4*d* illustrates an exploded view of a portable power module of a device for examining a target, in accordance with an implementation of the present subject matter.

FIG. 4*d* illustrates an exploded view of the portable power module 136 of the device 300 for examining the target, in accordance with an implementation of the present subject matter. The portable power module 136 may include a rechargeable battery 446 electronically coupled to a power printed circuit board (PCB) 444. The power PCB 444 and the rechargeable battery 446 may be sandwiched between front and rear covers 448, 450. The front and the rear cover 448, 450 may form the third housing to enclose the portable power module 136. A power cord 442 may be electrically attached to the power PCB 444 and exit through the covers 448, 450. The power cord 442 typically extends up to the device 300 along the arms of the portable stand 410, but could conceivably be untethered to the portable stand 10 instead.

Figure 4E:
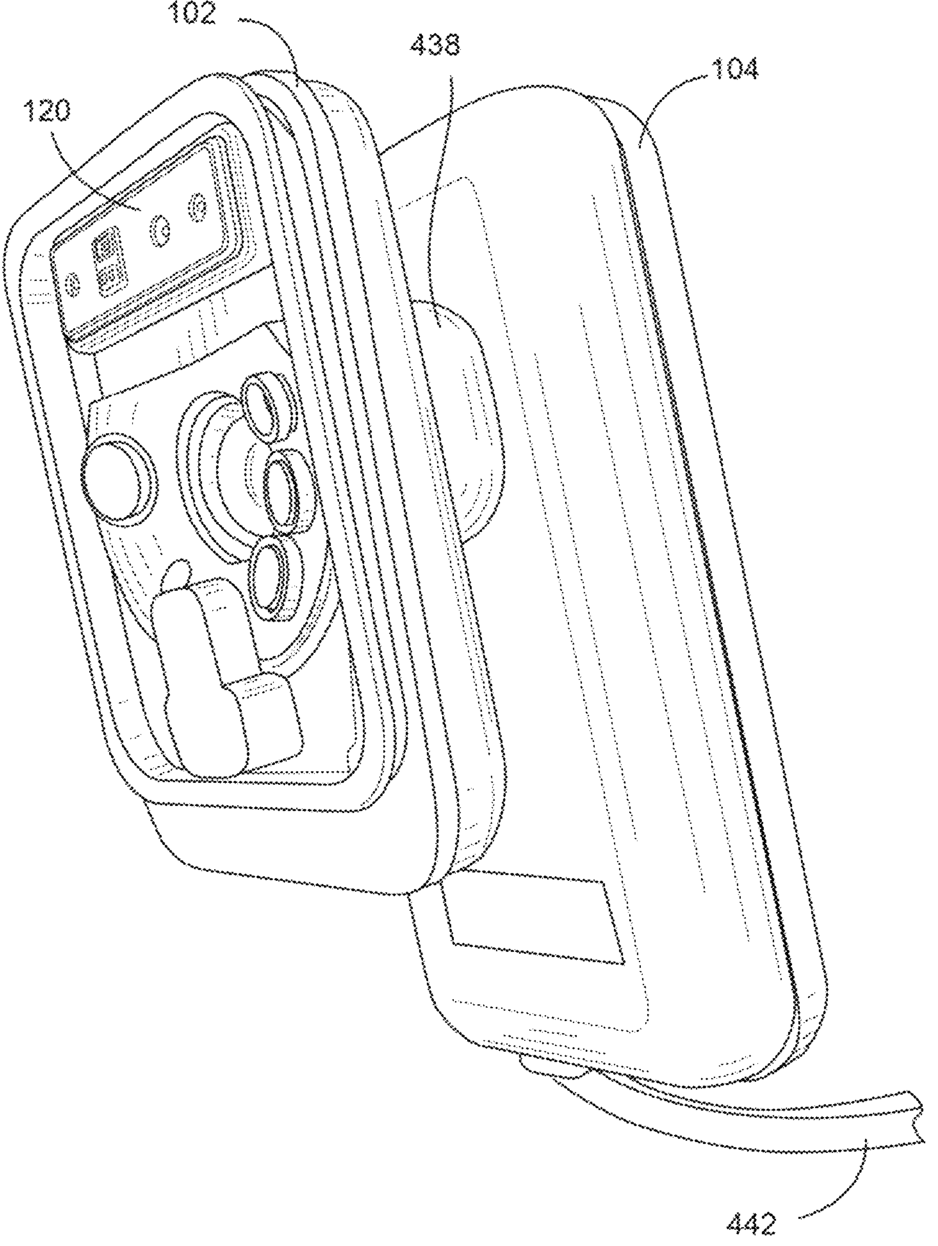
FIG. 4*e* illustrates an exploded view of an interfacing module of a device for examining a target, in accordance with an implementation of the present subject matter.

FIG. 4*e* illustrates an exploded view of the interfacing module 104 of the device 300 for examining the target, in accordance with an implementation of the present subject matter. Herein, the power cord 442 is shown entering the interfacing module 104 up through the bottom of the interfacing module 104. The imaging module 102 and the interfacing module 104 may be mechanically and electrically connected through the bridge 438 that stably holds the imaging module 102 and the interfacing module 104 together and allows electronic communication between elements of the imaging module 102 and the interfacing module 104 through a Camera Serial Interface (CSI), a serial management bus such as an I2C interface, System Packet Interface (SPI), a universal asynchronous receiver-transmitter (UART), a general-purpose input/output (GPIO) interface, a Universal Serial Bus (USB) interface, a pulse width modulation (PWM) interface, Display-Serial Interface (DSI), High-Definition Multimedia Interface (HDMI), or any other electronic connection known in the art.

Figure 5:
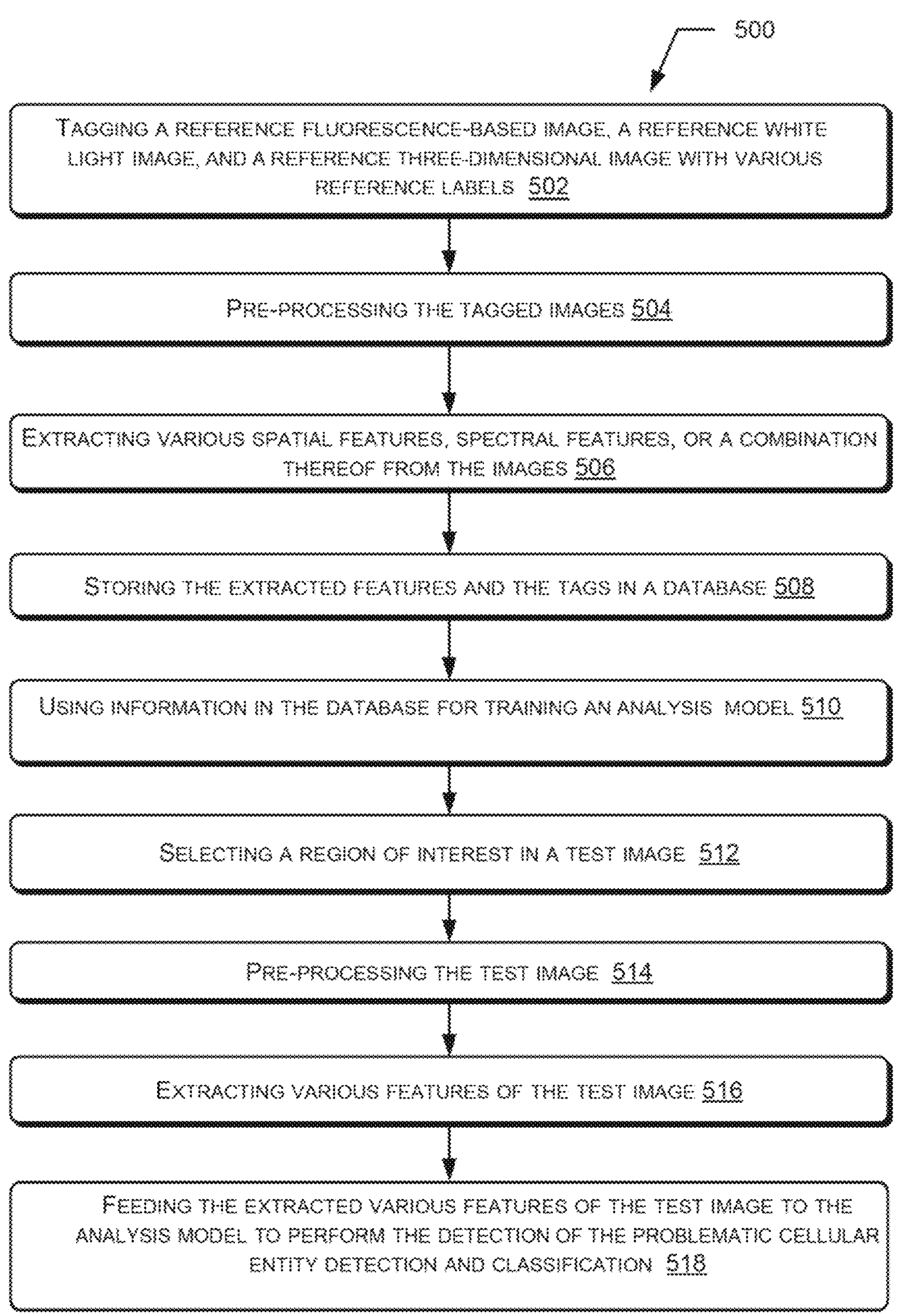
FIG. 5 illustrates a method for training an analysis model to detect a problematic cellular entity in a target, in accordance with an implementation of the present subject matter.

FIG. 5 illustrates a method 500 for training an analysis model to detect a problematic cellular entity in a target, in accordance with an implementation of the present subject matter. The order in which the method blocks are described is not included to be construed as a limitation, and some of the described method blocks can be combined in any order to implement the method 500, or an alternative method. Additionally, some of the individual blocks may be deleted from the method 500 without departing from the scope of the subject matter described herein. Herein, the target is explained with reference to wound and the problematic cellular entity will be explained with reference to pathogens. However, it will be understood that the target can be a tissue sample, an edible product, a laboratory equipment, a sanitary device, a sanitary equipment, a biochemical assay chip, a microfluidic chip, a medical equipment, a body fluid, or a combination thereof and the problematic cellular entities can be cancerous tissue, necrotic tissue, and the like.

At block 502, a reference fluorescence-based image, a reference white light image, and a reference three-dimensional image are tagged with various reference labels, such as a type of the target (i.e., skin or wound), type of wound region (i.e., slough, bone, and the like), infected pathogen species, gram type, and the like. In an example, various spatial features such as such as texture, porosity of the wound and of the adjoining regions, various spectral features such as hue of the fluorescence, or a combination thereof are extracted. In an example, the tagging may be performed in the white light image alone.

At block 504, the tagged images are pre-processed. For example, the images are converted into grayscale, resized, and augmented. Augmenting the images may include rotating the images, flipping the images, and the like.

At block 506, various features, such as spatial features, spectral features, or a combination thereof are extracted from the images. In some examples, the spatial features, such as histogram of oriented gradient (HOG) features, Entropy features, Local Binary Patterns (LBP), Scale Invariant Feature Transforms (SIFT), and the like may be extracted from the images. Similarly, in some examples, spectral features may be extracted from the white light images at RGB wavelengths and fluorescence images at various excitation wavelengths. For white light image and the fluorescence image, the spectral features are extracted using Red green blue (RGB), Hue saturation value (HSV) values or any other color map values at each pixel/region. In an example, a machine learning model or a deep learning model can be used to extract the spatial and spectral features.

At block 508, the extracted spatial and spectral features and the tags may be stored in a database in the memory of the processor 140 (not shown in FIG. 5). The extracted features are then passed onto the analysis model for detection and spatial mapping of pathogens, as will be described below. For instance, for some pathogens, such as *Pseudomonas Aeruginosa*, with the use of spatial features and the excitation wavelength, the pathogens can be detected. For some pathogens, such as *Escherichia coli* (*E-coli*), *Klebsiella, Staphylococcus*, and the like, the detection may be done by extracting a combination of both spatial features and spectral features.

The steps 502-508 may be repeated for several reference fluorescence-based images, several white light images, and several three-dimensional images till the targeted pre-determined target training accuracy is achieved. At block 510, the information in the database may be used for training the analysis model.

By virtue of the training, the analysis model becomes capable of identifying a wound in a given image based on the extracted spatial features, spectral features, or a combination thereof, of the image. That is, the analysis model is capable of performing wound segmentation. In an example, subsequent to the block 510, the method 500 may include a post-processing step, such as connected component labelling, hidden Markov models, and the like, which may be used to smoothen the result of the wound segmentation and thereby improve the accuracy of wound segmentation.

Upon training of the analysis model, the analysis model may be tested to verify whether it is able to correctly identify wounds in images. Accordingly, at block 512, a region of interest in a test image is selected. In an example, region of interest can be selected automatically, such as by the analysis model. In another example, region of interest can be selected manually, such as by a user. Further, at block 514, the test image is preprocessed, and at block 516, spatial features of test images are extracted. At block 518, the extracted features are fed to the analysis model to perform the wound segmentation and problematic cellular entity detection and classification. Subsequently, the result of the wound segmentation, problematic cellular entity detection and classification as performed by the analysis model, may be received.

In an implementation, the analysis model used for the wound segmentation may be different than that used for the pathogen detection and classification. Accordingly, the output of the wound segmentation may be provided by a first analysis model to a second analysis model. The second analysis model may then analyze the fluorescence from the wound region as identified by the first analysis model, and then detect and classify the pathogens in the wound region. Alternatively, in an example, the second analysis model may also use the spatial features, information from the first analysis model on wound, bone, tissue region, and the like, in combination with the spectral features for detection and classification of pathogens.

In an example, the analysis model may include an ANN model and an ML model, each performing a different function. For example, the ML model may be trained to perform wound segmentation, while the ANN model may be trained to detect and classify pathogens. In another example, the ANN model may generate the spectral images from the fluorescence-based image, and the ML model may detect and classify pathogens based on the generated spectral images. In an example, in addition to the fluorescence-based image, the ANN model may also generate the spectral image additionally from the white light image, and the ML model.

In an example, the analysis model may classify the pathogens in a wound into gram positive (GP) and gram negative (GN) pathogens. Further, the analysis model may identify the species of the pathogens in the wound.

The analysis model explained herein is same as the analysis model explained with reference to FIGS. 1-4*e*.

Figure 6:
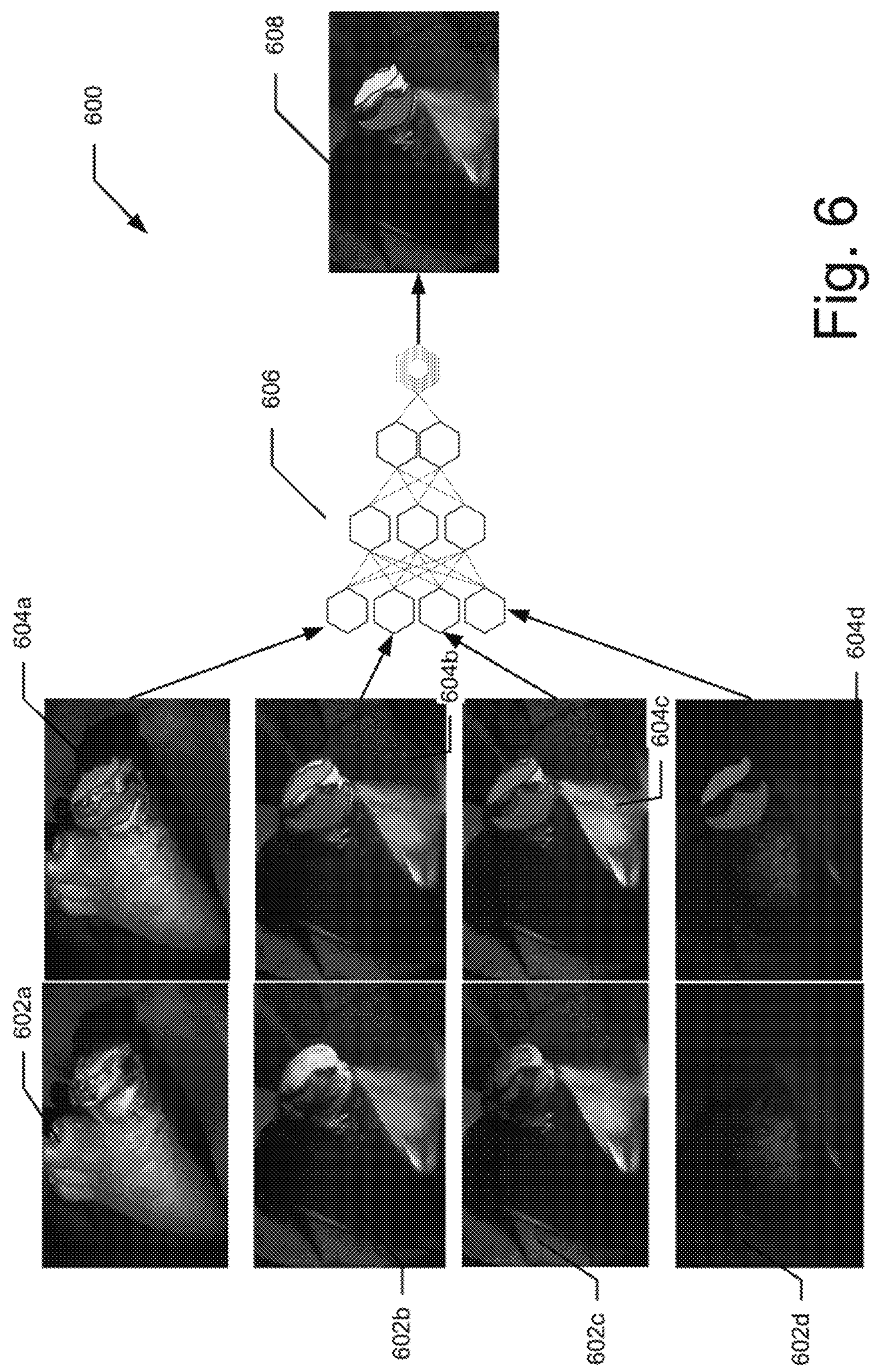
FIG. 6 illustrates an example for training an analysis model to detect a problematic cellular entity in a target, in accordance with an implementation of the present subject matter.

FIG. 6 illustrates an example for training an analysis model to detect a problematic cellular entity in a target, in accordance with an implementation of the present subject matter. In the example depicted herein, image 602*a* depicts a white light image and image 604*a* depicts image tagged with reference labels.

Similarly, auto-fluorescence images 602*b*, 602*c*, 602*d* depict autofluorescence images of a target at different excitation wavelengths, such as 365 nm, 395 nm, and 415 nm respectively. Images 604*b*, 604*c*, 604*d* depict autofluorescence images tagged with reference labels. The images 604*b*, 604*c*, 604*d* correspond to the images 602*b*, 602*c*, 602*d* with reference labels. All the images 602*a*-602*d* and images 604*a*-604*d* are fed to the analysis model 606 for training. The analysis model may provide an output of a composite image 608 of autofluorescence image overlaid with predicted distribution of bacterial species. In the FIG. 6, the red color corresponds to *Staphylococcus aureus*, and the green color corresponds to *Pseudomonas aeruginosa*.

The analysis model explained herein is same as the analysis model explained with reference to FIGS. 1-5.

Figure 7:
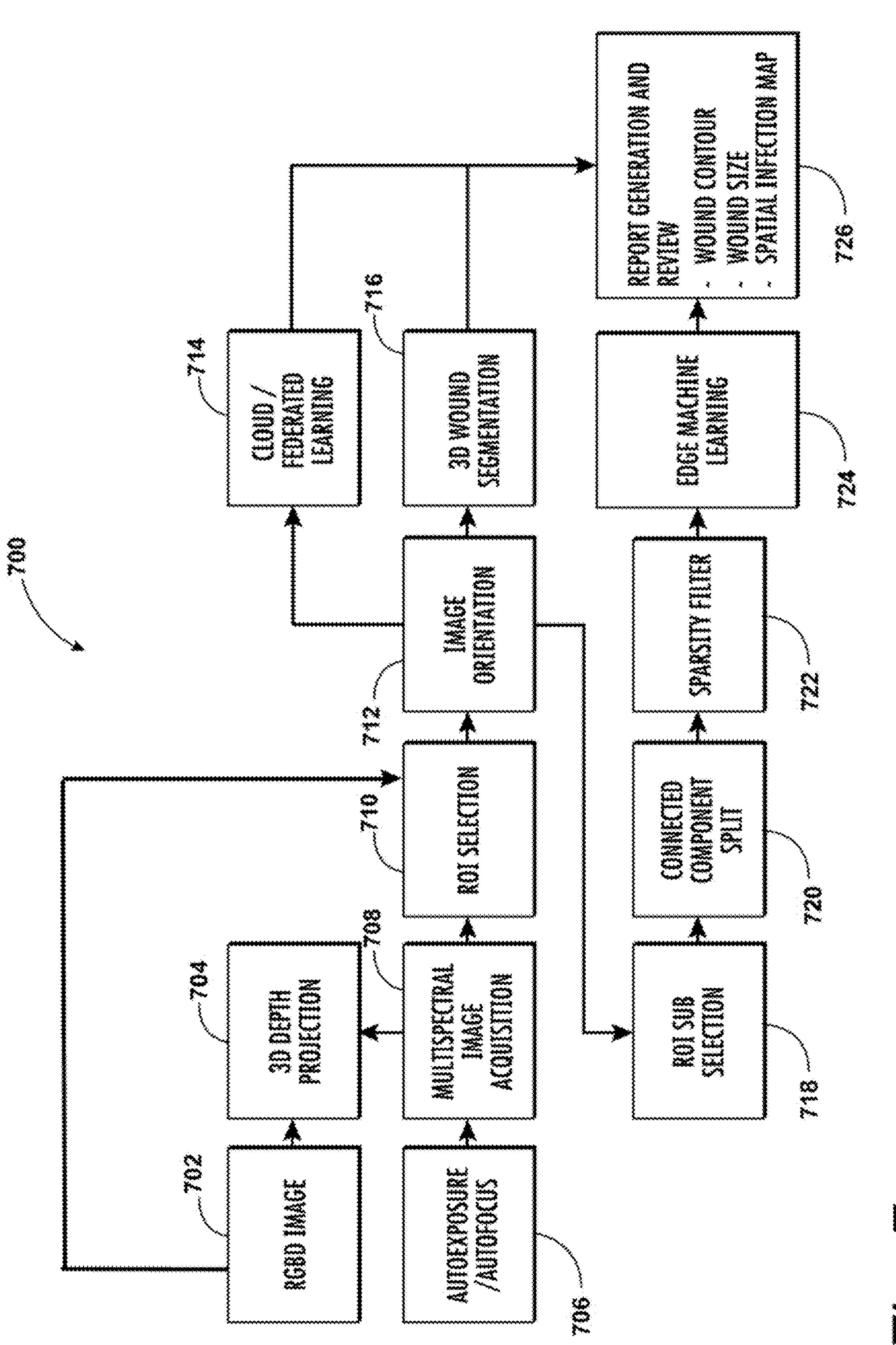
FIG. 7 illustrates a method for detection of a problematic cellular entity, in accordance with an implementation of the present subject matter.

FIG. 7 illustrates a method 700 for detection of a problematic cellular entity, in accordance with an implementation of the present subject matter. The order in which the method blocks are described is not included to be construed as a limitation, and some of the described method blocks can be combined in any order to implement the method 700, or an alternative method. Additionally, some of the individual blocks may be deleted from the method 700 without departing from the scope of the subject matter described herein. Herein, the target 101 Is explained with reference to the wound. However, it will be understood that the target can be a tissue sample, an edible product, a laboratory equipment, a sanitary device, a medical equipment, a sanitary equipment, a biochemical assay chip, a microfluidic chip, a body fluid, or a combination thereof. The method 700 can be performed by the device 100 or by the device 300.

At block 702, a Red-Green-Blue Depth (RGBD) image is taken using the imaging sensor 122. The three-dimensional image capturing sensor 120 takes a measurement of the depth of the image at block 704. A multi-spectral image is obtained using the imaging sensor 122 using different excitation wavelengths and different emission wavelengths at block 708.

Prior to capturing each of the images in multispectral wavelengths, the transfer function of the imaging sensor 122 is frozen and the auto exposure model is run, as will be explained with reference to FIG. 10 and the method 1000, at block 706 to maintain suitable brightness levels. The transfer function is used to convert raw Red-Blue-Green (RGB) sensor values to convert to a more realistic representation of the colors as perceived by human eye. The transfer function may be, for example, a 3*3 matrix. The transfer function is frozen apriori to imaging so that color mixing is known and reproducible across the imaging sessions. After the multi-spectral images are captured, the region of interest (ROI) is selected by the practitioner. The images are then oriented using models, such as Kaze descriptors and K-nearest neighbour (KNN) matching of features.

After the images are oriented, in block 714 the oriented images are sent for a federated learning. For instance, the oriented images may be transferred to a remotely located health professional securely via a cloud-based server system, electronic mail system or otherwise electronically transmitted. The analysis model may allow for continued improvement of the images analyzed. After medical professionals from around the world use the device, such as the device 100 or the device 300, and provide input on the type of information being displayed, future users of the same or another device 100 or the device 300 whether located proximate the prior user or located remote from the prior users/medical professionals benefit from the "learning" provided based on the prior human input from the knowledge of the medical professionals using the system previously. This is referred to as federated learning, which is a machine learning technique that trains a model across multiple decentralized edge devices or servers holding local data samples, without exchanging them.

The wound may be segmented for spatial and size parameters to be populated in the final report in block 716. The spatial parameters may be, for example, extent of granulation, slough, necrotic tissue, maceration, and the like. The size parameters may be, for example, a length of the wound region, a width of the wound, a perimeter of the wound, a depth of the wound, an area of the wound, or a combination thereof. In blocks 718-722, the wound is then subsequently split into sub-Region Of Interests and then split spatially by connected components and passed through a sparsity filter. The analysis model may classify the output into gram positive or gram negative at block 724 and displays it on the report page at block 726, as explained with reference to FIG. 1 and FIG. 3.

Figure 8:
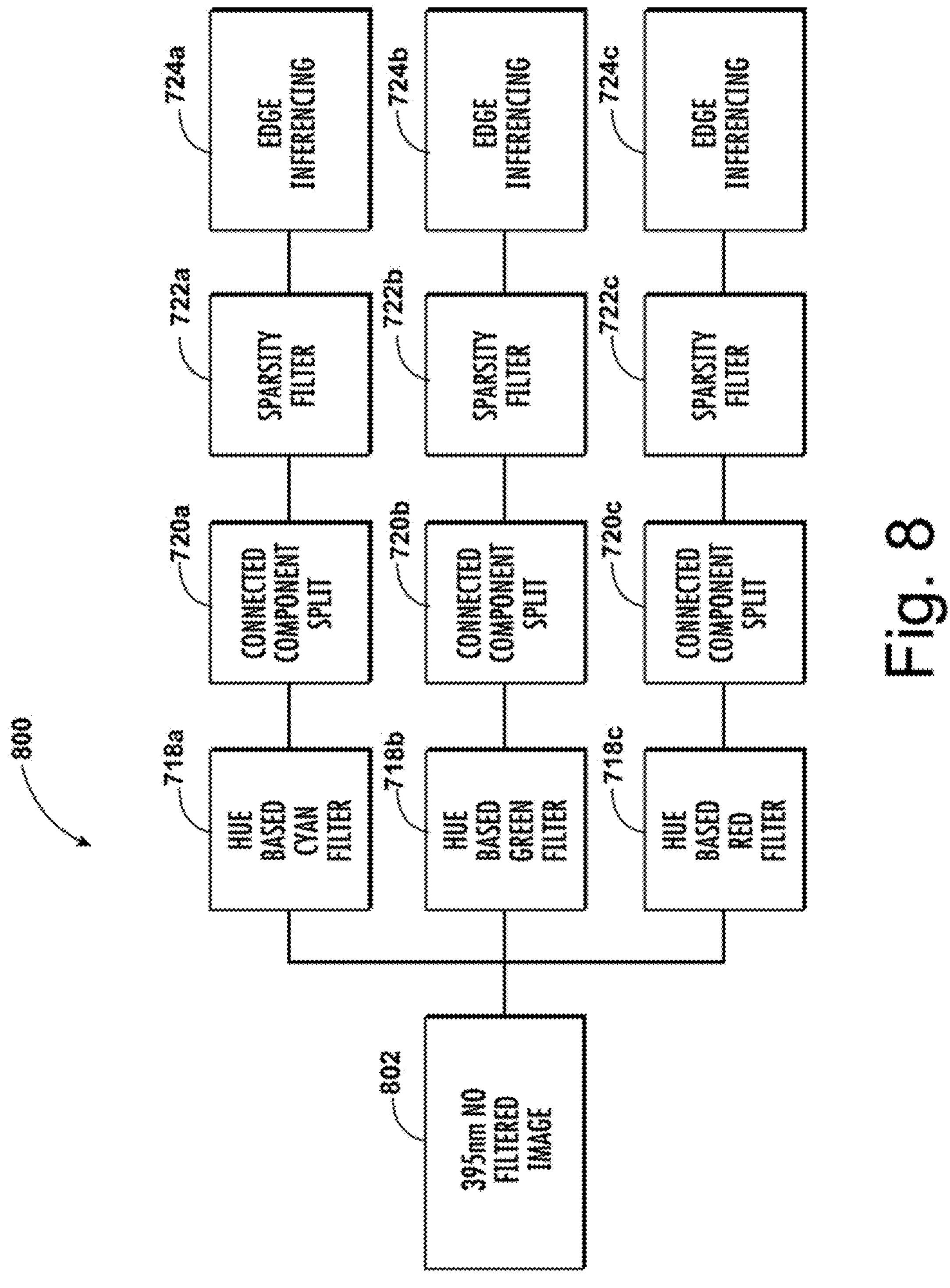
FIG. 8 illustrates a method for detection of a problematic cellular entity, in accordance with an implementation of the present subject matter.

FIG. 8 illustrates a method 800 for the detection of the problematic cellular entity, in accordance with an implementation of the present subject matter. The order in which the method blocks are described is not included to be construed as a limitation, and some of the described method blocks can be combined in any order to implement the method 800, or an alternative method. Additionally, some of the individual blocks may be deleted from the method 800 without departing from the scope of the subject matter described herein. Herein, the steps 718-724 of the method 700 are explained herewith. As will be understood, the blocks 718*a*-718*c* correspond to the block 718 of FIG. 7, the blocks 720*a*-720*c* correspond to the block 720 of FIG. 7, the blocks 722*a*-722*c* correspond to the block 722 of FIG. 7, and the blocks 724*a*-724*c* correspond to the block 724 of FIG. 7. The method 800 can be performed by the device 100 or by the device 300.

At block 802, the 395 nm no-filter image is selected for the ROI sub selection. In blocks 718*a*, 718*b*, and 718*c*, three hue-based filters are used to differentiate between different colors of the emitted fluorescence from the target. Hue based filter network comprises cyan, green and red filters, respectively. In blocks 720*a*, 720*b*, and 720*b*, the hue filtration the binary masks generated are passed through a connected component analyzer. The connected component analysis splits disconnected components and labels them. At blocks 722*a*, 722*b*, and 722*c*, the labels are then individually passed through a sparsity filter. Any region that is less than about or exactly 1% of the entire wound region is rejected from the processing, and the edges of the wound are found using an inference method at blocks 724*a*, 724*b*, and 724*c*.

Figure 9:
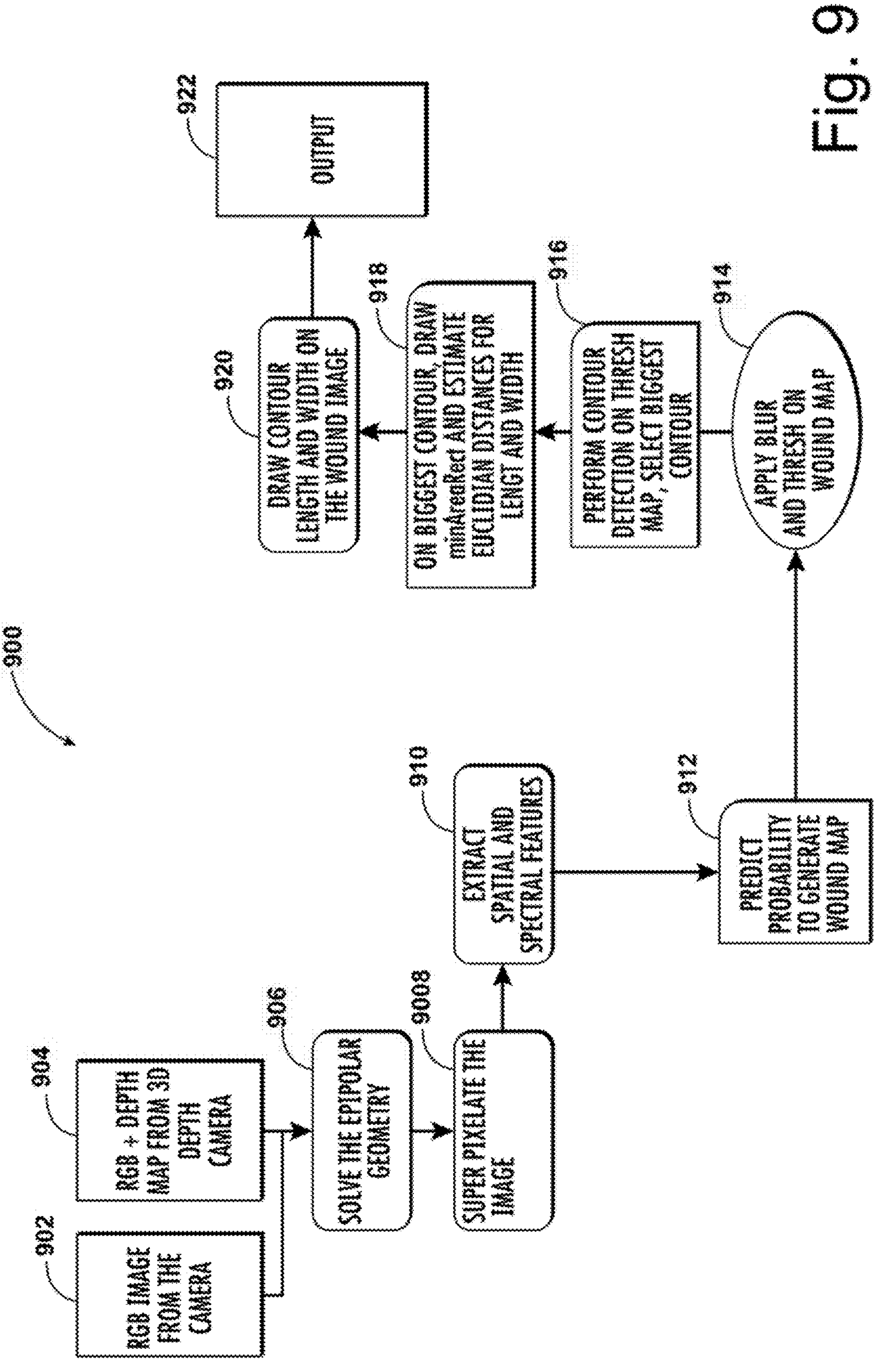
FIG. 9 illustrates a method for detection of a problematic cellular entity, in accordance with an implementation of the present subject matter.

FIG. 9 illustrates a method 900 for the detection of the problematic cellular entity, in accordance with an implementation of the present subject matter. The order in which the method blocks are described is not included to be construed as a limitation, and some of the described method blocks can be combined in any order to implement the method 900, or an alternative method. Additionally, some of the individual blocks may be deleted from the method 900 without departing from the scope of the subject matter described herein. The method 900 can be performed by the device 100 or by the device 300.

A Red-Blue-Green (RGB)+Depth map image is super pixelated into super pixels, for example, 8×8 sized super pixels, at blocks 902-908. The spatial and spectral features are then extracted from the image at block 910. The spatial features are individually passed through the analysis model which can predict the probability if the given super pixel is part of the wound or skin at block 912. Gaussian blurring of the image is done at block 914 and then the image is threshold at block 916. Contours are drawn on the image and the biggest contour is selected as the wound contour at block 916. The length, breadth, depth, and area of the wound are derived from the drawn contour at block 920 and the output is shown using the interface 108 at block 922.

Figure 10:
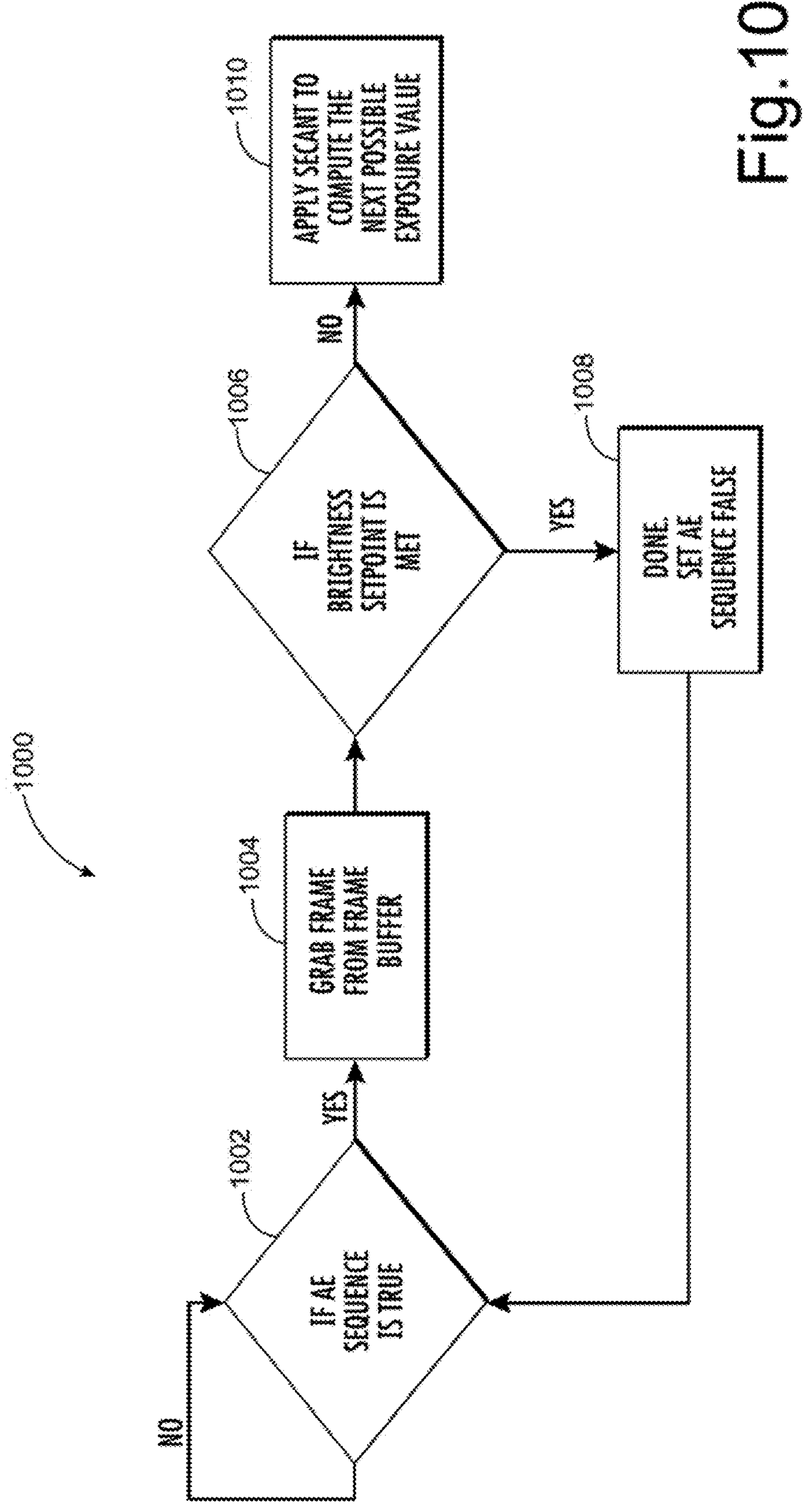
FIG. 10 illustrates a method for an auto exposure process, in accordance with an implementation of the present subject matter.

FIG. 10 illustrates a method 1000 for an auto exposure process, in accordance with an implementation of the present subject matter. The order in which the method blocks are described is not included to be construed as a limitation, and some of the described method blocks can be combined in any order to implement the method 1000, or an alternative method. Additionally, some of the individual blocks may be deleted from the method 1000 without departing from the scope of the subject matter described herein. The method 1000 can be performed by the device 100 or by the device 300.

Brightness of the captured image from the imaging sensor 122 may have to be optimum. In other words, the brightness of the image can neither be too low nor be too saturated. If brightness of the image is too high, image captured by the imaging sensor 122 may be saturated and the image may appear to be white. If the brightness of the image is too low, image captured by the imaging sensor 122 may be too low and may appear to be dark. Therefore, the optimal brightness of the image may have to be set. The brightness may depend on the exposure of the imaging sensor 122. In this regard, an auto exposure model is used to control the optimum exposure of imaging sensor 122 by allowing to set an appropriate brightness of the image. From steps 1002-1010, the auto exposure model is used to set the optimal exposure of the imaging sensor 122 by setting the optimal brightness of the image. In an example, the optimal brightness may be set at 100, or 200, or the like. the first plurality of light sources 130 or the second plurality of light sources 156 of the device 100 or the device 300, while imaging the target 101. The auto exposure model is an iterative model and runs until a brightness setpoint is satisfied. In order to find the next exposure value a secant method is used. Once the auto exposure model has reached the setpoint, it does not run anymore until and unless it is called again. The auto exposure model is set for each of the first plurality of excitation filters 142 as the brightness of each of the first plurality of light sources 130 may be different.

While in the above examples, the target is explained with reference to the wound, in other examples, the target may be an edible product, a laboratory equipment, a sanitary device, a sanitary equipment, a biochemical assay chip, a microfluidic chip, a medical equipment, a body fluid, or a combination thereof.

Further, the analysis model referred to in the explanation with reference to FIGS. 7-11 correspond to the analysis model explained with reference to FIG. 1 or the analysis model explained with reference to FIG. 3.

Figure 11:
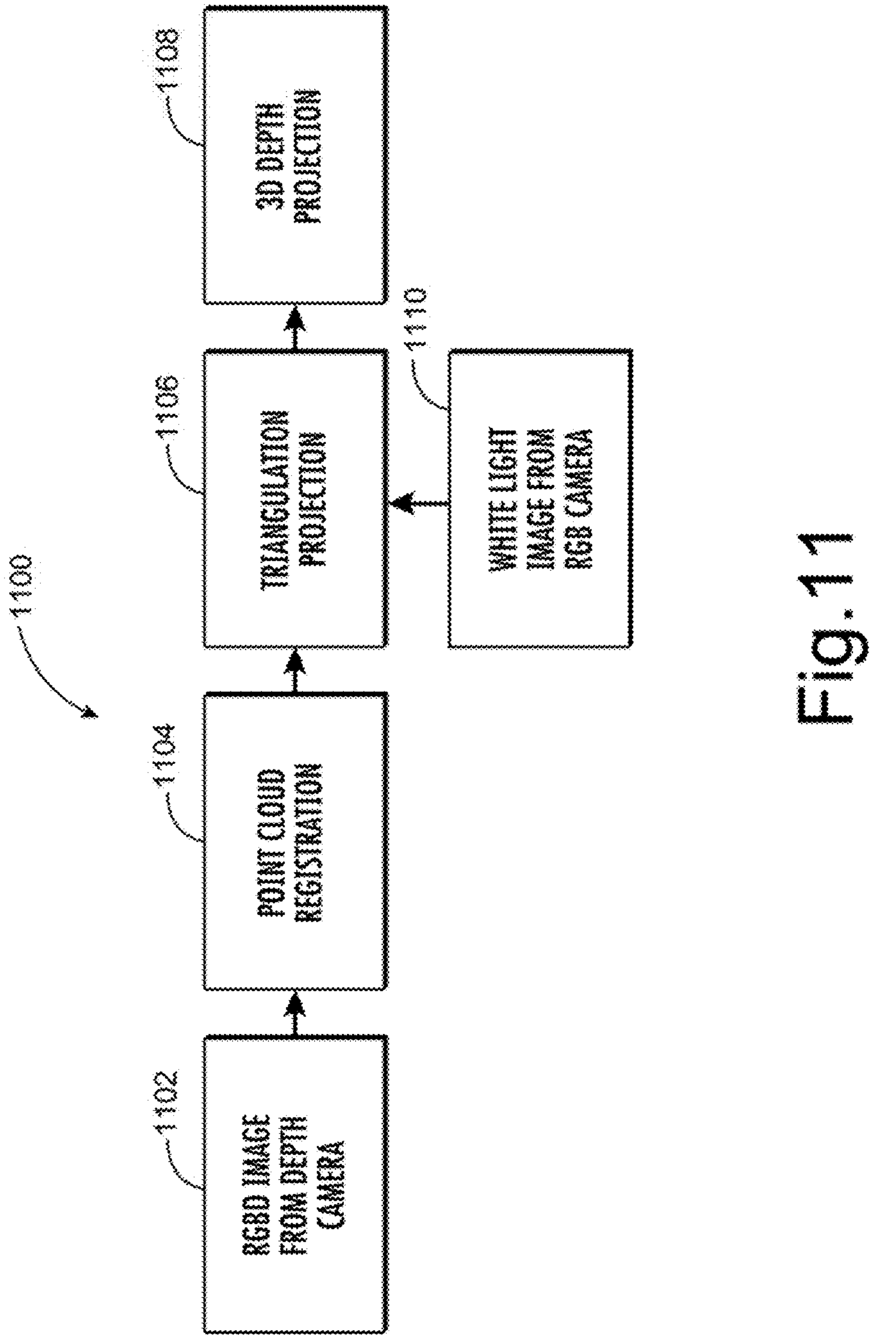
FIG. 11 illustrates a method for detection of a problematic cellular entity, in accordance with an implementation of the present subject matter.

FIG. 11 illustrates a method 1100 for detection of a problematic cellular entity, in accordance with an implementation of the present subject matter. The order in which the method blocks are described is not included to be construed as a limitation, and some of the described method blocks can be combined in any order to implement the method 1100, or an alternative method. Additionally, some of the individual blocks may be deleted from the method 1100 without departing from the scope of the subject matter described herein. The method 1100 can be performed by the device 100 or by the device 300.

From the 3D depth images taken at block 1102 and the white visible light images taken at block 1110, a point cloud is formed at block 604. Based on the point cloud image, homography can be done at block 1106 to overlay the depth image on top of the white light image that is captured by the CMOS visible light camera 122 at block 1108. A homography is an isomorphism of projective spaces, induced by an isomorphism of the vector spaces from which the projective spaces derive. It is a bijection that maps lines to lines, and thus a collineation. In general, some collineations are not homographies, but the fundamental theorem of projective geometry asserts that is not so in the case of real projective spaces of dimension at least two.

Figure 12A:
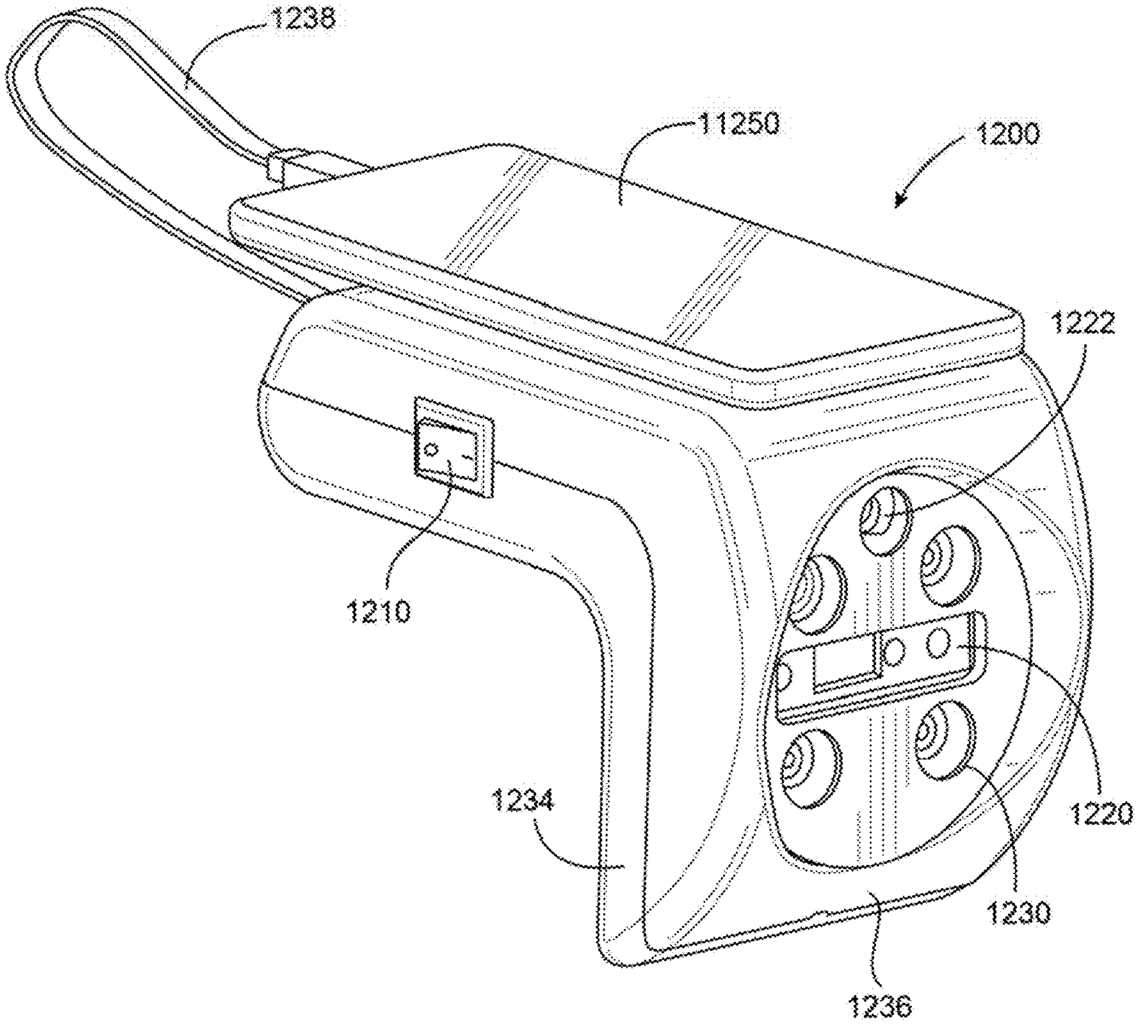
FIG. 12*a* illustrates a perspective view of a device for examining a target, in accordance with an implementation of the present subject matter.
Figure 12B:
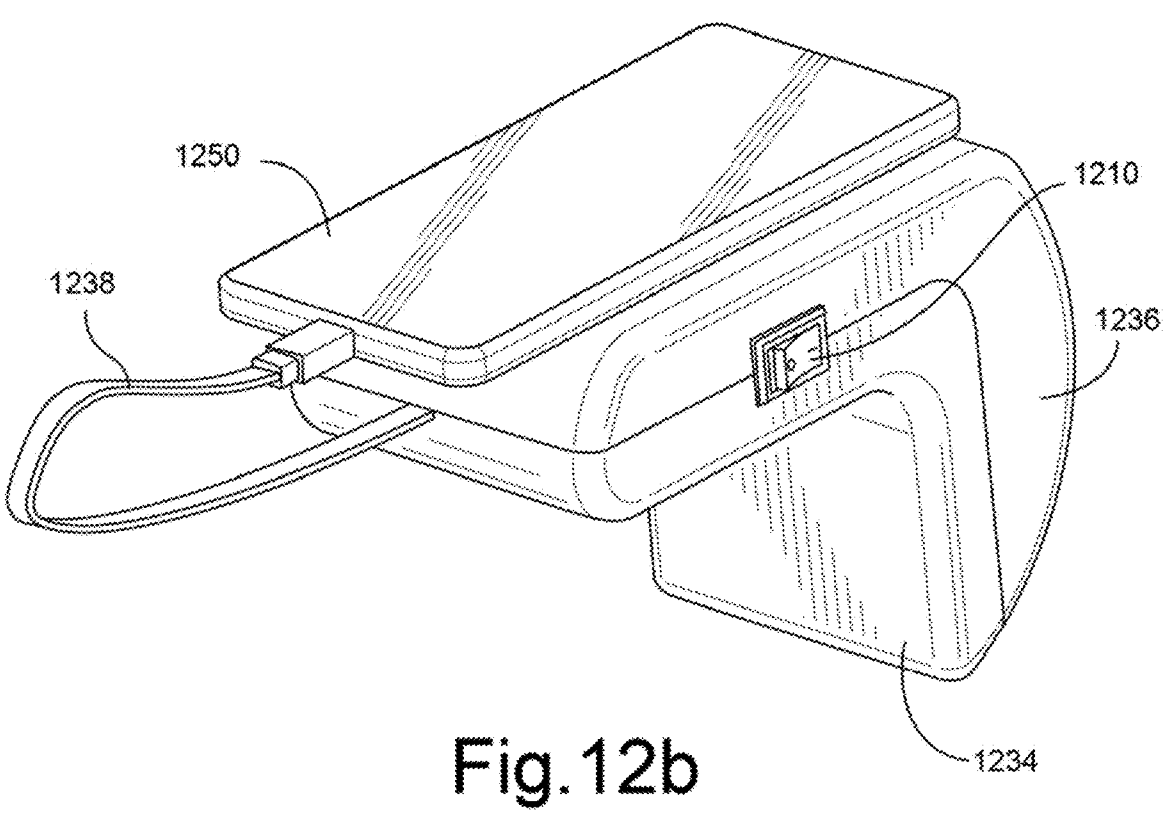
FIG. 12*b* illustrates a perspective view of a device for examining a target, in accordance with an implementation of the present subject matter.
Figure 12C:
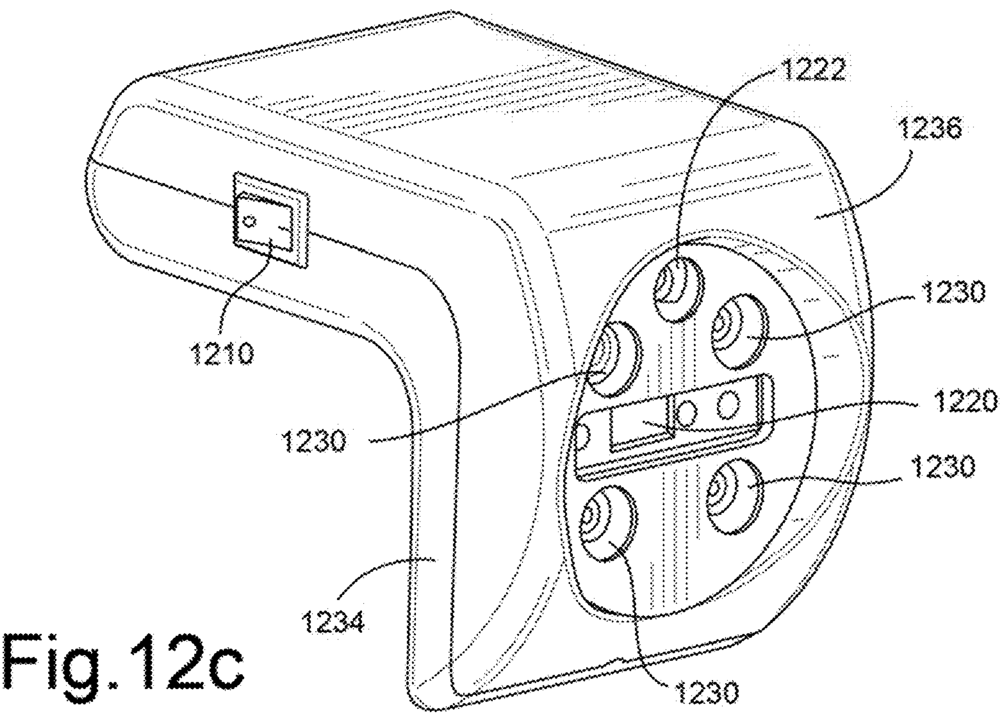
FIG. 12*c* illustrates a perspective view of a device for examining a target, in accordance with an implementation of the present subject matter.
Figure 12D:
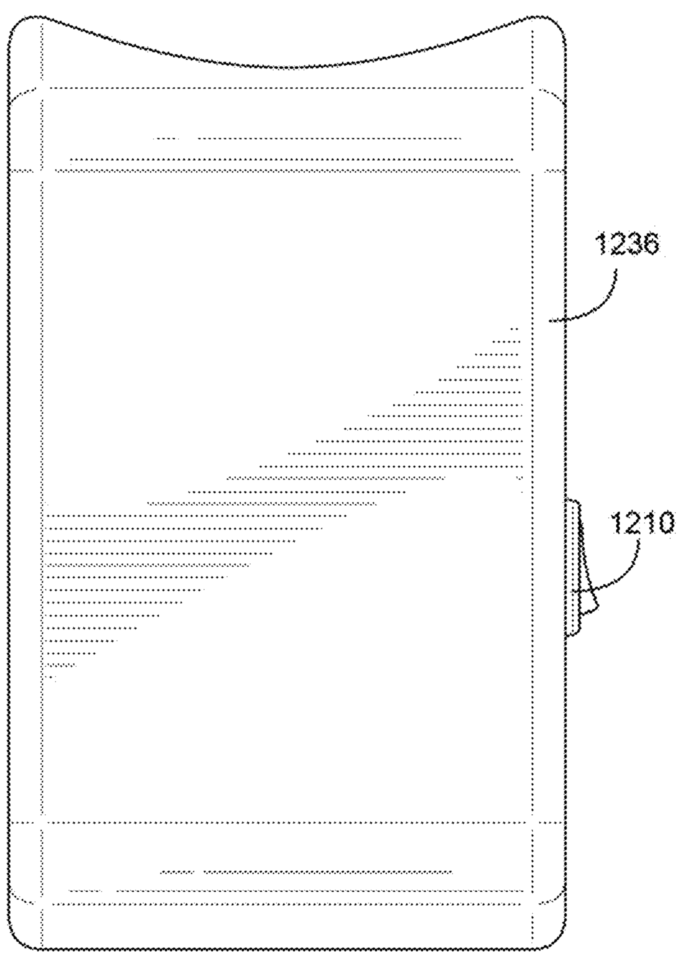
FIG. 12*d* illustrates a top view of a device for examining a target, in accordance with an implementation of the present subject matter.
Figure 12E:
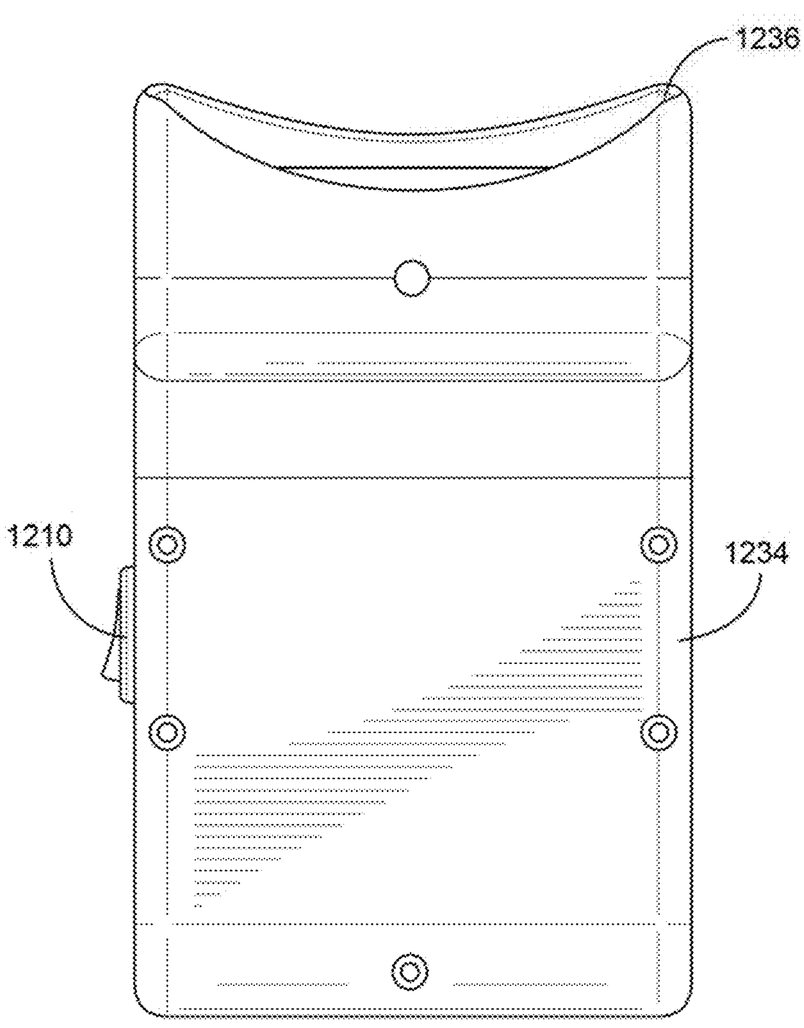
FIG. 12*e* illustrates a top view of a device for examining a target, in accordance with an implementation of the present subject matter.
Figure 12F:
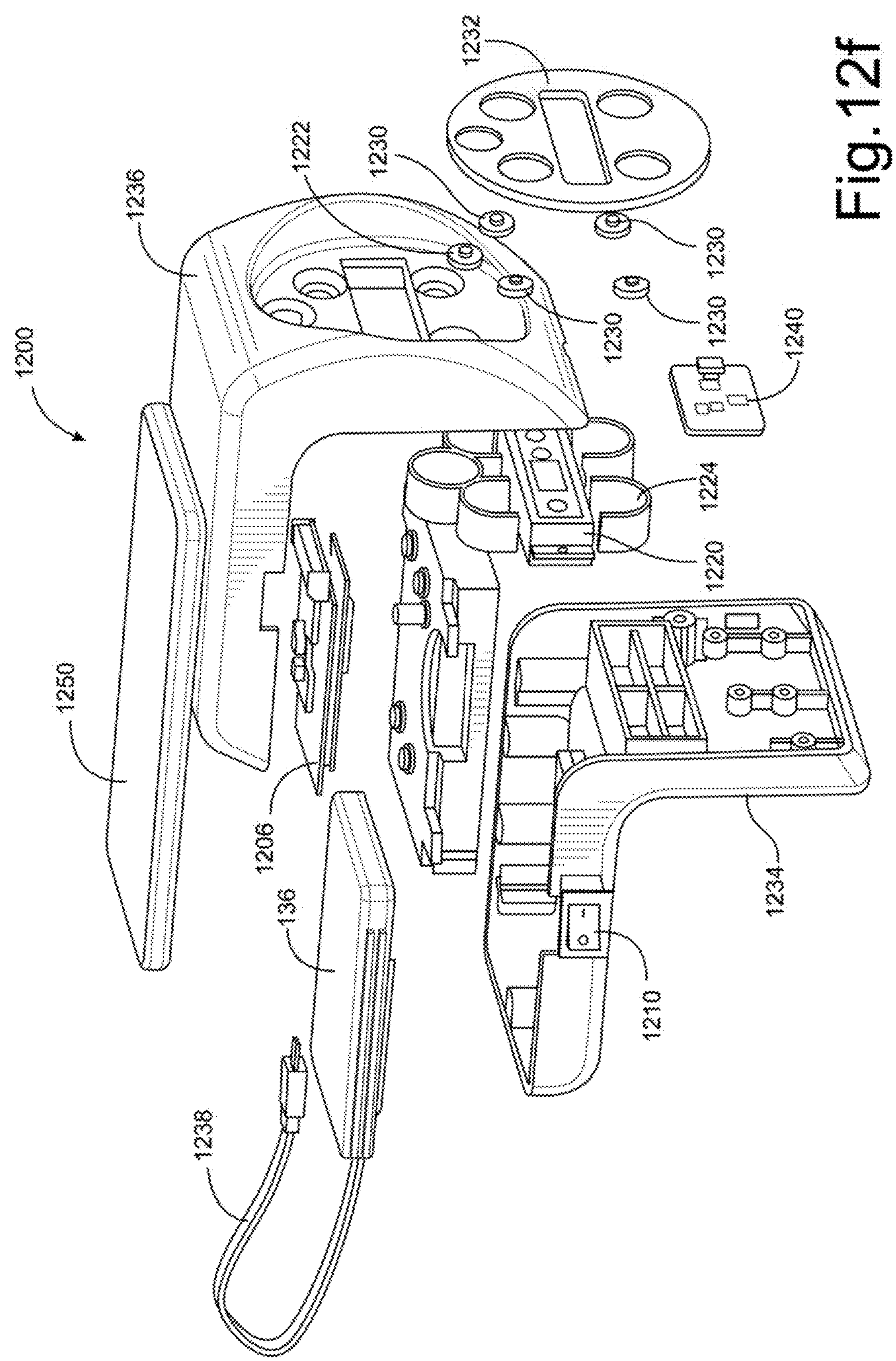
FIG. 12*f* illustrates an exploded view of a device for examining a target, in accordance with an implementation of the present subject matter.
Figure 12G:
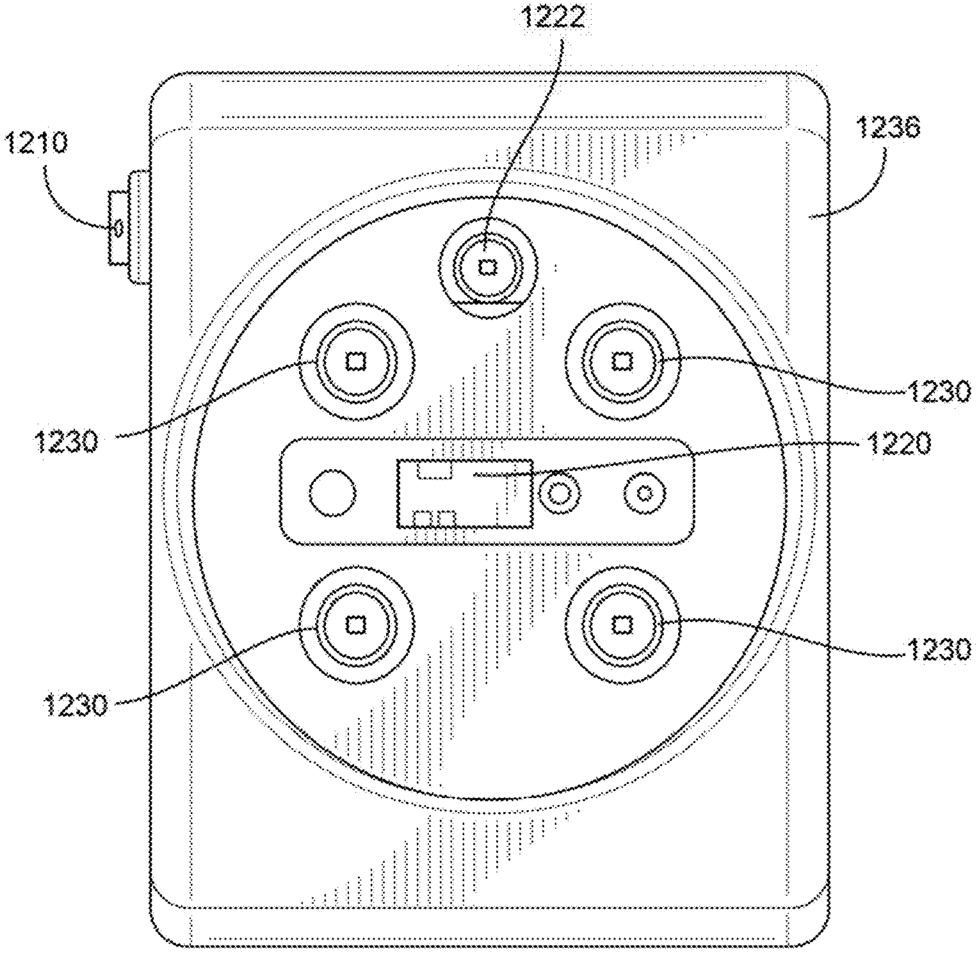
FIG. 12*g* illustrates a front view of a device for examining a target, in accordance with an implementation of the present subject matter.
Figure 12H:
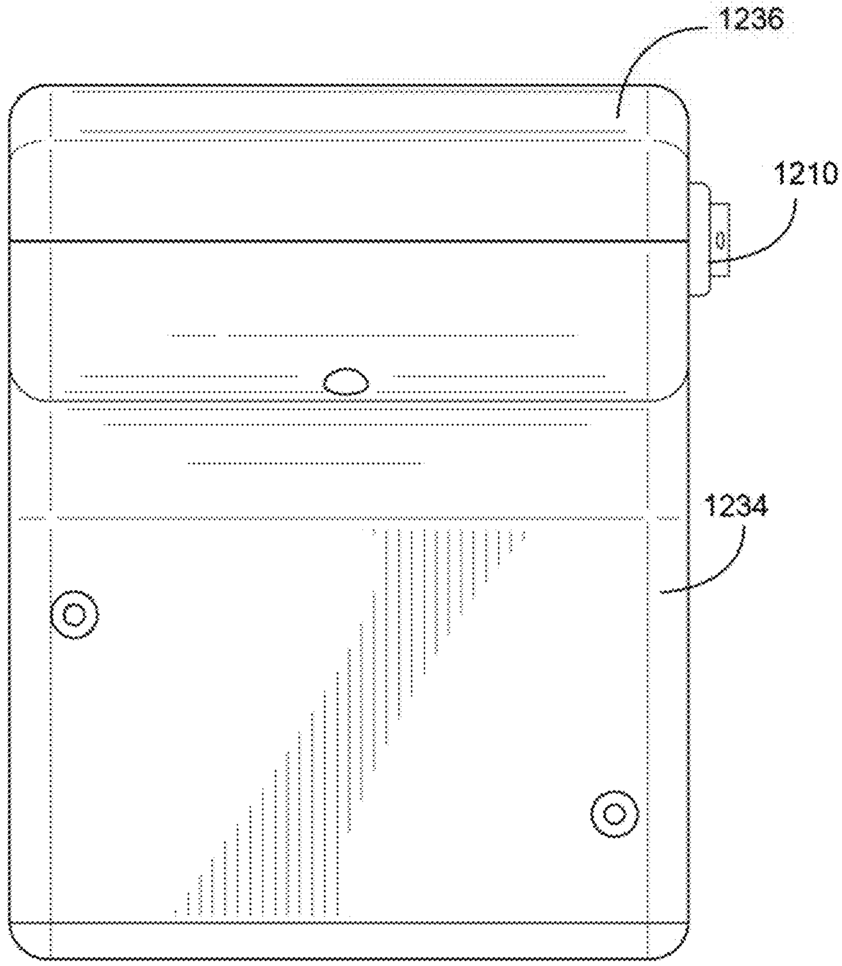
FIG. 12*h* illustrates a top view of a device for examining a target, in accordance with an implementation of the present subject matter.
Figure 12I:
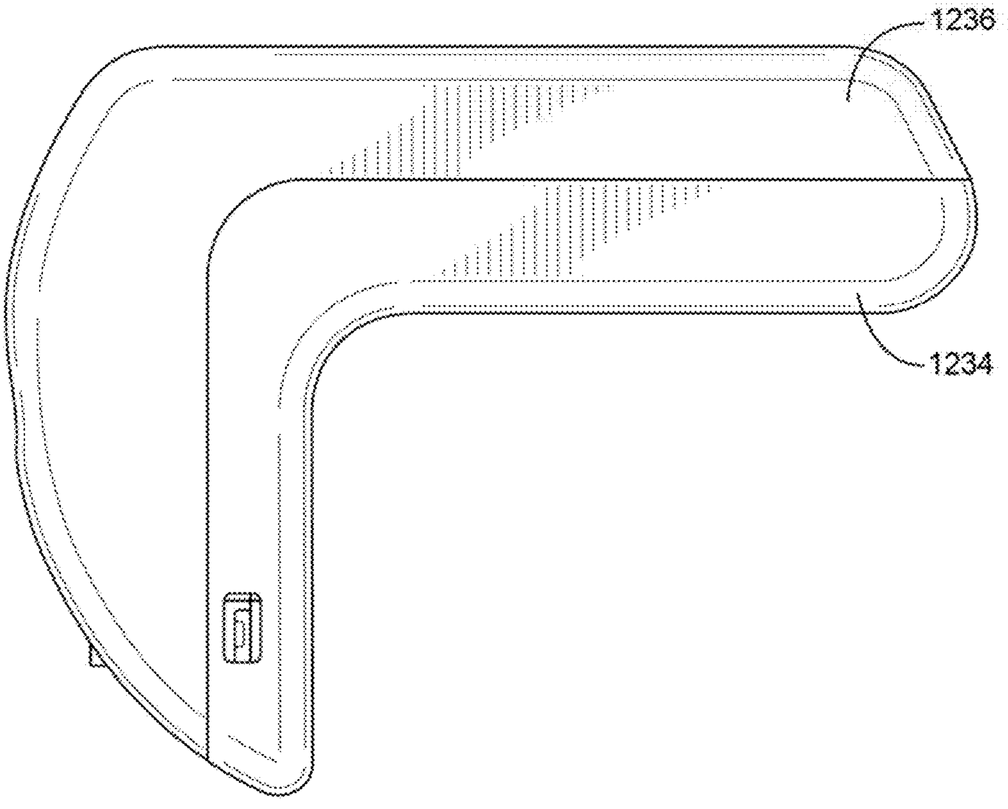
FIG. 12*i* illustrates a side view of a device for examining a target, in accordance with an implementation of the present subject matter.

FIG. 12*a* illustrates a perspective view of a device 1200 for examining a target, in accordance with an implementation of the present subject matter. FIG. 12*b* illustrates a perspective view of the device 1200 for examining the target, in accordance with an implementation of the present subject matter. FIG. 12*c* illustrates a perspective view of the device 1200 for examining the target, in accordance with an implementation of the present subject matter. FIG. 12*d* illustrates a top view of the device 1200 for examining the target, in accordance with an implementation of the present subject matter. FIG. 12*e* illustrates a top view of the device 1200 for examining the target, in accordance with an implementation of the present subject matter. FIG. 12*f* illustrates an exploded view of the device 1200 for examining the target, in accordance with an implementation of the present subject matter. FIG. 12*g* illustrates a front view of the device 1200 for examining a target, in accordance with an implementation of the present subject matter. FIG. 12*h* illustrates a top view of the device 1200 for examining a target, in accordance with an implementation of the present subject matter. FIG. 12*i* illustrates a side view of the device 1200 for examining the target, in accordance with an implementation of the present subject matter. For the sake of brevity, FIGS. 12*a*-12*i* will be explained in conjunction with each other.

The device may examine the target, such as the target 101. Further, the device 1200 may correspond to the device 100 or the device 300. The device 1200 may perform analogous functions as the device 100 or the device 300.

The device 1200 may include a front cover 1236 and rear cover 1234. A portable power module, such as the power module 136 (similar to the power module in device 100 or the device 300) may connect to a practitioner's cellular phone 1250 through a USB cable 1238 or similar power and/or data cable. The practitioner's phone 1250 or other mobile computing device, such as a desktop, a tablet, a laptop, a smart accessory, such as a smart watch, and the like, with a touch activated user input screen where the mobile computing device is connected with cloud servers via a wired or wireless connection. The mobile computing device could conceivably be even a virtual reality headset that could enable a wearer to view the composite wound site imaging in real time while viewing the patient and even conceivably the tissue during a medical procedure thus enabling a surgeon to see wound related data in real time while performing the surgery.

The mobile computing device may connect to a main PCB board 1206 wirelessly such as through a Bluetooth® connection or the like. An Application Programming Interface (API) on the practitioner's phone uses the wireless connection to the main PCB board 1206 to send instructions to the PCB board 1206 through an API on the PCB board 1206, which then sends the instructions to other elements of device 1200 to begin, continue, or complete the imaging process. The practitioner's phone or other device 1250 may then receive images and other output from methods 700-1100, as explained with reference to FIGS. 7-11 and then display the composite images to a user who may then delete, save, or otherwise use the images and data generated by the device and communicated to the practitioner's phone 1250.

In an example, the images may be transferred to a remotely located health professional securely via a cloud-based server system, electronic mail system or otherwise electronically transmitted. The analysis model used in connection with the device 1200 allow for continued improvement of the images analyzed by the device 1200. After medical professionals from around the world use the device 1200 and provide input on the type of information being displayed, future users of the same or another device 1200 whether located proximate the prior user or located remote from the prior users/medical professionals benefit from the "learning" the system provides based on the prior human input from the knowledge of the medical professionals using the system previously. This is referred to as federated learning, which is a machine learning technique that trains a model across multiple decentralized edge devices or servers holding local data samples, without exchanging them. A detailed cumulative analysis is typically done remotely from the individual device using prior wound imaging data stored in a non-patient specific manner on a cloud based computer system in wired or wireless signal communication with the device in use. The device 1200 allows for the continued improvement based on knowledge from medical professionals around the world to be used the improve the output of the devices 1200 even to user who may not have the same level of advanced training as some other prior users. It is also possible that instead of or in addition to the remote detailed analysis, an analysis based on prior imaging may be done on the device 1200 itself. The analysis model of the present disclosure may be executed more quickly, but in perhaps less detail, using the graphics processor(s) of the devices 1200 which provide faster inference. The faster inference provides essentially instant evaluation of features of the images such as oxygenation, bioburden, and wound analytics. This essentially instant availability of data assists medical practitioners in providing urgent and accurate care for a patient.

Similar to the device 100 and the device 300, the device 1200 includes an imaging sensor 1222, a first plurality of light sources 1230, a three-dimensional image capturing sensor 1220, and a ranging sensor 1232. The first plurality of light sources shields 1224 are typically used to house the first plurality of light sources 1230 and protect them within the device 1200. They may also prevent light from one light source crossing over into the other light source. The device 1200 may include a charger board 1240 and an optional on/off switch 1210.

Figure 13:
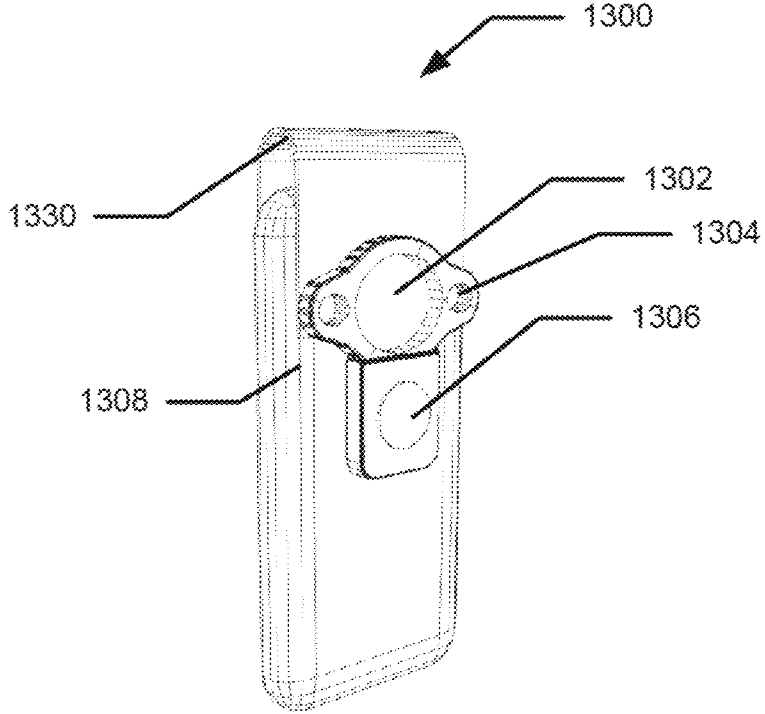
FIG. 13 illustrates a device for examining a target, in accordance with an implementation of the present subject matter.

FIG. 13 illustrates a device 1300 for examining a target, in accordance with an implementation of the present subject matter. The device 1300 may include a first plurality of optical bandpass filters or polarizers 1302, a first plurality of light sources 1304 optionally integrated with a polarizer or excitation filter or a combination thereof. Further, the device 1300 may include a computing device 1308, such as a smart phone, a laptop, a desktop, a smart accessory, such as a smart watch, and the like. In the example depicted herein, the computing device 1308 is depicted as a smart phone. The computing device 1308 may be coupled using a clip 1330. Accordingly, in an example, the device 1300 may utilize the first plurality of light sources 1304 for illumination of the target. Further, the device 1300 may include a power button 1306 to switch on or switch off the device 1300. Further, the computing device 1308 may include an imaging sensor or camera, such as the imaging sensor or camera 122, a three-dimensional image capturing sensor, such as the three-dimensional image capturing sensor 120, and a ranging sensor, such as the ranging sensor 132. As will be understood, the three-dimensional image capturing sensor can be used as the ranging sensor.

The device 1300 may correspond to the device 100, the device 300, or the device 1200 and may include other similar components for the detection of the problematic cellular entities, such as the ones mentioned with reference to FIGS. 1-4*e* and FIGS. 12*a*-12*i*. The first plurality of optical bandpass filters 1302 may correspond to the first plurality of optical bandpass filters 126. The first plurality of light sources 1304 may correspond to the first plurality of light sources 130. Further, the device 1300 may detect the problematic cellular entities similar to the device 100 or the device 300 as explained with reference to FIGS. 7-11.

Further, the capturing and the processing of the images, as explained with reference to FIGS. 1-11, may be performed by the computing device 1300. In some scenarios, the device 1300 may include a processor, such as a processor 140. The processor may process the images and transmit result of the detection of the problematic cellular entities to the computing device 1308. In another example, partial processing may be done by the processor and partial processing may be performed by the computing device 1308. For instance, the analysis of the images may be performed by the processor and the detection of the problematic cellular entities based on the analysis may be performed by the computing device 1308. Alternatively, the analysis of the images may be performed by the computing device 1308 and the detection of the problematic cellular entities based on the analysis may be performed by the processor.

In some examples, when the target is a wound, the present subject matter enables detection of biofilms in the wound, as will be explained below.

Figure 14:
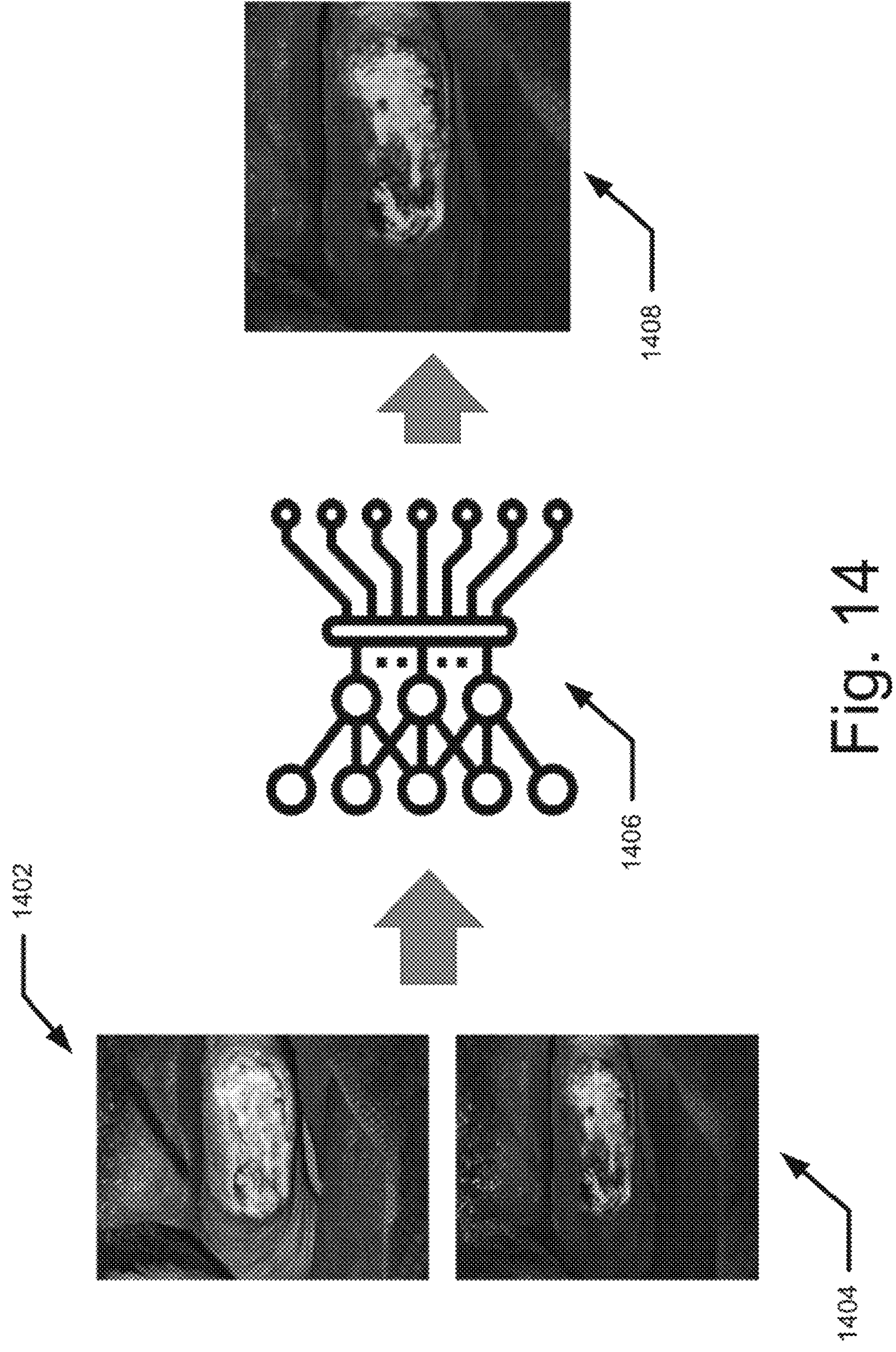
FIG. 14 illustrates detection of problematic cellular entities, in accordance with an implementation of the present subject matter.

FIG. 14 illustrates detection of problematic cellular entities, in accordance with an implementation of the present subject matter. Herein, a wound examining device is explained. In other words, the target is explained with reference to the wound. A device for examining a wound may include an imaging module, an interfacing module, and an interface. The device may correspond to the device 100, the device 300, the device 1200, and/or the device 1300. Accordingly, the components mentioned herein may be similar to the components of the device 100, the device 300, the device 1200, and/or the device 1300. The device explained with reference to FIG. 14 may perform analogous functions as the device 100, the device 300, the device 1200, and/or the device 1300 in addition to the functions mentioned herein.

The imaging module may include a first plurality of light sources, a second plurality of light sources, an imaging sensor, and a three-dimensional image capturing sensor. Each of the first plurality of light sources may emit excitation radiation at a predetermined range of wavelengths that cause one or more markers in the wound to fluoresce. The first plurality of light sources may be, for example, homogenous light sources or non-homogenous light sources.

Each of the second plurality of light sources may emit excitation radiation at a predetermined range of wavelengths without causing the marker in the wound to fluoresce. The imaging sensor may directly receive light emitted by the wound in response to illumination thereof by at least one or more light sources of the first plurality of light sources and to directly receive light reflected by at least one or more light sources of the second plurality of light sources without an optical bandpass filter being disposed between the imaging sensor and the wound. The imaging sensor may capture a first plurality of images formed based on the light emitted by the wound and may capture a second plurality of images formed based on the light reflected by the wound. Here, the light is said to be directly received by the imaging sensor because the light emitted and the light reflected are not filtered by an optical bandpass filter before capturing of the images.

The three-dimensional image capturing sensor may illuminate the wound and may receive light reflected by the wound in response to the illumination thereof by the three-dimensional image capturing sensor and may generate a three-dimensional image of the wound based on the reflected light. To illuminate the target, the three-dimensional image capturing sensor may include one or more light sources (not shown in FIG. 14) integrated with the three-dimensional image capturing sensor. However, in some examples, separate light sources may also be coupled with the three-dimensional image capturing sensor to illuminate the target and to enable capturing of the light reflected by the target due to the illumination. In an example, the three-dimensional image capturing sensor may be a structure lighting sensor, a time-of-flight sensor, a stereo sensor, or a combination thereof.

The interfacing module may be coupled to the imaging module. The interfacing module may include a processor. The processor may be configured to analyze, using an analysis model, a first image of the first plurality of images, wherein the first image is a fluorescence-based image comprising fluorescence emerging from the wound. The processor may analyze, using the analysis model, a second image obtained from the second plurality of images. Further, the processor may analyze, using the analysis model, the three-dimensional image of the wound to determine variation in intensity of the light emitted across a spatial region of the wound by compensating for variation in distance across the spatial region of the wound from the three-dimensional image capturing sensor and by compensating for variation in curvature of the wound relative to the three-dimensional image capturing sensor. In addition, the processor may analyze, using the analysis model, the three-dimensional image of the wound to determine variation in intensity of the reflected light across the spatial region of the wound by compensating for variation in distance across the spatial region of the wound from the three-dimensional image capturing sensor and by compensating for variation in curvature of the wound relative to the three-dimensional image capturing sensor.

In this regard, the processor may detect, using the analysis model, presence of a biofilm in the wound based on the analysis of the first image, the second image, and the three-dimensional image. The analysis model may be trained for detecting the presence of biofilms in wounds. The analysis model may create a composite image of the first image, the second image, and the three-dimensional image of the wound. The interface may display a result corresponding to the detection of the biofilm in the wound and the composite image of the first image, the second image, and the three-dimensional image of the wound.

To detect the biofilm in the wound, the analysis model is trained using a plurality of reference fluorescence-based images with biofilms, a plurality of three-dimensional images with biofilms, and a plurality of reference fluorescence-based images without biofilms. The analysis model is trained to differentiate between fluorescence in the fluorescence-based image emerging from the biofilms and fluorescence in fluorescence-based image emerging from regions of other than the biofilms.

The analysis model may include, for example, a plurality of neural networks. Each of the plurality of neural networks may extract relevant parameters from each modalities, such as from the first image, the second image and the three-dimensional image. For instance, a first neural network may extract relevant parameters from the first image, a second neural network may extract relevant parameters from the second image, and a third neural network may extract relevant parameters from the third image. Further, a fourth neural network may perform fusion of the extracted parameters by the three neural networks from the first image, the second image, and the three-dimensional image to detect the biofilms in the wounds. Alternatively, all the images are sent to a single neural network to identify the spatial region in the target containing biofilms.

In addition to the first image, the second image, and the three-dimensional image, the analysis model may utilize polarized images. Accordingly, the device may include a first polarizer provided positioned between the first plurality of light sources and the target to let the excitation radiation of the first plurality of light sources of a first polarization to pass through. The device may include a second polarizer positioned between the target and the imaging sensor to let the light emitted by the target of a second polarization to pass through.

In an example, the first polarizer and the second polarizer may be in perpendicular configuration aligned at 90 degrees from each other. Further, in another example, the first polarizer and the second polarizer in a parallel configuration. When the polarizers are used, the analysis model may include another neural network to extract parameters from polarized image. Further, a neural network may perform fusion of the extracted parameters by the neural networks from the first image, the second image, the three-dimensional image, and the polarized image to detect the biofilms in the wounds.

In an example, the first polarization and the second polarization may be same. For instance, in an example, the first polarization and the second polarization may be a Left-Handed Circular polarization (LHCP). In another example, the first polarization and the second polarization may be a Right-Handed Circular Polarization (RHCP). In another example, the first polarization and the second polarization may be different. For instance, the first polarization may be one of: LHCP or RHCP and the second polarization may be other of: LHCP or RHCP.

In an example, the plurality of polarizers may have a third polarizer may be positioned between the second plurality of light source and the target to let the excitation radiation of the second plurality of light sources of a third polarization to pass through. The plurality of polarizers may be combined with first set of excitation filters. In an example, if the device include the first plurality of optical bandpass filters to act as emission filters and positioned between the target and the imaging sensor, the plurality of polarizers may be combined with the first plurality of optical bandpass filters.

The device may include a second plurality of light sources for illuminating the target without causing the one or more markers in the target to fluoresce. One or more of the second plurality of light sources is configured to emit light with a wavelength in a visible region. The imaging sensor may be configured to capture a second plurality of images formed based on light reflected by the target in response to illumination thereof by the at least one or more light sources of the second plurality of light sources. The processor 140 may analyze, using the analysis model, the three-dimensional image of the wound to determine variation in intensity of the reflected light across a spatial region of the wound by compensating for variation in distance across the spatial region of the wound from the three-dimensional image capturing sensor and by compensating for variation in curvature of the wound relative to the three-dimensional image capturing sensor. The processor may be configured to analyze, using the analysis model, a second image obtained from the third plurality of images. The processor may be configured to detect, using the analysis model, a presence of a problematic cellular entity in the target based on the analysis of the first image, the second image, and the three-dimensional image. The processor may create a composite image of the target using the first image, the second image, and the three-dimensional image. The interface may be configured to display a result corresponding to the detection of the problematic cellular entity and the composite image of the first image, the second image, and the three-dimensional image of the target.

In an example, the device may include a first set of excitation filters. Each of the first set of excitation filters may be configured to filter the excitation radiation emitted by a light source of the first plurality of light sources of a predetermined range of wavelengths to pass through thereof to illuminate the target. In addition, one or more excitation filters may also be configured to filter the excitation radiation emitted by a light source of the second plurality of light sources of a predetermined range of wavelengths to pass through thereof.

In the example depicted herein, reflectance image 1402 and fuorescence image 1404 corresponding to the wound is provided as inputs to the analysis model 1406, including a plurality of neural networks, to detect the biofilms in the wounds, as depicted in the image 1408. The analysis model 1406 is same as the analysis model referred earlier or the analysis model explained with reference to FIGS. 1-11. In an example, the device may be capable to detect autofluorescence signal emitting from Extracellular Matrix (ECM) of a biofilm. The device can also detect autofluorescence from quorum sensing elements released into the ECM.

Further, the device can distinguish biofilm in the wound from a planktonic bacteria in the wound. For instance, reflection scattering, and fluorescence at multiple wavelengths may be different between biofilms and planktonic bacteria. Further, the biofilm may have features, such as higher specular reflection compared to planktonic bacteria, which could be captured from the reflectance images. Accordingly, by analyzing the first plurality of images, the second plurality of images, and the three-dimensional images, the device can distinguish between planktonic bacteria and the biofilm. In addition, the plurality of polarizers may be used to capture difference in the reflection coefficients to enable distinguishing between the planktonic bacteria and the biofilm. The reflection may be composed of specular reflection and diffuse reflection. In reflectance imaging, by having a parallel polarization geometry between polarizer positioned between the light source and the target and the polarizer positioned between the imaging sensor and the target, specular reflection and diffuse reflection may be obtained. By having a perpendicular polarization geometry between the polarizer positioned between the light source and the target and the polarizer positioned between the imaging sensor and the target, diffuse reflection may be obtained.

The detection of biofilms may facilitate better and faster wound care management. For instance, wound with biofilms are resistant to antibiotics and may take longer time to heal. Therefore, when the device of the present subject matter enables detection of the biofilms in the wounds, treatment can be provided accordingly. For instance, interventional procedures, such as debridement of the wound can be performed to effectively remove the biofilms from the wounds. This enables faster healing of the wounds.

In the above example, the device is explained with reference to detecting the biofilm in the wound by capturing the wound. Alternatively, or in addition to the above capturing of the wound, the device can also capture a blot paper to detect the biofilm. The blot paper may be embedded with chemicals, such as ruthenium red, alcian blue, and the like, and may be pressed against the wound. Subsequently, the blot paper may be imaged by the imaging sensor. The analysis model may analyze the image of the blot paper and detect the presence of biofilm. For instance, polysaccharides in exudate are collected by attaching a nitrocellulose membrane to a surface of the wound, and biofilms are visualized by staining with either ruthenium red or alcian blue. In another example, an electrically charged blot paper may be used for detecting the presence of the biofilm in the wound. For instance, electrically charged blot paper may be pressed against the wound and can be captured by the imaging sensor. The analysis model may analyze the image and detect the presence of the biofilm in the wound.

Figure 15:
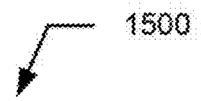
FIG. 15 illustrates a system for examining a target, in accordance with an implementation of the present subject matter.
Figure 15:
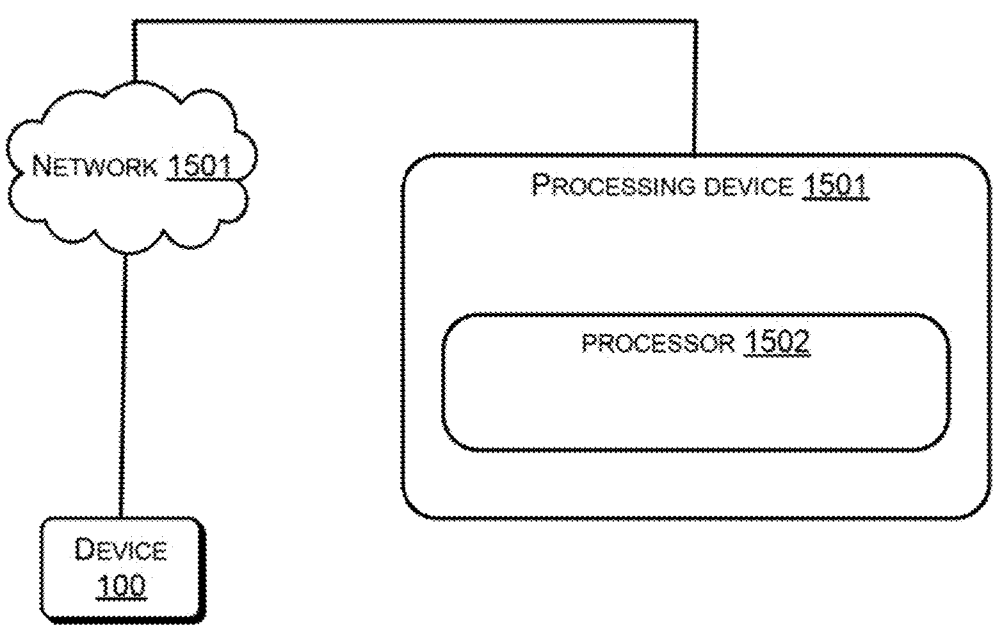

FIG. 15 illustrates a system 1500 for examining the target, in accordance with an implementation of the present subject matter. The processing device 1501 may be a computing device, such as a server, provided at a remote location, such as on the cloud. The processing device 1501 may include computer(s), servers(s), cloud device(s) or any combination thereof. The device 100 may be connected to the processing device 1501 over a communication network 1501. In accordance with the implementation, the analysis model on the processing device 1501. The analysis model may correspond to the analysis model explained with reference to FIGS. 1-2*c* and FIGS. 7-11. The analysis model may also correspond to the analysis model referred to with reference to FIGS. 3-4*e*. The processing device 1501 may include a processor 2402 that implements the analysis model. The processor 1502 may correspond to the processor 140. Accordingly, the device 100 may capture the fluorescence-based images and white light images of a target and may transmit them to the processing device 1501. Upon detecting and classifying the pathogens, the processing device 1501 may transmit the result of the analysis to the device 100, which may then display the result on the interface 108.

In an implementation, the device 100 may perform the detection and the classification as explained with reference to FIGS. 1-2*c* and FIG. 7-11. Further, the training may be similar to the training explained with reference to FIG. 5. Although, in the example depicted herein, the device is explained with reference to the device 100, in some examples, the device of the system 1500 may also correspond to the device 300, the device 1200.

Figure 16B:
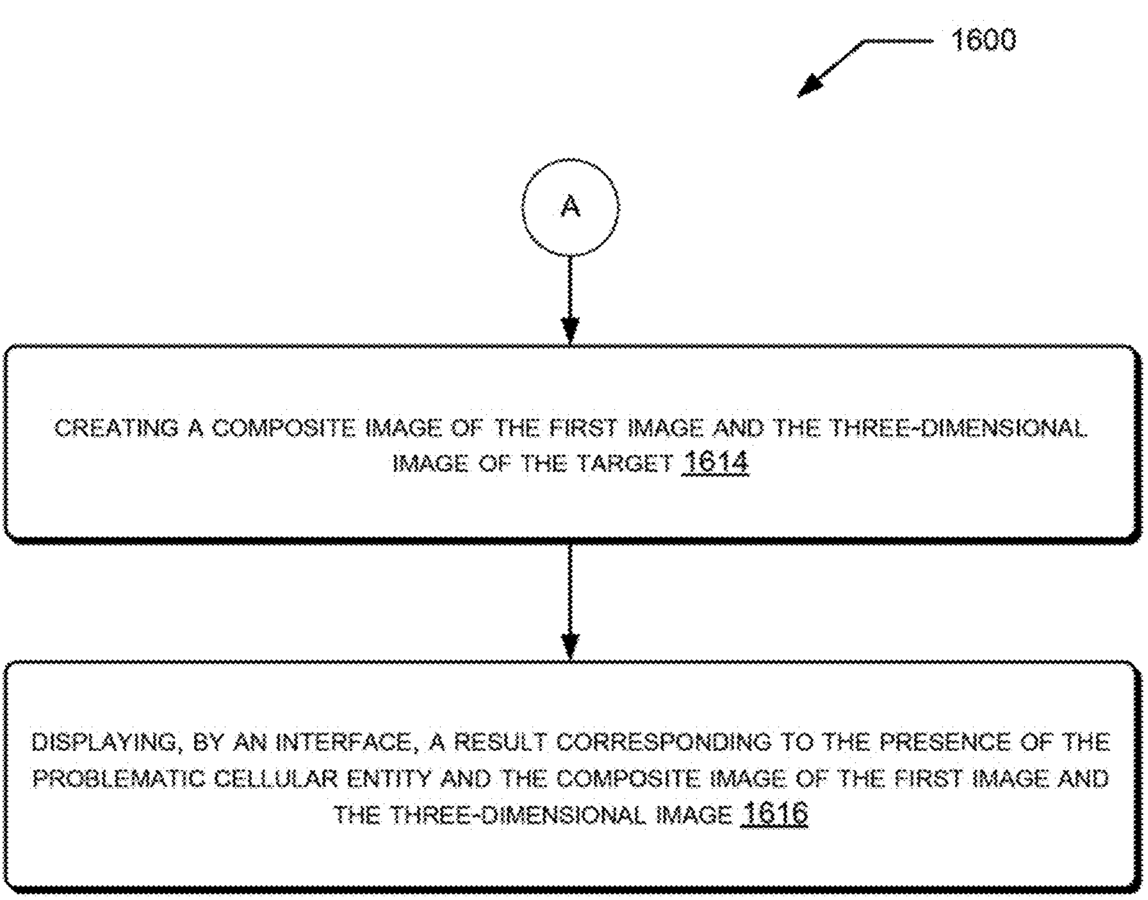

FIGS. 16*a*-16*b* illustrates a method for examining a target, in accordance with an implementation of the present subject matter. The order in which the method 1600 is described is not intended to be construed as a limitation, and any number of the described method blocks may be combined in any order to implement the method 1600, or an alternative method. Furthermore, the method 1600 may be implemented by processor(s) or computing device(s) through any suitable hardware, non-transitory machine-readable instructions, or a combination thereof. The method may be performed by the device 100, the device 300, the device 1200, the device 1300, and/or the system 1500. Accordingly, the components described with reference to the method 1600 may correspond to corresponding components of the device 100, the device 300, the device 1200, the device 1300, and/or the system 1500.

At step 1602, the method 1600 may include illuminating the target using at least one or more light sources of a first plurality of light sources of a device. Light emitted by each of the first plurality of light sources has a wavelength band.

At step 1604, a first plurality of images may be captured by the imaging sensor. The imaging sensor may be configured to receive light emitted by the target in response to illumination thereof by the at least one or more light sources of the first plurality of light sources. The first plurality of images may be formed based on the light emitted by the target.

At step 1606, the method 1600 may include capturing, by a three-dimensional image capturing sensor, a three-dimensional image of the target. The three-dimensional image capturing sensor may be configured to illuminate the target and may receive light reflected by the target in response to the illumination thereof by the three-dimensional image capturing sensor and may generate the three-dimensional image of the target based on the reflected light. To illuminate the target, the three-dimensional image capturing sensor may include one or more light sources integrated with the three-dimensional image capturing sensor. However, in some examples, separate light sources may also be coupled with the three-dimensional image capturing sensor to illuminate the target and to enable capturing of the light reflected by the target due to the illumination.

At step 1608, a first image of the first plurality of images may be analyzed by a processor using an analysis model. The first image may be a fluorescence-based image comprising fluorescence from the target in response to light emitted by the at least one or more light sources of the first plurality of light sources.

At step 1610, the three-dimensional image of the target may be analyzed by the processor to determine variation in intensity of the light emitted across a spatial region of the target by compensating for variation in distance across the spatial region of the target from the three-dimensional image capturing sensor and by compensating for variation in curvature across the spatial region of the target.

At step 1612, the method 1600 includes detecting, by the processor, presence of a problematic cellular entity in the target using the analysis model based on the analysis of the first image and based on the three-dimensional image of the target. The analysis model may be trained for detecting the presence of problematic cellular entities in targets.

At step 1614, a composite image of the first image and the three-dimensional image of the target may be created. At step 1616, a result corresponding to the presence of the problematic cellular entity and the composite image of the first image and the three-dimensional image may be displayed by an interface.

In an example, the analysis model may be trained using a plurality of reference fluorescence-based images and a plurality of reference three-dimensional images for detecting the presence of problematic cellular entities in targets. The analysis model may be trained to differentiate between fluorescence in the fluorescence-based image emerging from the problematic cellular entity and fluorescence in fluorescence-based image emerging from regions of other than the problematic cellular entity.

The target may be a wound region. In this regard, the method includes extracting, by the processor, spatial and spectral features of the wound region using the analysis model from the first image and the three-dimensional image. Location of the wound region may be identified by the processor based on the extraction of the spatial and the spectral features using the analysis model. The method includes determining, by the processor, contour of the wound region based on the extraction of the spatial and the spectral features using the analysis model. Pathogen in the wound region may be detected by the processor based on the extraction of the spatial and the spectral features using the analysis model. The method includes classifying, by the processor, the pathogen by at least one of: family, genus, species, or strain of the pathogen using the analysis model.

In an example, the method 1600 may include determining, by the processor, a length of the wound region, a width of the wound, a perimeter of the wound, a depth of the wound, an area of the wound, or a combination thereof, based on the determination of the contour of the wound region using the analysis model.

Further, in an example, the target is one of: a wound region, an edible product, a laboratory equipment, a medical equipment, a sanitary device, a sanitary equipment, a biochemical assay chip, a microfluidic chip, a body fluid, or a combination thereof. Furthermore, the method may include determining, by the processor, at least one of: degree of infection of the wound region, spatial distribution of pathogens in the wound region, or a healing rate of the wound region when the target is a wound region in response to detecting the presence of the problematic cellular entity. Further, the method includes detecting, by the processor, presence of problematic cellular entity as at least one of: a cancerous tissue, a necrotic tissue, or a combination thereof in the tissue sample when the target is a tissue. Furthermore, the method may include determining, by the processor, the problematic cellular entity as a pathogen and classifying, by the processor, the pathogen in the target, when the target is one of: a sanitary device, a sanitary equipment, a medical equipment, a biochemical assay chip, a body fluid, or a microfluidic chip.

In an example, the method 1600 may include filtering, by an optical bandpass filter of a first plurality of optical bandpass filters light emitted by the target in response to the illumination thereof by the at least one or more light sources of the first plurality of light sources of a predetermined wavelength to pass through thereof. The optical bandpass filter may be positioned between the target and the imaging sensor. The imaging sensor may capture the filtered light from the optical bandpass filter.

Figure 17:
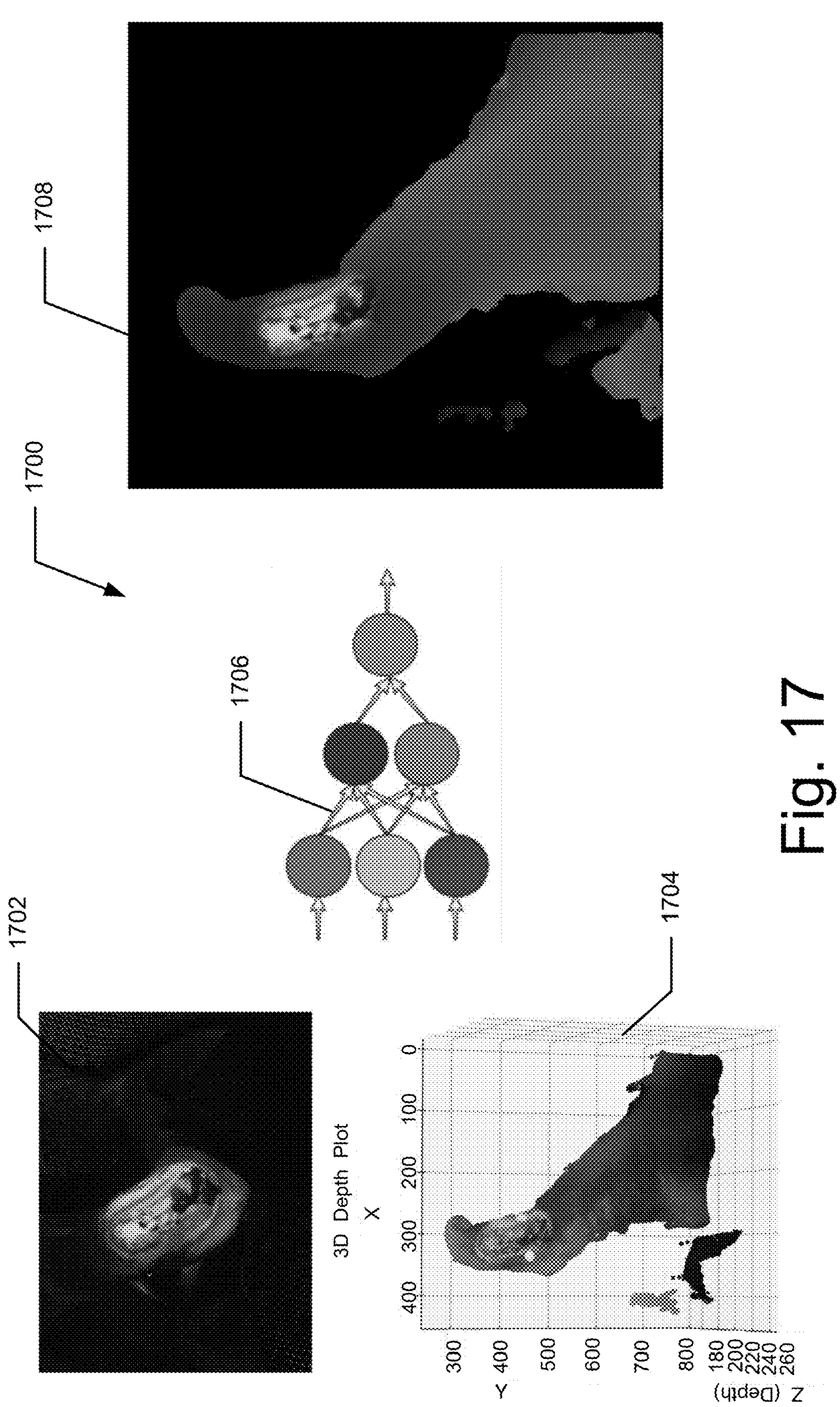
FIG. 17 illustrates results corresponding to detection of a problematic cellular entity, in accordance with an implementation of the present subject matter.

FIG. 17 illustrates results 1700 corresponding to detection of a problematic cellular entity, in accordance with an implementation of the present subject matter. In the example depicted herein, fluorescence-based images, such as autofluorescence images, of wounds captured by illuminating the wound with various UV-Visible wavelengths, such as 365 nm, 395 nm, 415 nm, 450 nm from appropriate light sources after passing the light through appropriate narrow-band band pass filters and linear polarizers. The autofluorescence image is captured after linearly polarizing the fluorescence response coming from the wound by placing a linear polarizer in front of the imaging sensor such that polarization axis of the imaging sensor is perpendicular to those of the polarizers in front of the light sources. An example autofluorescence image of a wound at an excitation wavelength of 365 nm is depicted by image 1702.

Further, the 3D-depth image and white light images of the wound are obtained using a three-dimensional image capturing sensor, such as the depth camera. The 3D-depth image is depicted by image 1704.

The autofluorescence images, such as the image 1702, and the 3D depth images, such as the image 1704, along with the white light images of the wound are fed into the analysis model 1706 which predicts the regions on the wounds where problematic cellular entities are present. The analysis model 1706 provides a depth image with an overlay of the auto fluorescence intensity indicating the presence of problematic cellular entities, such as is depicted by the image 1708.

Figure 18:
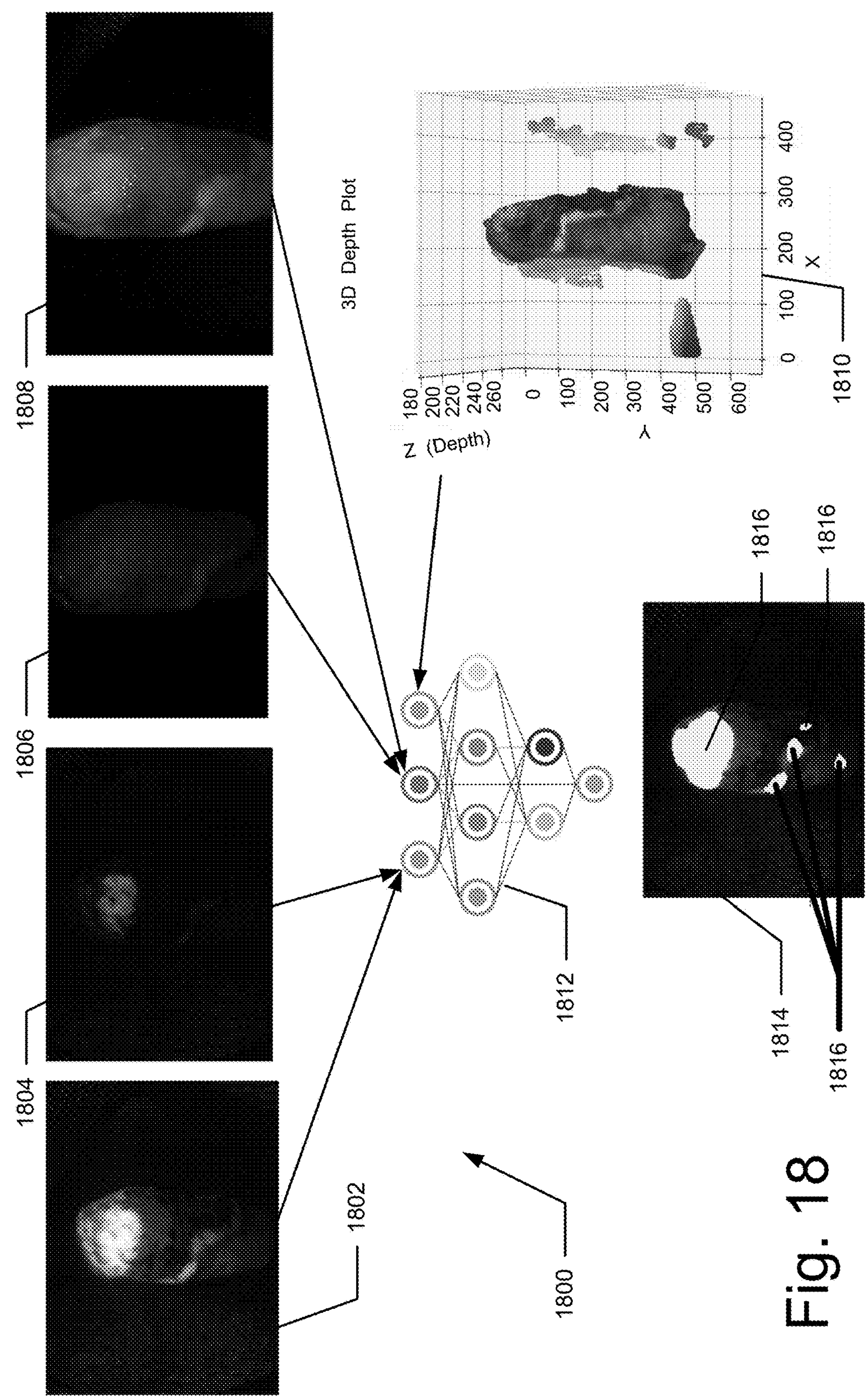
FIG. 18 illustrates results corresponding to detection of a problematic cellular entity, in accordance with an implementation of the present subject matter.

FIG. 18 illustrates results 1800 corresponding to detection of a problematic cellular entity, in accordance with an implementation of the present subject matter.

In this example, images are captured in a plurality of modalities, including fluorescence-based imaging, such as an autofluorescence image, reflectance imaging, such as NIR reflectance imaging, and 3D-depth imaging are fed into the analysis model.

Image 1802 depicts an autofluorescence image captured when the excitation wavelength was 365 nm. Image 1804 depicts an autofluorescence image when the excitation wavelength was 395 nm. Image 1806 depicts a frame from an NIR diffuse reflectance image captured when the excitation wavelength 660 nm. Image 1808 depicts a frame from an NIR diffuse reflectance image captured when the excitation wavelength 850 nm. Image 1810 depicts a 3D-depth image. The images 1802, 1804, 1810 and the videos 1806, 1808 are provided as inputs to the analysis model 1812. In this example, the analysis model 1812 is a deep convolutional neural network. The analysis model 1812 predicts areas of wounds that show presence of problematic cellular entities. For instance, in the image 1814, is an autofluorescence image overlaid by masks indicating predicted areas of presence of problematic cellular entities. Regions marked as 1816 correspond to pathogen *Pseudomonas aeruginosa.*

Figure 19:
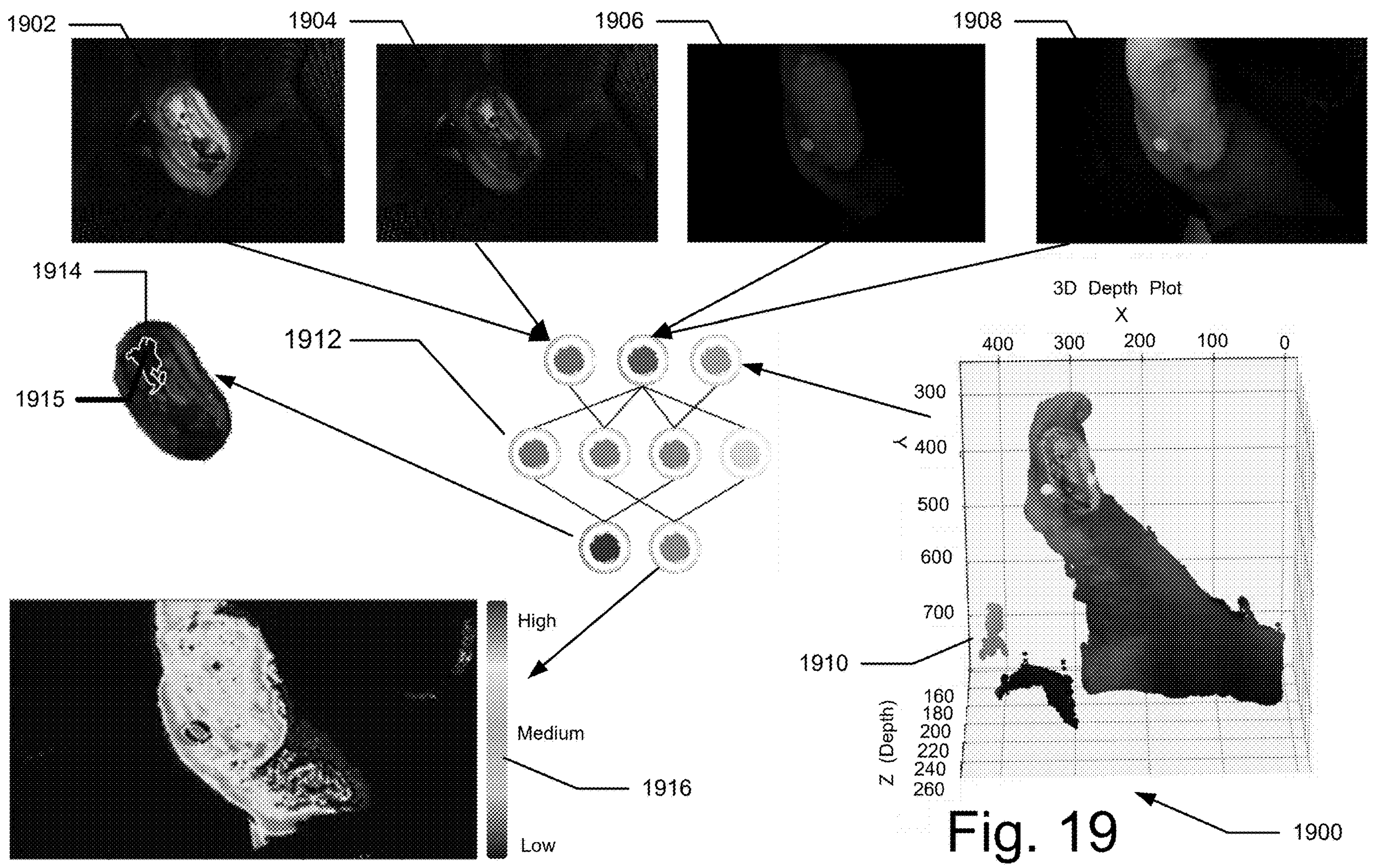
FIG. 19 illustrates results corresponding to detection of a problematic cellular entity, in accordance with an implementation of the present subject matter.

FIG. 19 illustrates results 1900 corresponding to detection of a problematic cellular entity, in accordance with an implementation of the present subject matter. In this example, images captured in a plurality of modalities including fluorescence-based imaging, such as autofluorescence imaging, reflectance imaging, such as NIR reflectance imaging, and 3D-depth imaging are fed into an analysis model. The analysis model predicts areas of wounds that show presence of problematic cellular entities and regions of the wound that exhibit low, medium, and high tissue oxygen saturation.

Image 1902 depicts an autofluorescence image captured when the excitation wavelength was 365 nm. Image 1904 depicts an autofluorescence image when the excitation wavelength was 395 nm. Image 1906 depicts an NIR diffuse reflectance image captured when the excitation wavelength was 660 nm. Image 1908 depicts a frame from an NIR diffuse reflectance video captured when the excitation wavelength 850 nm. Image 1910 depicts a 3D-depth image. The images 1902, 1904, 1906, 1910 and the video 1908 are provided as inputs to the analysis model 1912. In this example, the analysis model 1912 is a deep neural network. The analysis model 1912 predicts areas of wounds that show presence of problematic cellular entities depicted by image 1914 and the problematic cellular regions of the wound that exhibit low, medium, and high tissue oxygen saturation, as depicted by image 1916. In the image 1914, the autofluorescence image is overlaid by masks indicating predicted areas of problematic cellular entities, the problematic cellular entities (represented by the region 1915) are identified as pathogen *Pseudomonas aeruginosa.*

Figure 20:
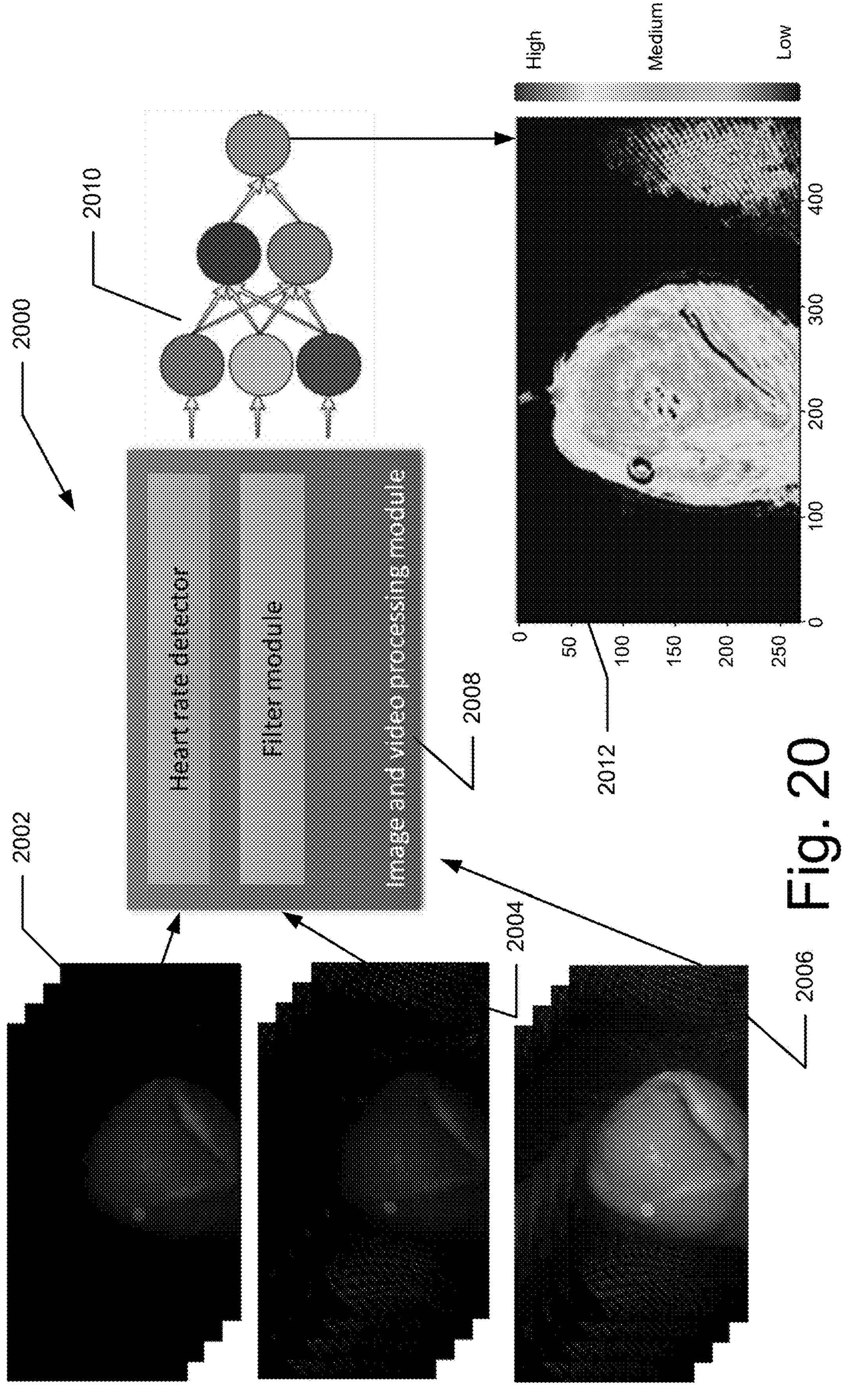
FIG. 20 illustrates results corresponding to tissue oxygenation saturation, in accordance with an implementation of the present subject matter.

FIG. 20 illustrates results 2000 corresponding to tissue oxygenation saturation, in accordance with an implementation of the present subject matter. In this example, time-varying NIR reflectance maps captured at different NIR excitation wavelengths such as 660 nm, 740 nm, 850 nm, imaged as individual videos, such as the ones depicted by 2002, 2004, 2006, are first passed through an image and video processing module 2008. The image and video processing module 2008 may be part of a processor, such as the processor 140 which includes GPU. The image and video processing module 2008 may obtain the heart rate of the target from the videos and may filter the video in time-direction such that only a narrow band of frequencies around the heart rate frequency are retained. The filtered set of frames are now passed into the analysis model 2010 that predicts problematic cellular regions of low, medium, and high tissue oxygen saturation, as depicted by the image 2012. In this example, the analysis model 2010 used is a deep convolutional neural network.

Figure 21:
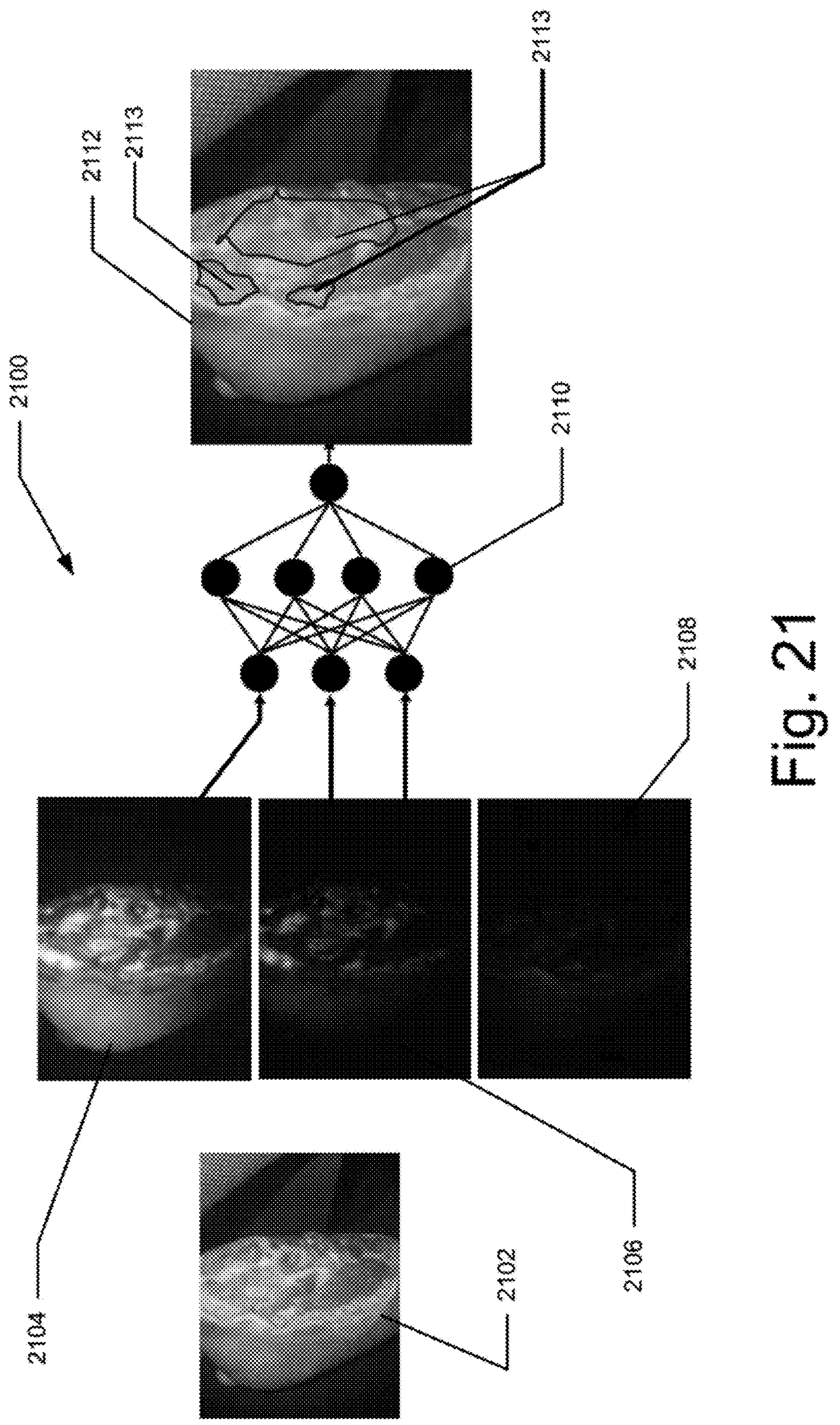
FIG. 21 illustrates results corresponding to detection of biofilm in a wound, in accordance with an implementation of the present subject matter.

FIG. 21 illustrates results 2100 corresponding to detection of biofilm in a wound, in accordance with an implementation of the present subject matter. In this example, white light image 2102 and fluorescence-based images, such as autofluorescence images 2104, 2106, 2108 of a wound captured with different illumination wavelengths, such as 365 nm, 395 nm, 450 nm respectively, are used to train the analysis model 2110 to predicts areas on the wounds which have biofilms, as is depicted by image 2112. The image 2112 white light image of the wound overlaid with detected biofilm (regions 2113 in the image 2112). In this example, the analysis model is a deep neural network. In addition, oxygenation or thermal images can also be added to the analysis model to improve the biofilm detection accuracy.

Figure 22:
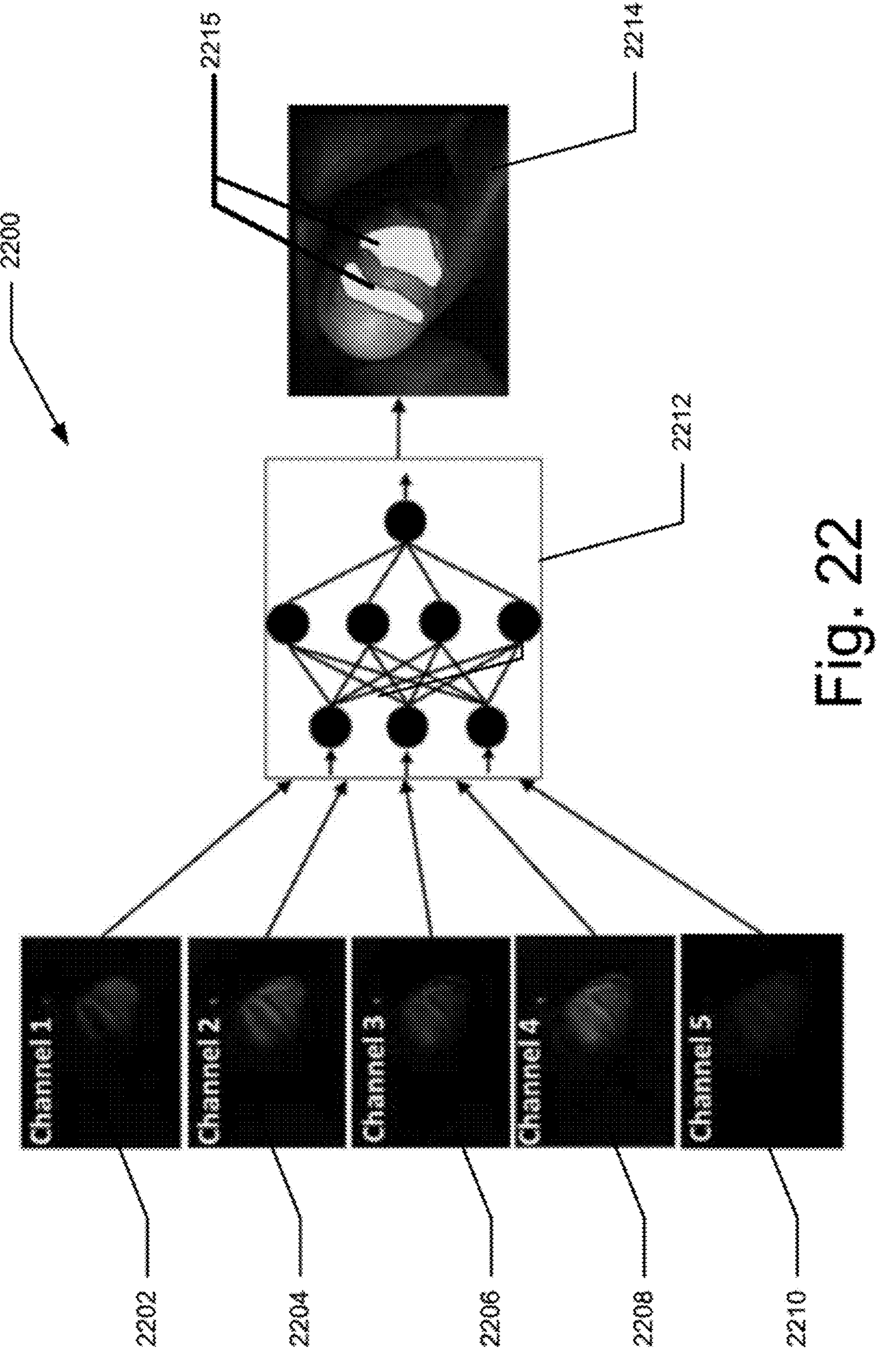
FIG. 22 illustrates results corresponding to detection of a problematic cellular entity, in accordance with an implementation of the present subject matter.

FIG. 22 illustrates results corresponding to detection of a problematic cellular entity, in accordance with an implementation of the present subject matter. In this example, a multispectral camera is used to capture fluorescence-based images, such as autofluorescence images, of a wound in different wavelength bands. Further, multichannel images, such as images 2202, 2204, 2206, 2208, 2210, are processed by the analysis model 2212, such as a deep neural network such as convolutional neural network, to predict regions of the wound with specific problematic cellular entities. Image 2214, white light image of the wound is overlaid with the predicted regions of problematic cellular entity. In the image 2214, regions 2215 correspond to pathogen *Staphylococcus aureus.*

Figure 23A:
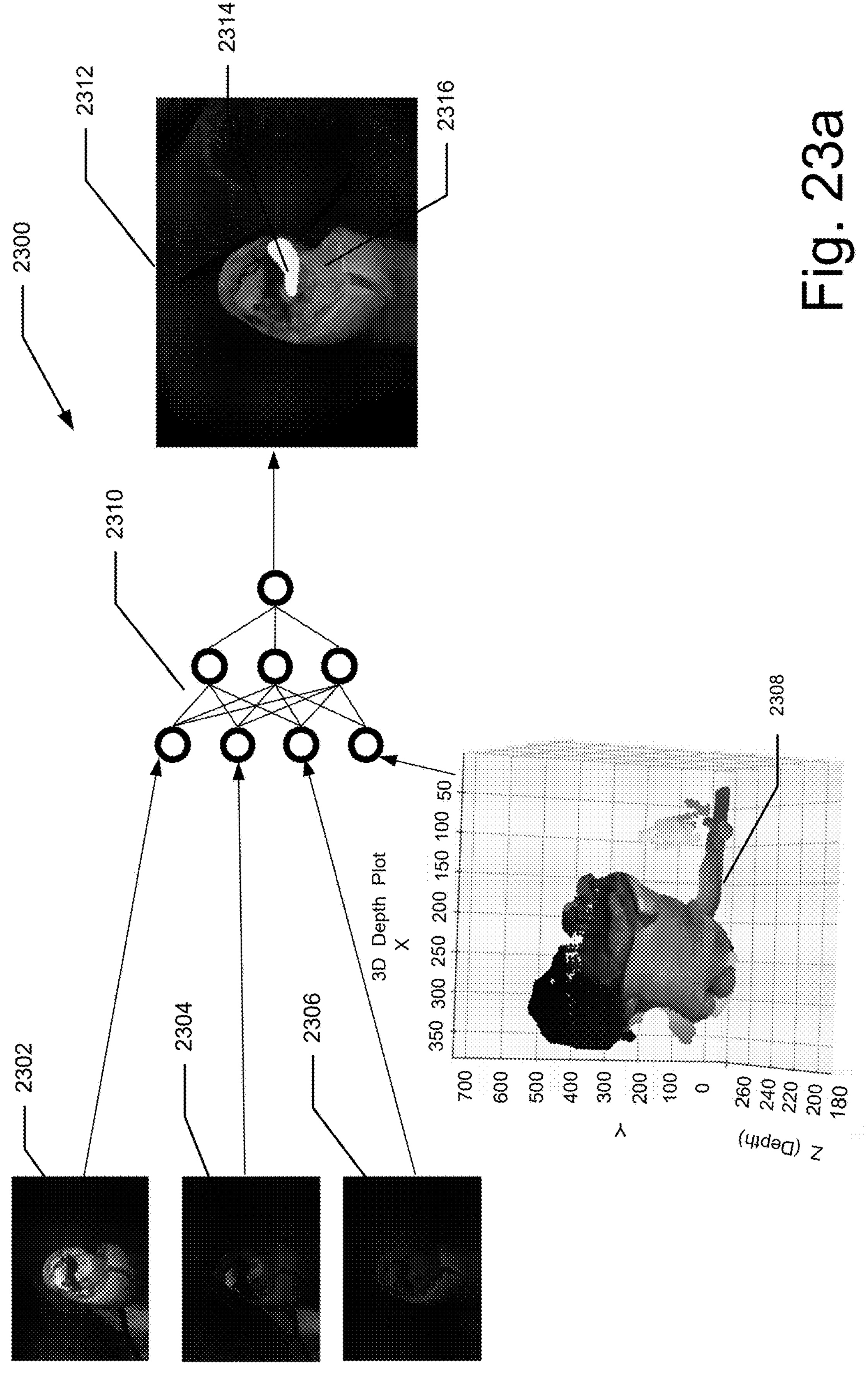
FIG. 23*a* illustrates results corresponding to detection of a problematic cellular entity, in accordance with an implementation of the present subject matter.

FIG. 23*a* illustrates results 2300 corresponding to detection of a problematic cellular entity, in accordance with an implementation of the present subject matter.

A multispectral camera is employed to acquire autofluorescence images of a wound across various wavelength bands including visible and UV wavelengths. For instance, image 2302 depicts an image captured at an illumination wavelength of 365 nm. Image 2304 depicts an image captured at an illumination wavelength of 395 nm, and image 2306 depicts an image captured at an illumination wavelength of 450 nm. Further, image 2304 depicts a three-dimensional image of the wound. All the aforementioned images are provided as inputs to the analysis model 2308. The analysis model 2308 may be referred to as Tissue Detection Network (TDN). The TDN 2308 may process the multichannel images and the three-dimensional image to identify specific problematic tissue region within the wound. The TDN 2308 may predict composition of the wound tissue, including elements like granulation, slough, necrotic tissue, and more. The projected images are superimposed onto the white light image of the wound, facilitating the stratification of wound healing trajectories, as is depicted by the image 2312. The image 2310 is a white light image of the wound overlaid with the predicted regions of slough 2314 and granulation 2316.

Figure 23B:
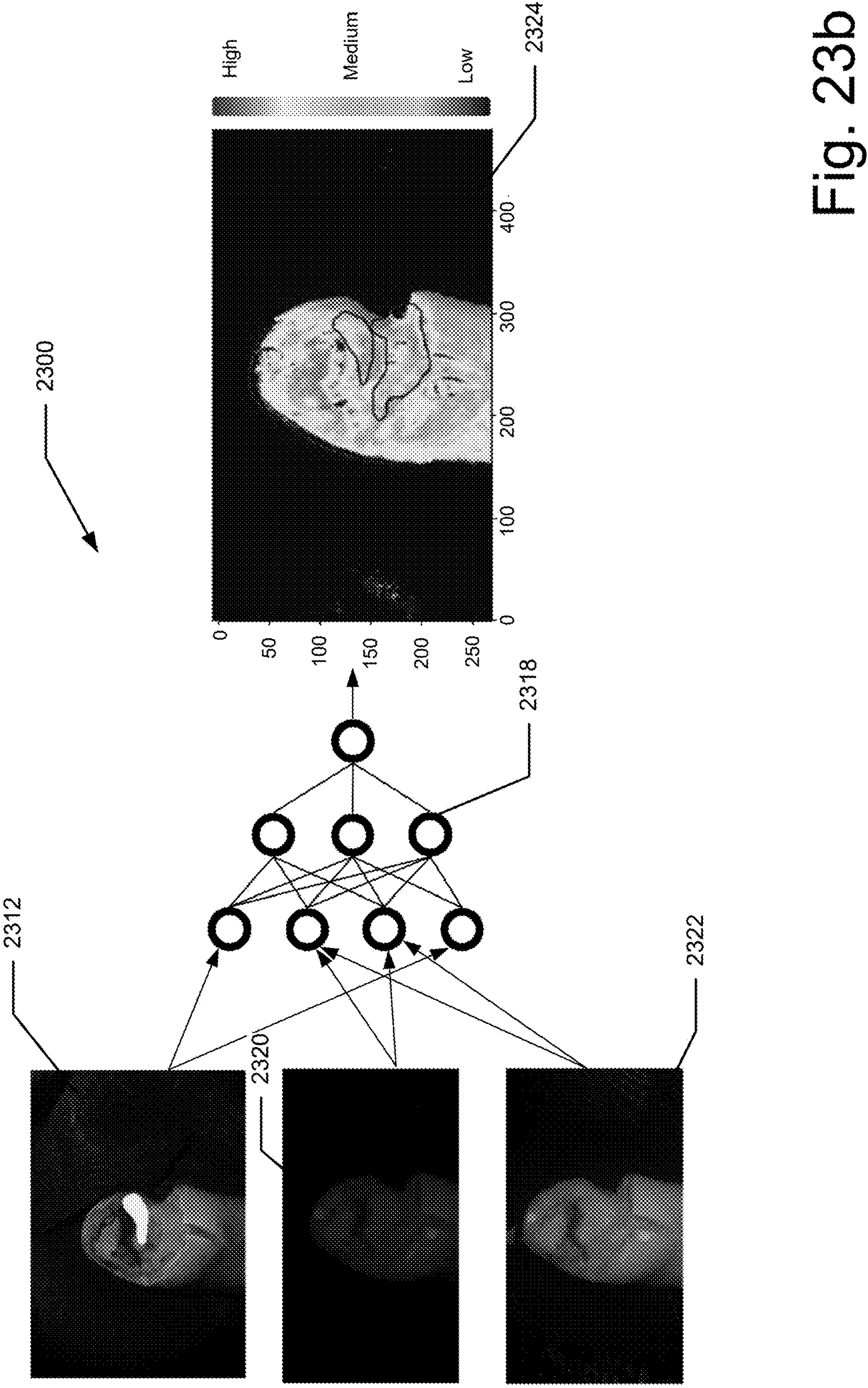
FIG. 23*b* illustrates results corresponding to detection of a problematic cellular entity, in accordance with an implementation of the present subject matter.

FIG. 23*b* illustrates results 2300 corresponding to detection of the problematic cellular entity, in accordance with an implementation of the present subject matter. In this example, the TDN 2310 predicted white light image featuring regions of problematic tissue 2312, as explained with reference to FIG. 23*a*, is used for further detection. The image 2312 is fed into the analysis model 2318. The analysis model 2318 may be, for example, a deep learning network and may be referred to Tissue-aware Oxygenation Prediction deep learning network. In addition, image 2320 and image 2322, which correspond to NIR diffuse reflectance wavelength images at illumination wavelength of 660 nm, and 850 nm respectively, are provided as input to the tissue-aware oxygen prediction deep learning network 2318. The tissue-aware oxygen prediction deep learning network 2318 generates the Tissue-aware Oxygenation image, emphasizing regions of problematic tissue, as is depicted by image 2324. The image 2324 corresponds to tissue aware deep learning network 2318 predicted oxygenation image with highlighted slough and granulation region.

Figure 24:
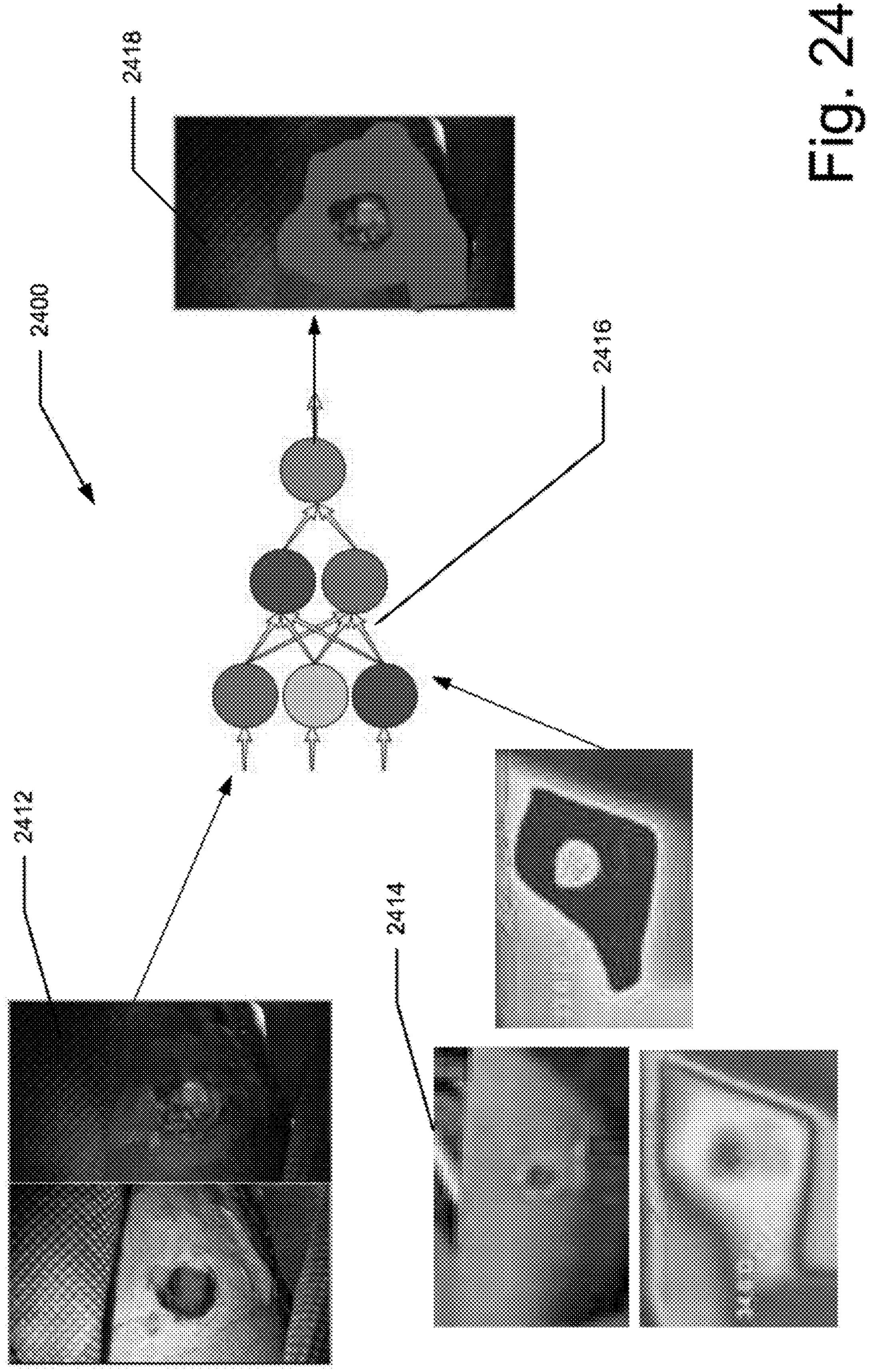
FIG. 24 illustrates results corresponding to detection of a problematic cellular entity, in accordance with an implementation of the present subject matter.

FIG. 24 illustrates results 2400 corresponding to detection of a problematic cellular entity, in accordance with an implementation of the present subject matter. In the example depicted herein, a multimodal detection mode where a multispectral camera is utilized for capturing autofluorescence images and a thermal camera captures the temperature distribution image of the wound. Image 2412 corresponds to wound images captured using multispectral camera. Image 2414 corresponds to wound images captured using thermal imaging sensor. The images 2412, 2414 are fed into the analysis model 2416. The analysis model 2416 is a deep neural network. The deep neural network 2416 predicts regions of wounds indicating the existence of problematic cellular elements based on both the autofluorescence and the thermal signatures. Image 2418 corresponds to an autofluorescence image with detected problematic cellular entities.

Figure 25:
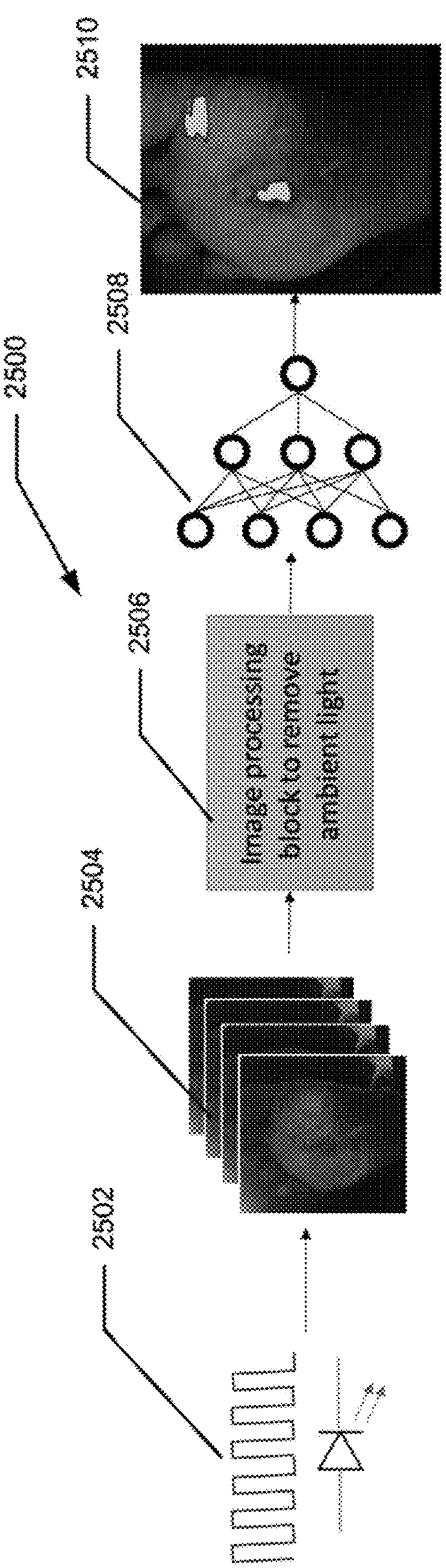
FIG. 25 illustrates results corresponding to detection of a problematic cellular entity, in accordance with an implementation of the present subject matter.

FIG. 25 illustrates results 2500 corresponding to detection of a problematic cellular entity, in accordance with an implementation of the present subject matter. In this example, wound is excited by a set of pulsed UV LEDs, as is depicted by image 2502, in 395 nm, 365 nm wavelengths, which are repeated at a fast periodic predetermined rate. Generally, ambient light can get coupled into imaging process leading to either a constant offset in the measured intensities across all Red, Green, and Blue (R,G,B) channels of the imaging sensor or a 50/60 Hz (depending on geography) oscillatory component in all the (R,G,B) channels. In order to cancel out this effect, the excitation is pulsed at a frequency, $f_{ex}$, which is different from these frequencies. The images are captured (autofluorescence images captured with ambient light), as is depicted by image 2504, and the resulting images are pre-processed by an image processing block 2506 that filters and processes the images by looking specifically for temporal frequencies around $f_{ex}$. Therefore, the pre-processed data are then fed into the analysis model 2508, such as a deep neural network, that determines areas having problematic cellular entities based on their autofluorescence signature, as is depicted by the image 2510. If large repetitive frequencies ($f_{ex}$) are used, the same number of targeted autofluorescence frames required for the subsequent detection can be acquired in a proportionally shorter duration of time. Although in the above example, image preprocessing is explained separately from the analysis model 2508, in some examples, image pre-processing can be done by the analysis model 2508. In this example, faster pulsing also allows capture of images at a shorter time duration thereby reducing the entire imaging time. In addition, the images can be captured with a single high power pulse of the LED, thereby reducing the exposure time of the imaging sensor and reducing the contribution of ambient light relative to emitted light due to high power of the illumination light. Therefore, the entire imaging time is reduced significantly. For example, if the pulse width is decreased from 1 ms to 0.1 ms, the entire imaging time is reduced by a factor of 10. Therefore, any noise to patient or device movements will be reduced significantly.

Figure 26:
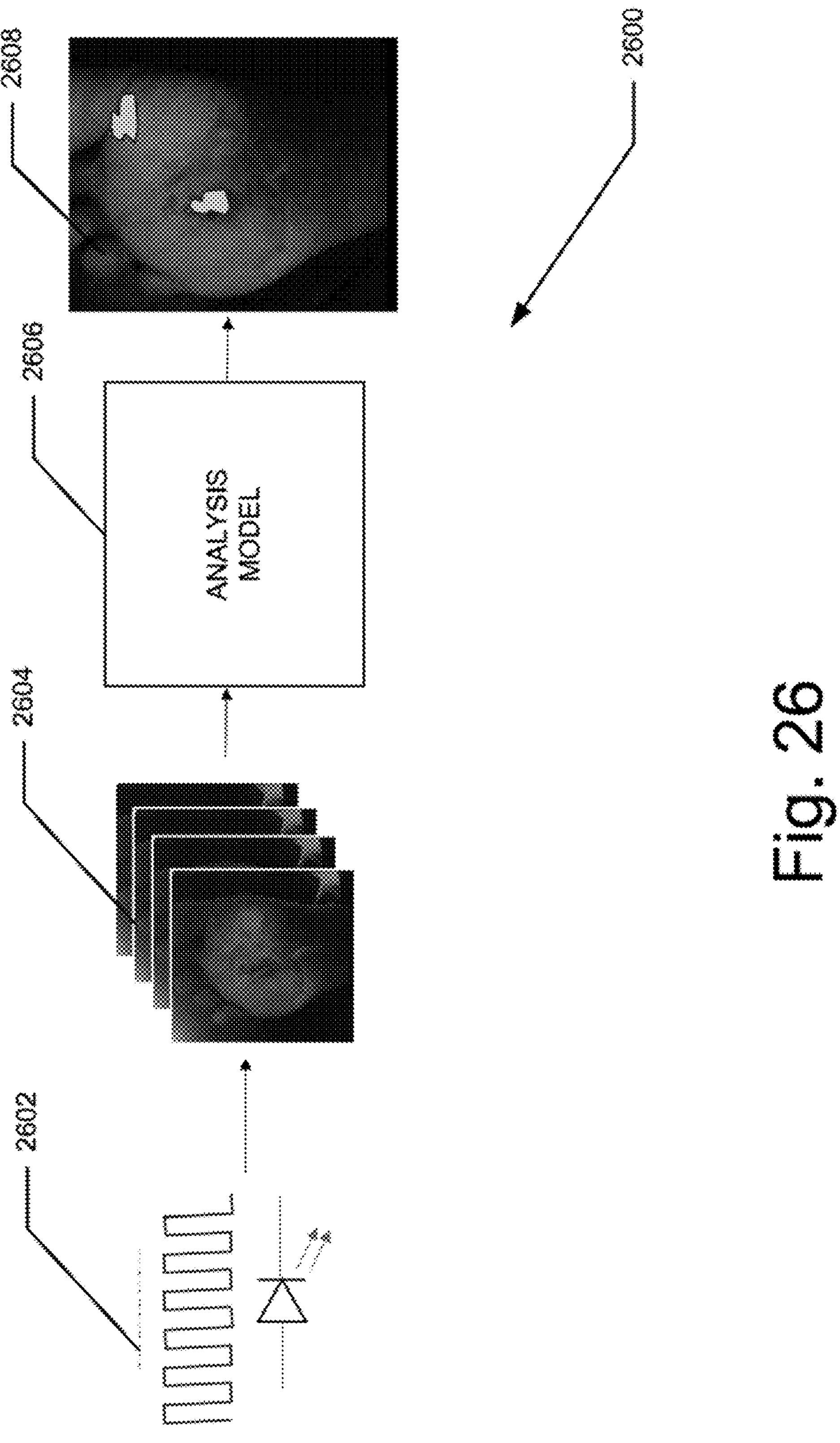
FIG. 26 illustrates results corresponding to detection of a problematic cellular entity, in accordance with an implementation of the present subject matter.

FIG. 26 illustrates results 2600 corresponding to detection of a problematic cellular entity, in accordance with an implementation of the present subject matter. In the example depicted herein, wound is excited by a set of pulsed UV LEDs, depicted by 2602, which are repeated at a periodic predetermined rate. Generally, ambient light can get coupled into the imaging process leading to either a constant offset in the measured intensities across all the R,G,B channels of the imaging sensor or a 50/60 Hz (depending on geography) oscillatory component in all the (R,G,B) channels. In order to cancel out this effect, the excitation is pulsed at a frequency $f_{ex}$ which is different from these frequencies. The resulting images with ambient noise (autofluorescence image frames captured with ambient light 2604) is passed into the analysis model 2606, such as a Long Short Term Memory (LSTM) detection model, that combines the image processing required to denoise raw data from ambient disturbance and subsequently detect and present areas having problematic cellular entities. Image 2608 depicts white light image overlaid with areas having problematic cellular entities. In this example, faster pulsing also allows capture of images at a shorter time duration thereby reducing the entire imaging time. In addition, the images can be captured with a single high power pulse of the LED, there by reducing the exposure time of the imaging sensor and reducing contribution of the ambient light relative to emitted light due to high power of the illumination light. Therefore, the entire imaging time is reduced significantly. For example, if the pulse width is decreased from 1 ms to 0.2 ms, the entire imaging time is reduced by a factor of 5. Therefore, any noise to patient or device movements will be reduced significantly.

Figure 27:
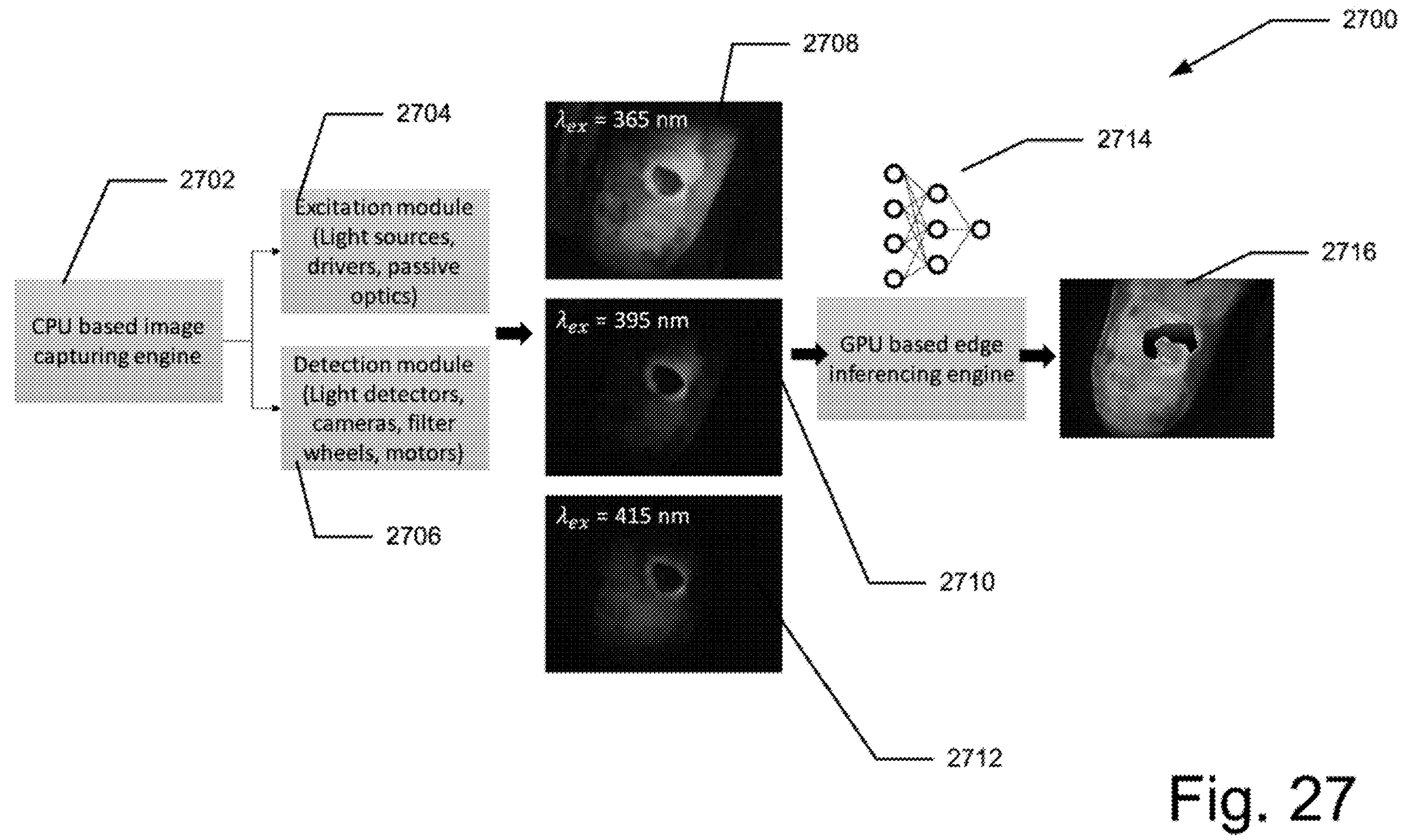
FIG. 27 illustrates results corresponding to detection of a problematic cellular entity, in accordance with an implementation of the present subject matter.

FIG. 27 illustrates results 2700 corresponding to detection of a problematic cellular entity, in accordance with an implementation of the present subject matter. In the example depicted herein, an architectural variant in which an overall functionality of a device for examining the target is split across a CPU and a GPU. The CPU takes care of the excitation and detection processes 2704, 2706 that capture autofluorescence images of the wound by exciting at different excitation wavelengths, $\lambda_{ex}$, as is depicted by images 2708, 2710, and 2712. Image 2708, 2710, 2712 correspond to autofluorescence images with illumination wavelengths of 365 nm, 395 nm, and 415 nm. The GPU may include and execute the analysis model 2714, such as a deep neural network, that is responsible for edge-inferencing functionality to determine areas having problematic cellular entities. Image 2716 corresponds to white light image of the wound marked with areas with problematic cellular entities.

The fact that the systems of the present disclosure create a composite image has another significant benefit to the user(s) of such systems. In particular, the systems may be used to take an image or images at any angle and at any distance while still creating an accurate composite rendering of the image and the information related to the wound provided to the medical professional or other user. As such, users may not need as much or any significant training on the use of the device, but may simply use the device to take an image in a similar fashion to taking a standard portrait image. This allows non-medical professionals or medical professionals with less training to use the device while still obtaining accurate information. As discussed herein, a non-medical professional or medical professional may transmit the image or series of images to a remotely located medical professional for additional consultation prior to treatment using the device(s) of the present disclosure.

The present subject matter enables providing faster image capturing and processing to detect the problematic cellular entities. Since in the present subject matter, the processor and the imaging module are provided on-board, the present subject matter enables faster capturing and processing of images. In particular, by using the combination of the CPU and the GPU and an optional FPGA, the present subject matter enables capturing and processing of images at a frequency of more than 30 images per second. The analysis model is trained over several reference fluorescence-based images and several reference three-dimensional images for detecting the presence of the problematic cellular entity in the target, thereby increasing the accuracy of the detection. The present subject matter ensures that the emission of light by the light sources are at a different frequency than ambient light source. Therefore, the present subject matter enables elimination of the ambient light interference with the light emitted by the target. Further, in the present subject matter, the pulsed LEDs may be actuated at a faster frequency, such as from 100 Hz to tens of MHz. Therefore, the present subject matter enables faster capturing of the first plurality of images and the three-dimensional images and reduces ambient light interference (background interference). Therefore, the present subject matter eliminates the background information and enhances the accuracy of the detection.

Further, in an example, the analysis model may ignore the background light and excitation light in the fluorescence-based image, and may pick up even the weak fluorescence information in the fluorescence-based image. Thus, in an example, the present subject matter also eliminates the use of an emission filter for filtering the background light and excitation light and use of a filter wheel. Thus, the device of the present subject matter is simple and cost-effective In the present subject matter, the variation in distance across the spatial region of the target from the three-dimensional image capturing sensor and the variation in curvature across the spatial region of the target relative to the three-dimensional image capturing sensor are compensated. Accordingly, the present subject matter may enhance accuracy in detection of the problematic cellular entities, particularly, for targets, such as wounds. Since the device enables transmission of the result the composite image to a cloud server, a non-medical professional or medical professional may transmit the image or series of images to a remotely located medical professional for additional consultation prior to treatment using the device(s) of the present disclosure.

Thus, the present subject matter provides a rapid, optionally filter-less, non-invasive, automatic, and in-situ detection and classification of pathogens using an "opto-computational biopsy" technique. The opto-computational biopsy technique is a technique in which multispectral imaging is used along with the computational models, such as machine learning models, Artificial Neural Network (ANN) models, deep learning models, and the like, for non-invasive biopsy to detect and classify the problematic cellular entities.

The present subject matter can be used for detecting the presence of problematic cellular entities in diabetic foot ulcers, surgical site infections, burns, skin, and interior of the body, such as esophagus, stomach, and colon. The device of the present subject matter can be used in the fields of dermatology, cosmetology, plastic surgery, infection management, photodynamic therapy monitoring, and anti-microbial susceptibility testing.

The device can be integrated into normal clinical procedures and can be used in telemedicine and tele healthcare. Further, most of the clinically relevant pathogen may be detected and classified in a few minutes. Further, data acquisition and analysis may happen automatically. Therefore, the device can be operated easily without requiring skillful technicians. This feature helps in quickly deciding the treatment protocol. The device may also be used for detection and classification of pathogens in resource scarce settings. The device of the present subject matter can also be used in endoscopy.

The device of the present subject matter may be used for quantification of various pathogens present in the target. The device may also be used for monitoring wound healing and wound closure. The device may also be used to study anti-microbial susceptibility by observing and analyzing the target by exposing the target to various antibiotics. For example, the device may be used to study bacterial grown on antibiotics, and corresponding biomarker signatures may be recorded. This information may be used to obtain information on the antibiotics to be prescribed based on the anti-microbial susceptibility of the particular bacteria. It is to be understood that antimicrobial susceptibility of other pathogens, such as fungi, may also be studied. Further, dose and concentration of antibiotics can also be decided based on dilution factors, to determine the dosage of the antibiotics or antifungals to be given.

The device may be configured to study biomolecular composition of various pathogens and their kinetic behavior based on their fluorescence signatures. The device may also be used to in cosmetology. For example, the device may be used to detect the presence of *Propionibacterium* which causes acnes. The device may also be used during tissue grafting to ensure that the tissue is free of pathogens. The device may be used for forensic detection, for example, to detect the pathogens in body fluids such as saliva, blood, mucus, and the like. The device may be configured to study effectiveness of disinfectants on various hospital surfaces such as beds, walls, hands, gloves, bandages, dressings, catheters, endoscopes, hospital equipment, sanitary devices, and the like.

The device may also be used to detect pathogen presence in hands and on surfaces, for example, in hospitals and other places that are to be free of pathogens. The device may be used to detect pathogen contamination in edible products, such as food, fruits, and vegetables.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to PCT/IN2023/051001, filed Nov. 1, 2023, are incorporated herein by reference, in their entirety. Aspects of the embodiments can be modified, if necessary, to employ systems, circuits and concepts of the various patents, applications and publications to provide yet further embodiments

We claim:

1. A device for examining a target, the device comprising:
- an imaging module comprising:
  - a first plurality of light sources, wherein each light source is configured to emit excitation radiation at a predetermined range of wavelengths that cause one or more markers in the target to fluoresce;
  - an imaging sensor configured to directly receive light emitted by the target in response to illumination thereof by at least one or more light sources of the first plurality of light sources without an optical bandpass filter being disposed between the imaging sensor and the target and to capture a first plurality of images formed based on the emitted light; and a three-dimensional image capturing sensor to illuminate the target and to receive light reflected by the target in response to the illumination thereof by the three-dimensional image capturing sensor and to generate a three-dimensional image of the target based on the reflected light;

an interfacing module coupled to the imaging module, the interfacing module comprising:

a processor configured to:

analyze, using an analysis model, a first image of the first plurality of images, wherein the first image is a fluorescence-based image comprising fluorescence from the target;

analyze, using the analysis model, the three-dimensional image of the target to determine variation in intensity of the light emitted across a spatial region of the target by compensating for variation in distance across the spatial region of the target from the three-dimensional image capturing sensor and for variation in curvature across the spatial region of the target;

detect, using the analysis model, presence of a problematic cellular entity in the target based on the analysis of the first image and the three-dimensional image, wherein the analysis model is trained for detecting the presence of problematic cellular entities in targets; and create a composite image of the first image and the three-dimensional image of the target; and an interface to:

display a result corresponding to the detection of the problematic cellular entity and the composite image of the target.

2. The device of claim 1, wherein the analysis model is trained using a plurality of reference fluorescence-based images and a plurality of reference three-dimensional images for detecting the presence of problematic cellular entities in targets and wherein the analysis model is trained to differentiate between fluorescence in the fluorescence-based image emerging from the problematic cellular entity and fluorescence in fluorescence-based image from regions of the target other than the problematic cellular entity.

3. The device of claim 1, comprising System-on-Module (SOM), wherein the SOM comprises:

the imaging module;

the processor; and a plurality of light source drivers, wherein each of the plurality of light source drivers is configured to regulate a respective light source of the first plurality of light sources, wherein the processor is configured to control the first plurality of light sources to illuminate at a frequency other than a frequency of an ambient light source.

4. The device of claim 3, wherein one or more light sources of the first plurality of light sources is a Pulsed Light Emitting Diode (LED), wherein the processor is configured to actuate one or more of the light source drivers of the plurality of light source drivers to regulate the pulsed LEDs to emit pulses of excitation radiation to enable faster imaging and to reduce ambient light interference in the light emitted by the target.

5. The device of claim 1, wherein the processor is configured to operate the imaging sensor to capture and process the first plurality of images.

6. The device of claim 1, wherein the imaging module comprises:

a second plurality of light sources for illuminating the target without causing the one or more markers in the target to fluoresce, wherein each of the second plurality of light sources is configured to emit light with a wavelength in a Near-Infra Red (NIR) region or a visible region, wherein the imaging sensor is configured to capture a second plurality of images formed based on light reflected by the target in response to illumination thereof by at least one or more light sources of the second plurality of light sources; and wherein the processor is configured to:

analyze, using the analysis model, a second image obtained from the second plurality of images to identify oxygenation at a plurality of regions in the target;

analyze, using the analysis model, the three-dimensional image of the target to determine variation in intensity of the light reflected across the spatial region of the target by compensating for variation in distance across the spatial region of the target from the three-dimensional image capturing sensor and for variation in curvature across the spatial region of the target;

detect, using the analysis model, a presence of a problematic cellular entity in the target based on the analysis of the first image, the second image, and the three-dimensional image; and create a composite image of the target using the first image, the second image, and the three-dimensional image; and the interface configured to:

display a result corresponding to the detection of the problematic cellular entity and the composite image of the first image, the second image, and the three-dimensional image of the target.

7. The device of claim 6, wherein the processor is configured to:

activate the first plurality of light sources for emitting light onto the target;

activate the second plurality of light sources for emitting light onto the target; and activate the imaging sensor to capture light emitted by the target in response to illumination of the target by the at least one or more light sources of the first plurality of light sources and to capture light emitted by the target in response to illumination of the target by the at least one or more light sources of the second plurality of light sources.

8. The device of claim 1, comprising:

a second plurality of light sources for illuminating the target without causing the one or more markers in the target to fluoresce, wherein at least one or more of the second plurality of light sources is configured to emit light with a wavelength in a visible region, wherein the imaging sensor is configured to capture a third plurality of images formed based on light reflected by the target in response to illumination thereof by the at least one or more light sources of the second plurality of light sources, wherein the third plurality of images are white light images; and wherein the processor is configured to:

analyze, using the analysis model, a third image obtained from the third plurality of images;

analyze, using the analysis model, the three-dimensional image of the target to determine variation in intensity of the light reflected across the spatial region of the target by compensating for variation in distance across the spatial region of the target from the three-dimensional image capturing sensor and for variation in curvature across the spatial region of the target;

detect, using the analysis model, a presence of a problematic cellular entity in the target based on the analysis of the first image, the third image, and the three-dimensional image; and create a composite image of the target using the first image, the third image, and the three-dimensional image; and the interface configured to:

display a result corresponding to the detection of the problematic cellular entity and the composite image of the first image, the third image, and the three-dimensional image of the target.

9. The device of claim 1, comprising a thermal sensor for thermal imaging of the problematic cellular entity.

10. The device of claim 1, comprising:

a portable power module operable to power components of the imaging module and the interfacing module;

a first housing to house the imaging module;

a second housing to house the interfacing module;

a bridge to connect the imaging module and the interfacing module, the bridge comprising an electronic interface to enable electronic communication between the processor and the imaging module; and a third housing configured to house the portable power module.

11. The device of claim 1, comprising a ranging sensor, wherein at least one of: the three-dimensional image capturing sensor and the ranging sensor is operable to determine a distance of the target from the device for positioning the device at a predetermined distance from the target.

12. The device of claim 1, wherein the target is a wound region, and wherein the processor is further configured to:

extract, by using the analysis model, spatial and spectral features of the wound region from the first image and the three-dimensional image;

identify, by using the analysis model, location of the wound region based on the extraction of the spatial and the spectral features;

determine, by using the analysis model, a contour of the wound region based on the extraction of the spatial and the spectral features;

determine a length of the wound region, a width of the wound, a depth of the wound, a perimeter of the wound, or an area of the wound based on the determination of the contour of the wound region;

detect, by using the analysis model, a pathogen in the wound region based on the extraction of the spatial and the spectral features; and classify, by using the analysis model, the pathogen by at least one of: family, genus, species, or strain of the pathogen.

13. The device of claim 1, wherein the target is one of: a wound region, an edible product, a laboratory equipment, a sanitary device, a sanitary equipment, a medical equipment, a biochemical assay chip, a microfluidic chip, or a body fluid, wherein:

when the target is a wound region, the processor is configured to determine, in response to detecting the presence of the problematic cellular entity, at least one of: a degree of infection of the wound region, a spatial distribution of pathogens in the wound region, or a healing rate of the wound region, when the target is a tissue, the processor is further configured to detect the presence of the problematic cellular entity as at least one of: a cancerous tissue or a necrotic tissue in the tissue sample, and when the target is one of: a sanitary device, a sanitary equipment, a laboratory equipment, a medical equipment, a biochemical assay chip, a microfluidic chip, or a body fluid, the processor is configured to determine the problematic cellular entity as a pathogen, and classify the pathogens in the target.

14. The device of claim 1, comprising:

a first polarizer positioned between the first plurality of light sources and the target to let excitation radiation of the first plurality of light sources of a first polarization to pass through; and a second polarizer positioned between the target and the image sensor to let the light emitted by the target of a second polarization to pass through.

15. The device of claim 1, wherein the processor is configured to:

transmit the result and the composite image of the first image and the three-dimensional image to a remote system in electronic communication with the device.

16. The device of claim 1, wherein the interface is configured to:

in response to an input, transmit, by using an application programming interface, the result corresponding to the detection and classification of pathogens in the target upon the detection and the classification of the pathogen.

17. The device of claim 1, wherein the device is a smartphone.

18. The device of claim 1, wherein the imaging sensor is a charge coupled device (CCD) sensor, a CCD digital camera, a complementary metal-oxide semiconductor (CMOS) sensor, a CMOS digital camera, a single-photon avalanche diode (SPAD), a SPAD array, an Avalanche Photodetector (APD) array, a photomultiplier tube (PMT) array, a Near-infrared (NIR) sensor, a Red Green Blue (RGB) sensor, or a combination thereof.

19. The device of claim 1, comprising a lens integrated with the imaging sensor to capture the image.

20. The device of claim 1, wherein the imaging sensor is a multispectral camera configured to capture the light emitted by the target at a plurality of wavelengths.

21. The device of claim 1, wherein the analysis model comprises an Artificial Neural Network (ANN) model, a Machine Learning model ML, or a combination thereof.

22. The device of claim 1, wherein the processor is configured to detect time-dependent changes in fluorescence emerging from the target.

23. The device of claim 1, wherein the fluorescence from the target is one of: autofluorescence or exogenous fluorescence.

24. The device of claim 1, comprising:

a first set of excitation filters, wherein each of the first set of excitation filters is configured to filter the excitation radiation emitted by a light source of the first plurality of light sources of a predetermined range of wavelengths to pass through thereof to illuminate the target.

* * * * *